United States Patent
Saltsidis

(10) Patent No.: US 9,813,290 B2
(45) Date of Patent: Nov. 7, 2017

(54) METHOD AND SYSTEM FOR SUPPORTING DISTRIBUTED RELAY CONTROL PROTOCOL (DRCP) OPERATIONS UPON MISCONFIGURATION

(71) Applicant: Telefonaktiebolaget L M Ericsson (publ), Stockholm (SE)

(72) Inventor: Panagiotis Saltsidis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 72 days.

(21) Appl. No.: 14/838,353

(22) Filed: Aug. 27, 2015

(65) Prior Publication Data

US 2016/0065407 A1 Mar. 3, 2016

Related U.S. Application Data

(60) Provisional application No. 62/043,970, filed on Aug. 26, 2014.

(51) Int. Cl.
*H04L 12/24* (2006.01)
*H04L 12/703* (2013.01)
(Continued)

(52) U.S. Cl.
CPC ...... *H04L 41/0806* (2013.01); *H04L 41/0853* (2013.01); *H04L 43/0817* (2013.01);
(Continued)

(58) Field of Classification Search
None
See application file for complete search history.

(56) References Cited

U.S. PATENT DOCUMENTS 6,430,183 B1 8/2002 Satran
6,445,715 B1 9/2002 Annaamalai et al.
(Continued)

FOREIGN PATENT DOCUMENTS

EP 2701342 A1 2/2014
JP 2011-508501 A 3/2011
(Continued)

OTHER PUBLICATIONS

Non-Final Office Action, U.S. Appl. No. 14/134,966, dated Nov. 25, 2015, 18 pages.
(Continued)

*Primary Examiner* — Charles C Jiang
*Assistant Examiner* — Saad Khawar
(74) *Attorney, Agent, or Firm* — Nicholson De Vos Webster & Elliott LLP

(57) ABSTRACT

A method supporting a distributed resilient network interconnect (DRNI) in a link aggregation group at a network device is disclosed. The method starts with receiving a distributed relay control protocol data unit (DRCPDU), where the DRCPDU includes neighbor network device's state information and configuration information, wherein the configuration information includes its operational aggregation key, gateway digest, port digest. The method continue with determine whether or not the received configuration information is different from the one of the network device and how, and causing the next DRCPDU to be transmitted to the neighbor network device to include or not include certain information accordingly.

20 Claims, 43 Drawing Sheets

(51) Int. Cl.
*H04L 12/755* (2013.01)
*H04L 12/26* (2006.01)
*H04L 12/709* (2013.01)
*H04L 29/06* (2006.01)

(52) U.S. Cl.
CPC .......... *H04L 45/021* (2013.01); *H04L 45/245* (2013.01); *H04L 45/28* (2013.01); *H04L 65/102* (2013.01); *H04L 41/082* (2013.01); *Y02B 60/33* (2013.01)

(56) References Cited

U.S. PATENT DOCUMENTS

| | | |
|---|---|---|
| 6,553,568 B1 | 4/2003 | Fijolek et al. |
| 6,687,751 B1 | 2/2004 | Wils et al. |
| 6,910,149 B2 | 6/2005 | Perloff et al. |
| 7,782,856 B1 | 8/2010 | Larsen et al. |
| 7,787,447 B1 | 8/2010 | Egan et al. |
| 7,869,432 B1 | 1/2011 | Mollyn |
| 7,983,267 B2 | 7/2011 | Takase et al. |
| 8,243,594 B1 | 8/2012 | Fotedar et al. |
| 8,422,485 B2 | 4/2013 | Jung et al. |
| 8,472,312 B1 | 6/2013 | Yang et al. |
| 9,143,439 B2 | 9/2015 | Wang et al. |
| 9,264,298 B2 | 2/2016 | Gero et al. |
| 2002/0040389 A1 | 4/2002 | Gerba et al. |
| 2006/0058059 A1 | 3/2006 | Kim |
| 2006/0159268 A1 | 7/2006 | Jung et al. |
| 2006/0227704 A1 | 10/2006 | Nakagawa et al. |
| 2006/0227711 A1 | 10/2006 | Nakagawa et al. |
| 2006/0251106 A1 | 11/2006 | Nakagawa et al. |
| 2007/0127464 A1 | 6/2007 | Jain et al. |
| 2007/0150614 A1 | 6/2007 | Ramachandran et al. |
| 2007/0280258 A1 | 12/2007 | Rajagopalan et al. |
| 2008/0155112 A1 | 6/2008 | Ma et al. |
| 2008/0219185 A1 | 9/2008 | Zou et al. |
| 2008/0291919 A1 | 11/2008 | Dunbar et al. |
| 2009/0073873 A1 | 3/2009 | MacAdam et al. |
| 2009/0135838 A1 | 5/2009 | Rouyer et al. |
| 2009/0225752 A1 | 9/2009 | Mitsumori |
| 2009/0252170 A1 | 10/2009 | Hu |
| 2010/0182920 A1 | 7/2010 | Matsuoka |
| 2011/0075559 A1 | 3/2011 | Katsura |
| 2011/0167101 A1 | 7/2011 | Hopen et al. |
| 2011/0194404 A1 | 8/2011 | Kluger et al. |
| 2011/0200046 A1 | 8/2011 | Kojima et al. |
| 2011/0211585 A1 | 9/2011 | Kodaka et al. |
| 2012/0027017 A1 | 2/2012 | Rai et al. |
| 2012/0039338 A1 | 2/2012 | Morimoto |
| 2012/0233492 A1 | 9/2012 | Finn et al. |
| 2012/0236859 A1 | 9/2012 | Subramanian et al. |
| 2012/0275297 A1 | 11/2012 | Subramanian |
| 2013/0022044 A1 | 1/2013 | Tatsumi et al. |
| 2013/0201822 A1 | 8/2013 | Liang |
| 2013/0287038 A1 | 10/2013 | Zhou et al. |
| 2013/0301427 A1 | 11/2013 | Tsai et al. |
| 2013/0308455 A1 | 11/2013 | Kapadia et al. |
| 2014/0025736 A1 | 1/2014 | Wang et al. |
| 2014/0064056 A1 | 3/2014 | Sakata et al. |
| 2014/0089492 A1 | 3/2014 | Nelson et al. |
| 2014/0112191 A1 | 4/2014 | Farkas et al. |
| 2014/0115189 A1 | 4/2014 | Ao et al. |
| 2014/0226457 A1 | 8/2014 | Hsueh et al. |
| 2014/0281669 A1 | 9/2014 | DeCusatis et al. |
| 2014/0313932 A1 | 10/2014 | Saltsidis |
| 2014/0313938 A1 | 10/2014 | Saltsidis |
| 2014/0313939 A1 | 10/2014 | Saltsidis |
| 2014/0314094 A1 | 10/2014 | Saltsidis et al. |
| 2014/0314095 A1 | 10/2014 | Saltsidis et al. |
| 2014/0314097 A1 | 10/2014 | Saltsidis |
| 2014/0317250 A1 | 10/2014 | Saltsidis |
| 2014/0321268 A1 | 10/2014 | Saltsidis |
| 2014/0347994 A1 | 11/2014 | Kapadia et al. |
| 2015/0023351 A1 | 1/2015 | Rajagopalan et al. |
| 2015/0124837 A1 | 5/2015 | Saltsidis et al. |
| 2015/0271068 A1 | 9/2015 | Wei et al. |
| 2015/0271088 A1 | 9/2015 | Ao |
| 2016/0065407 A1 | 3/2016 | Saltsidis |

FOREIGN PATENT DOCUMENTS

| | | |
|---|---|---|
| RU | 2472316 C1 | 1/2013 |
| RU | 2475988 C2 | 2/2013 |
| WO | 2009154869 A2 | 12/2009 |
| WO | 2010124628 A1 | 11/2010 |
| WO | 2012018521 A1 | 2/2012 |
| WO | 2012065336 A1 | 5/2012 |
| WO | 2012142910 A1 | 10/2012 |
| WO | 2013127416 A1 | 9/2013 |
| WO | 2013171552 A1 | 11/2013 |

OTHER PUBLICATIONS

Non-Final Office Action, U.S. Appl. No. 14/167,155, dated Dec. 4, 2015, 39 pages.
Non-Final Office Action, U.S. Appl. No. 14/257,859, dated Dec. 7, 2015, 61 pages.
Non-Final Office Action, U.S. Appl. No. 14/257,769, dated Dec. 8, 2015, 28 pages.
Non-Final Office Action, U.S. Appl. No. 14/257,360, dated Jan. 13, 2016, 59 pages.
Yuehua, Wei, "Establish/Maintain a Portal and Distributed Relay," IEEE 802 plenary, San Antonio, Nov. 2012, 9 pages.
Non-Final Office Action, U.S. Appl. No. 14/257,252, dated Feb. 2, 2016, 41 pages.
Non-Final Office Action, U.S. Appl. No. 14/257,871, dated Mar. 16, 2016, 47 pages.
Non-Final Office Action, U.S. Appl. No. 14/257,637, dated Mar. 21, 2016, 44 pages.
Communication Pursuant to Article 94(3) EPC for Application No. 14 724 800.9, dated Apr. 22, 2016, 7 pages.
Nigel Bragg; "Split Brain Detection 1; axbq-bragg-split-brain-detection-0912-v00", IEEE Draft, vol. 802.1, No. v00, Sep. 6, 2012, pp. 1-8.
Final Office Action, U.S. Appl. No. 14/257,769, dated Apr. 26, 2016, 22 pages.
Notice of Allowance, U.S. Appl. No. 14/257,252, dated May 24, 2016, 11 pages.
Final Office Action, U.S. Appl. No. 14/135,556, dated Jun. 16, 2016, 28 pages.
First Written Opinion for Singapore Application No. 11201508361X, dated Jun. 29, 2016, 9 pages.
"Link Aggregation Control Protocol (LACP) (802.3ad) for Gigabit Interfaces", Cisco IOS Release 12.2(31)SB2, Mar. 1, 2007, pp. 1-18.
Notice of Allowance, U.S. Appl. No. 14/257,859, dated Jul. 11, 2016, 34 pages.
Notice of Allowance, U.S. Appl. No. 14/257,637, dated Jul. 20, 2016, 15 pages.
Final Office Action, U.S. Appl. No. 14/167,155, dated Jul. 22, 2016, 53 pages.
Notice of Allowance, U.S. Appl. No. 14/134,966, dated Jun. 17, 2016, 19 pages.
Final Office Action, U.S. Appl. No. 14/257,871, dated Aug. 16, 2016, 42 pages.
Notice of Allowance, U.S. Appl. No. 14/135,556, dated Sep. 1, 2016, 21 pages.
Notice of Allowance for Australia Application No. 2014259015, dated Oct. 7, 2016, 3 pages.
Non-Final Office Action for U.S. Appl. No. 14/257,871, dated Nov. 3, 2016, 25 pages.
Decision to Grant for Japan Application No. 2016-509581, dated Nov. 14, 2016, 5 pages.
Decision to Grant a Patent for Japan Application No. 2016-509579, dated Nov. 30, 2016, 6 pages.
Patent Allowance for Korean Application No. 2015-7033235, dated Nov. 16, 2016, 3 pages.

(56) References Cited

OTHER PUBLICATIONS

Non-Final Office Action from U.S. Appl. No. 15/268,416, dated Dec. 30, 2016, 30 pages.
Notice of Allowance for U.S. Appl. No. 14/257,769, dated Jan. 9, 2017, 37 pages.
Notice of Allowance for U.S. Appl. No. 14/167,155, dated Jan. 13, 2017, 33 pages.
RFC 2210: Wroclawski J., "The Use of RSVP with IETF Integrated Services," 1997, 33 pages, Network Working Group, Request for Comments: 2210.
RFC 2211: Wroclawski J., "Specification of the Controlled-Load Network Element Service," 1997, 19 pages, Network Working Group, Request for Comments: 2211.
RFC 2212: Shenker., et al., "Specification of Guaranteed Quality of Service," 1997, 20 pages, Network Working Group, Request for Comments: 2212.
RFC 2328: Moy J.T., "OSPF Version 2," 1998, 244 pages, Standards Track, downloaded on Mar. 17, 2009, http://rfc.dotsrc.org/rfc/rfc2328.html,Request for comments: 2328.
RFC 2460: Deering S., et al., "Internet Protocol Version 6 (IPv6)," 1998, 39 pages, Network Working Group, Standards Track, Request for comments: 2460.
RFC 2474: Nichols K., "Definition of the Differentiated Services Field (DS Field) in the IPv4 and IPv6 Headers," 1998, 20 pages, Network Working Group, The Internet Society, Request for Comments: 2474.
RFC 2475: Blake S., "An Architecture for Differentiated Services," 1998, 36 pages, Network Working Group, The Internet Society, Request for Comments: 2475.
RFC 2597: Heinanen J., et al., "Assured Forwarding PHB Group," 1999, 11 pages, The Internet Society, Request for comments: 2597.
RFC 2675: Borman D., "IPv6 Jumbograms," 1999, 9 pages, Network Working Group, The Internet Society, Request for Comments: 2675.
RFC 2983: Black D., "Differentiated Services and Tunnels," 2000, 14 pages, Network Working Group, The Internet Society, Request for Comments: 2983.
RFC 3086: Nichols K., et al., "Definition of Differentiated Services Per Domain Behaviors and Rules for their Specification," 2001, 24 pages, Network Working Group, Request for Comments: 3086.
RFC 3140: Black D., et al., "Per Hop Behavior Identification Codes," 2001, 8 pages, Network Working Group, Standards Track, Request for Comments: 3140.
RFC 3209: Awduche D., et al., "RSVP-TE: Extensions to RSVP for LSP Tunnels," 2001, 61 pages, Network Working Group, The Internet Society, Request for Comments: 3209.
RFC 3246: Davie B., et al., "An Expedited Forwarding PHB (Per-Hop Behavior)," 2002, 16 pages, The Internet Society, Request for Comments: 3246.
RFC 3247: Charny A., et al., "Supplemental Information for the New Definition of the EF PHB (Expedited Forwarding Per-Hop Behavior)," 2002, 24 pages, Network Working Group, The Internet Society, Request for Comments 3247.
RFC 3260: Grossman D., "New Terminology and Clarifications for Diffserv," 2002, 10 pages, Network Working Group, The Internet Society, Request for Comments: 3260.
RFC 3289: Baker F., et al., "Management Information Base for the Differentiated Services Architecture," 2002, 116 pages, Network Working Group, The Internet Society, Request for Comments: 3289.
RFC 3290: Bernet Y., et al., "An Informal Management Model for Diffserv Routers," 2002, 56 pages, Network Working Group, The Internet Society, Request for Comments: 3290.
RFC 3317: Chan K., et al., "Differentiated Services Quality of Service Policy Information Base," 2003, 96 pages, Network Working Group, The Internet Society, Request for Comments: 3317.
RFC 3473: Berger L., "Generalized Multi-Protocol Label Switching (GMPLS) Signaling Resource ReserVation Protocol-Traffic Engineering (RSVP-TE) Extensions," 2003, 42 pages, The Internet Society, Network Working Group, Request for Comments: 3473.

RFC 4113: Fenner B., et al., "Management Information Base for the User Datagram Protocol (UDP)," 2005, 19 pages, Network Working Group, The Internet Society, Request for Comments: 4113.
RFC 4271: Rekhter Y., et al., "A Border Gateway Protocol 4 (BGP-4)," 2006, 104 pages, The Internet Society, Request for Comments: 4271.
RFC 4309: Housley., "Using Advanced Encryption Standard (AES) CCM Mode with IPsec Encapsulating Security Payload (ESP)," 2005, 13 pages, The Internet Society, Network Working Group, Request for Comments: 4309.
RFC 4495: Polk., et al., "A Resource Reservation Protocol (RSVP) Extension for the Reduction of Bandwidth of a Reservation Flow," 2006, 21 pages, The Internet Society, Network Working Group, Request for Comments: 4495.
RFC 4558: Ali., et al., "Node-ID Based Resource Reservation Protocol (RSVP) Hello: A Clarification Statement," 2006, 7 pages, Network Working Group, The Internet Society, Request for Comments: 4558.
RFC 4594: Babiarz J., et al., "Configuration Guidelines for DiffServ Service Classes," 2006, 57 pages, Network Working Group, Request for Comments: 4594.
RFC 5036: Andersson L., "LDP Specification," 2007, 135 pages, The EITF Trust, Network Working Group, Request for Comments: 5036.
RFC 5340: Coltun R., et al., "OSPF for IPv6," 2008, 94 pages, The IETF Trust, Network Working Group, Request for Comments: 5340.
RFC 5405: Eggert L., et al., "Unicast UDP Usage Guidelines for Application Designers," 2008, 27 pages, Network Working Group, IETF Trust, Request for Comments: 5405.
RFC 5865: Baker F., "A Differentiated Services Code Point (DSCP) for Capacity-Admitted Traffic," May 2010, 14 pages, Internet Engineering Task Force (IETF), IETF Trust, Request for Comments: 5865.
RFC 768: Postel, "User Datagram Protocol," Aug. 28, 1980, 3 pages, Network Working Group, Request for Comments: 768.
RFC 793: Postel J., "Transmission Control Protocol," Sep. 1981, 91 pages, DARPA Internet Program Protocol Specification, Request for comments: 793.
Saltsidis P., "802.1AX-REV—Link Aggregation Revision," Joint IEEE-SA and ITU Workshop on Ethernet, Geneva, Switzerland, 2013, pp. 17.
"The MD5 Message-Digest Algorithm," Network Working Group, Request for Comments, RFC 1321: RIVEST, Apr. 1992, 20 pages.
Virtual Bridged Local Area Networks Amendment 7: Provider Backbone Bridges, IEEE Std 802.1ah, New York, USA, IEEE Computer Society, New York, USA, 2008, 121 pages.
Written Opinion for Application No. PCT/SE2014/050177, dated Jul. 15, 2014, 8 pages.
Written Opinion for Application No. PCT/SE2014/050283 dated Jul. 21, 2014, 6 pages.
Written Opinion of the International Preliminary Examining Authority for Application No. PCT/IB2014/060912 dated Mar. 30, 2015, 8 pages.
Written Opinion of the international Preliminary Examining Authority for Application No. PCT/IB2014/060913 dated Apr. 2, 2015, 10 pages.
Written Opinion of the International Preliminary Examining Authority for Application No. PCT/IB2014/060914 dated Mar. 30, 2015, 10 pages.
Written Opinion of the international Preliminary Examining Authority for Application No. PCT/IB2014/060915 dated Apr. 8, 2015, 8 pages.
Written Opinion of the International Preliminary Examining Authority for Application No. PCT/IB2014/060916 dated Apr. 1, 2015, 8 pages.
Written Opinion of the International Preliminary Examining Authority for Application No. PCT/IB2014/060917 dated Apr. 8, 2015, 11 pages.
Written Opinion of the International Preliminary Examining Authority for Application No. PCT/SE2014/050282 dated May 6, 2015, 5 pages.

(56) References Cited

OTHER PUBLICATIONS

Written Opinion of the International Preliminary Examining Authority for Application No. PCT/SE2014/050283 dated Mar. 23, 2015, 7 pages.
Ao T., "Thinking on conversation-sensitive frame collection," IEEE Draft, IEEE-SA, AXREV-TINGA-LACP-Extension-1112-V0, Piscataway, NJ, USA., 2012, vol. 802.1, pp. 1-14.
Decision to Grant a Patent from foreign counterpart Russian Patent Application No. 2015149749, dated Jan. 19, 2017, 33 pages.
Draft Standard for Local and Metropolitan Area Networks—Link Aggregation; IEEE P802.1AX-REV/D1.0, IEEE Draft, 802-1AX-REV-D1-0, .1, No. d1-0, Institute of Electrical and Electronics Engineers, Inc., New York, NY, USA., 2013, vol. 802, pp. 1-190.
Finn., "Diagrams to support ballots comments on 802.1AX-REV; axrev-nfinn-DRNI-diagrams-0312-v01," IEEE Draft, AXREV-NFINN-DRNI-Diagrams-0312-A, Piscataway, NJ, USA., 2012, vol. 802 (1), pp. 1-3.
Haddock., "Rough Outline for a Intra-Portal Protocol Version 03," IEEE Draft, AXREV-Haddock-Rough-Intra-Portal-Protocol-0912-V03, SA, Piscataway, NJ, USA., vol. 802, No. v03, IEEE-SA, Piscataway, NJ, USA, Sep. 12, 2012, 12 pages.
IEEE 802.1AC-2012, "Media Access Control (MAC) Service Definition," Standard for Local and metropolitan area networks, Institute of Electrical and Electronics Engineers, Inc. (IEEE), Sep. 14, 2012, 43 pages.
IEEE 802.1ad-2005, "Virtual Bridged Local Area Networks, Amendment 4: Provider Bridges," Standard for Local and metropolitan area networks, Institute of Electrical and Electronics Engineers, Inc. (IEEE), May 26, 2006, 74 pages.
IEEE 802.3-2012, "IEEE Standard for Internet," Section One, 634 pages; Section Two, 780 pages; Section Three, 358 pages; Section Four, 732 pages; Section Five, 844 pages; Section Six, 400 pages; Institute of Electrical and Electronics Engineers, Inc.; Dec. 28, 2012.
IEEE P802.1 aq/D2.1, "Virtual Bridged Local Area Networks, Amendment 9: Shortest Path Bridging," Draft Standard for Local and Metropolitan Area Networks, Institute of Electrical and Electronics Engineers, Inc. (IEEE), Aug. 21, 2009, 208 pages.
IEEE P802.1AX-REV/D0.3, "Link Aggregation," Draft Standard for Local and Metropolitan Area Networks, Institute of Electrical and Electronics Engineers, Inc. (IEEE), Sep. 9, 2012, 183 pages.
IEEE P802.1AX-REV/D0.5, "Link Aggregation," Draft Standard for Local and Metropolitan Area Networks, Institute of Electrical and Electronics Engineers, Inc. (IEEE), Jan. 13, 2013, 190 pages.
IEEE P802.1AX-REV-D4.3, "Link Aggregation," Draft Standard for Local and Metropolitan Area Networks, Institute of Electrical and Electronics Engineers, Inc. (IEEE), Jul. 21, 2014, 320 pages.
IEEE P802.1AX-REV-D4.4b, "Link Aggregation," Draft Standard for Local and Metropolitan Area Networks, Institute of Electrical and Electronics Engineers, Inc. (IEEE), Aug. 31, 2014, 329 pages.
IEEE P802.1Q-REV/D1.0, "Media Access Control (MAC) Bridges and Virtual Bridged Local Area Networks," Draft Standard, Institute of Electrical and Electronics Engineers, Inc. (IIEEE), Apr. 23, 2013, 1791 pages.
IEEE Standard for Local and metropolitan area networks—Link Aggregation; IEEE Std 802.1AX-2008, The Institute of Electrical and Electronics Engineers, Inc., New York, NY, USA, 2008, 162 pages.
IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
International Preliminary Report on Patentability (Chapter I), Application No. PCT/SE2014/050177, dated May 19, 2016, 9 pages.
International Preliminary Report on Patentability for Application No. PCT/IB2014/060912 dated Aug. 7, 2015, 64 pages.
International Preliminary Report on Patentability for Application No. PCT/IB2014/060913 dated Aug. 4, 2015, 50 pages.
International Preliminary Report on Patentability for Application No. PCT/IB2014/060914 dated Aug. 4, 2015, 64 pages.
International Preliminary Report on Patentability for Application No. PCT/IB2014/060915 dated Jul. 30, 2015, 66 pages.
International Preliminary Report on Patentability for Application No. PCT/IB2014/060916 dated Aug. 4, 2015, 64 pages.
International Preliminary Report on Patentability for Application No. PCT/IB2014/060917 dated Aug. 4, 2015, 70 pages.
International Preliminary Report on Patentability for Application No. PCT/IB2015/056545 dated Mar. 9, 2017, 8 pages.
International Preliminary Report on Patentability for Application No. PCT/SE2014/050282 dated Jul. 27, 2015, 23 pages.
International Preliminary Report on Patentability for Application No. PCT/SE2014/050283 dated Jul. 1, 2015, 8 pages.
International Search Report and Written Opinion, Application No. PCT/IB2015/056545 dated Nov. 19, 2015, 9 pages.
International Search Report and Written Opinion for Application No. PCT/IB2014/060912 dated Aug. 28, 2014, 13 pages.
International Search Report and Written Opinion for Application No. PCT/IB2014/060913 dated Aug. 27, 2014, 14 pages.
International Search Report and Written Opinion for Application No. PCT/IB2014/060914 dated Aug. 27, 2014, 14 pages.
International Search Report and Written Opinion for Application No. PCT/IB2014/060915 dated Jul. 30, 2014, 13 pages.
International Search Report and Written Opinion for Application No. PCT/IB2014/060916 dated Jul. 31, 2014, 14 pages.
International Search Report and Written Opinion for Application No. PCT/IB2014/060917 dated Jul. 22, 2014, 14 pages.
International Search Report and Written Opinion for Application No. PCT/SE2014/050282 dated Jul. 29, 2014, 11 pages.
International Search Report for Application No. PCT/SE2014/050177, dated Jul. 15, 2014, 4 Pages.
International Search Report for Application No. PCT/SE2014/050283 dated Jul. 21, 2014, 3 pages.
Non-Final Office Action from U.S. Appl. No. 14/134,966 dated Jun. 17, 2015, 17 pages.
Non-Final Office Action from U.S. Appl. No. 14/135,556 dated Nov. 6, 2015, 34 pages.
Notice of Allowance from U.S. Appl. No. 14/257,871, dated Feb. 23, 2017, 24 pages.
RFC 1058: Hedrick C., "Routing Information Protocol," 1988, 33 pages, Network Working Group, Request for Comments: 1058.
RFC 1142: Oran, "OSI IS-IS Intra-domain Routing Protocol," Feb. 1990, 157 pages, Network Working Group, Request for Comments: 1142.
RFC 1180: Socolofsky T., et al., "A TCP/IP Tutorial," 1991, 28 pages, Network Working Group, Request for Comments: 1180.
RFC 2205: Braden R., et al., "Resource ReSerVation Protocol (RSVP) Version 1 Functional Specification," 1997, 112 pages, Network Working Group, Request for Comment: 2205.
Restriction Requirement for U.S. Appl. No. 15/265,292, dated Jun. 15, 2017, 6 pages.
Notice of Allowance, U.S. Appl. No. 14/257,360, dated Jun. 27, 2016, 26 pages.

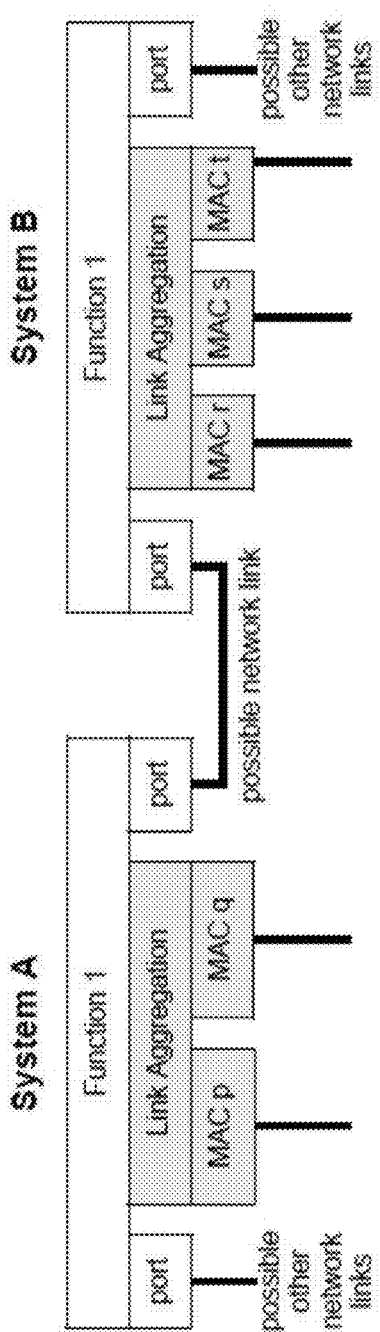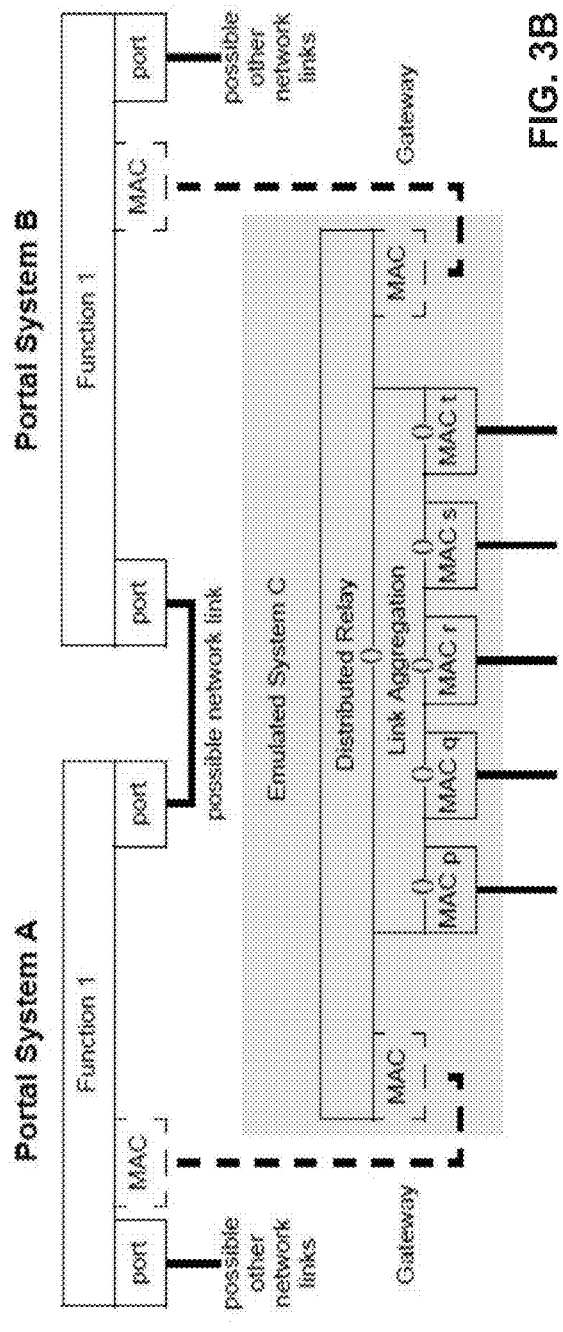
FIG. 3A
FIG. 3B

| | Octets |
|---|---|
| Subtype = DRCP | 1 |
| Version Number | 1 |
| TLV_type = Portal Information | 1 |
| Portal_Information_Length = 18 | 1 |
| Aggregator_Priority | 2 |
| Aggregator_ID | 6 |
| Portal_Priority | 2 |
| Portal_ID | 6 |
| TLV_type = Portal Configuration Information | 1 |
| Portal_Configuration_Information_Length = 46 | 1 |
| Portal System_Number & Aggregator_Key | 2 |
| Port_Algorithm | 5 |
| Gateway_Algorithm | 5 |
| Port_Digest | 16 |
| Gateway_Digest | 16 |
| TLV_type = DRCP State | 1 |
| DRCP_State_Length = 3 | 1 |
| DRCP_State | 1 |
| TLV_type = Home Ports Information | 1 |
| Home_Ports_Information_Length = 2 + 2 * PN | 1 |
| Active_Home_Ports | 2 * PN |
| TLV_type = Neighbor Ports Information | 1 |
| Neighbor_Ports_Information_Length = 2 + 2 * PN | 1 |
| Active_Neighbor_Ports | 2 * PN |
| TLV_type = Other Ports Information | 1 |
| Other_Ports_Information_Length = 2 + 2 * PN | 1 |
| Other_Neighbor_Ports | 2 * PN |
| Other TLVs | X |
| TLV_type = Terminator | 1 |
| TLV_type = Terminator | 1 |

OCTETS WITHIN FRAME TRANSMITTED TOP-TO-BOTTOM

FIG. 5

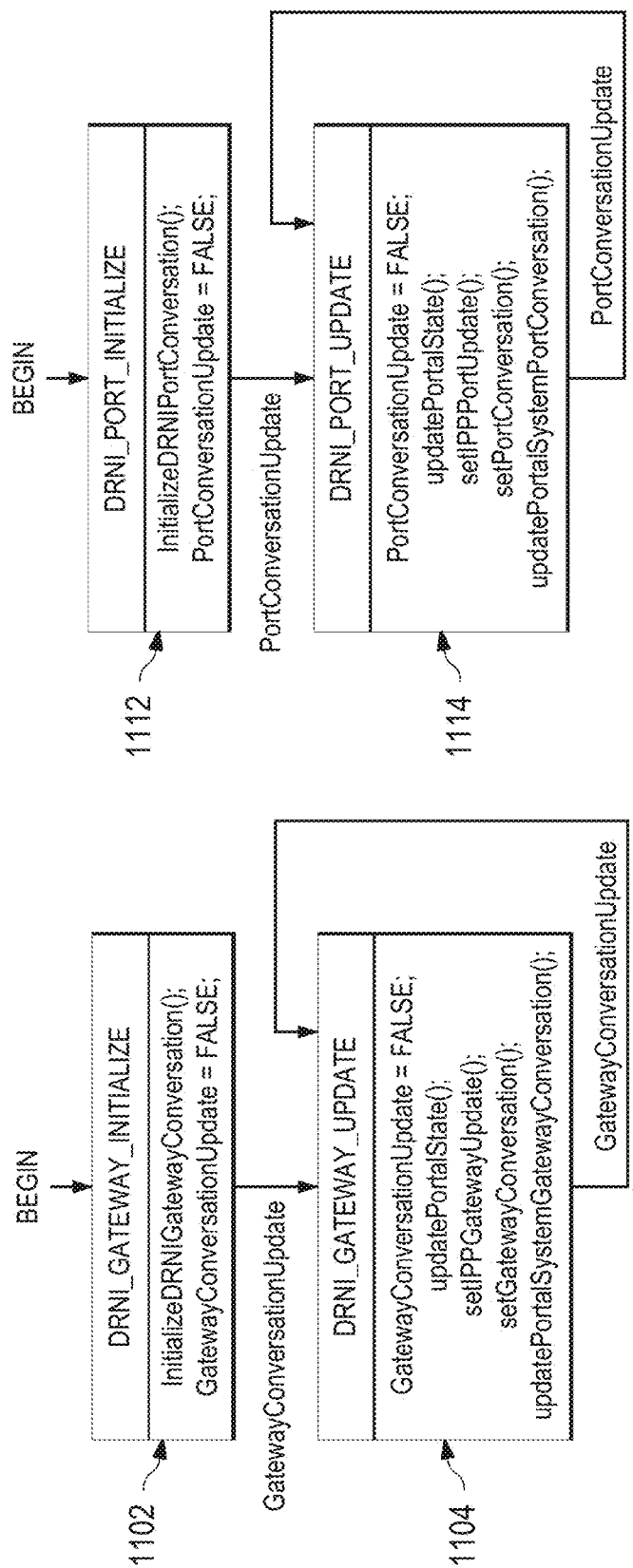

| | Octets |
|---|---|
| Subtype = DRCP | 1 |
| Version Number | 1 |
| TLV_type = Portal Information | 1 |
| Portal_Information_Length = 18 | 1 |
| Aggregator_Priority | 2 |
| Aggregator_ID | 6 |
| Portal_Priority | 2 |
| Portal_Addr | 6 |
| TLV_type = Portal Configuration Information | 1 |
| Portal_Configuration_Information_Length = 44 | 1 |
| Portal System_Number & Aggregator_Key | 2 |
| Port_Algorithm | 4 |
| Gateway_Algorithm | 4 |
| Port_Digest | 16 |
| Gateway_Digest | 16 |
| TLV_type = DRCP State | 1 |
| DRCP_State_Length = 3 | 1 |
| DRCP_State | 1 |
| TLV_type = Home Ports Information | 1 |
| Home_Ports_Information_Length = 2 + 4 * PN | 1 |
| Active_Home_Ports | 4 * PN |
| TLV_type = Neighbor Ports Information | 1 |
|  | 1 |
| Active_Neighbor_Ports | 4 * PN |
| TLV_type = Other Ports Information | 1 |
| Other_Ports_Information_Length = 2 + 4 * PN | 1 |
| Other_Neighbor_Ports | 4 * PN |
| TLV_type = Other Information | 1 |
| Other_Information_Length = 6 | 1 |
| Other Information | 4 |
| Other TLVs | Y |
| TLV_type = Terminator | 1 |
| Terminator_Length = 0 | 1 |

OCTETS WITHIN FRAME TRANSMITTED TOP-TO-BOTTOM

FIG. 14

| Field | Octets |
|---|---|
| Subtype = DRCP | 1 |
| Version Number | 1 |
| TLV_type = Portal Information | 1 |
| Portal_Information_Length = 18 | 1 |
| Aggregator_Priority | 2 |
| Aggregator_ID | 6 |
| Portal_Priority | 2 |
| Portal_Addr | 6 |
| TLV_type = Portal Configuration Information | 1 |
| Portal_Configuration_Information_Length = 45 | 1 |
| Topology_State | 1 |
| Oper_Aggregator_Key | 2 |
| Port_Algorithm | 4 |
| Gateway_Algorithm | 4 |
| Port_Digest | 16 |
| Gateway_Digest | 16 |
| TLV_type = DRCP State | 1 |
| DRCP_State_Length = 3 | 1 |
| DRCP_State | 1 |
| TLV_type = Home Ports Information | 1 |
| Home_Ports_Information_Length = 6 + 4 * PN | 1 |
| Home_Admin_Aggregator_Key | 2 |
| Home_Oper_Partner_Aggregator_Key | 2 |
| Active_Home_Ports | 4 * PN |
| TLV_type = Neighbor Ports Information | 1 |
|  | 1 |
| Neighbor_Admin_Aggregator_Key | 2 |
| Neighbor_Oper_Partner_Aggregator_Key | 2 |
| Active_Neighbor_Ports | 4 * PN |
| TLV_Type = Other Ports Information | 1 |
| Other_Ports_Information_Length = 6 + 4 * PN | 1 |
| Other_Admin_Aggregator_Key | 2 |
| Other_Oper_Partner_Aggregator_Key | 2 |
| Other_Neighbor_Ports | 4 * PN |
| Other TLVs | Y |
| TLV_Type = Terminator | 1 |
| Terminator_Length = 0 | 1 |

OCTETS WITHIN FRAME TRANSMITTED TOP-TO-BOTTOM

FIG. 25

| Bit 0 | Bit 1 | Bit 2 | Bit 3 | ... | Bit 7 |
|---|---|---|---|---|---|
| Portal_System_Number 2910 | | Neighbor_Conf_Portal_System_Number 2912 | | ... | ONN 2914 |

Topology State Illustrated with Topology_State Field 2950

FIG. 29A

| Bit 0 | Bit 1 | Bit 2 | Bit 3 | Bit 4 | Bit 5 | Bit 6 | Bit 7 |
|---|---|---|---|---|---|---|---|
| Portal_System_Number 2910 | | Neighbor_Conf_Portal_System_Number 2912 | | 3_System_Portal | Common Methods | Reserved | ONN 2914 |

Topology State Illustrated with Topology_State Field 2950

FIG. 29B

| TLV_type = Gateway Conversation Vector | |
|---|---|
| Gateway_Conversation_Vector_Length = 512 or 1024 | 2 (Octets) |
| Gateway_Conversation | 512 or 1024 (Octets) |

Gateway Conversation Vector TLV

FIG. 37A

| TLV_type = Port Conversation Vector | |
|---|---|
| Port_Conversation_Vector_Length = 512 or 1024 | 2 (Octets) |
| Port_Conversation | 512 or 1024 (Octets) |

Port Conversation Vector TLV

FIG. 37B

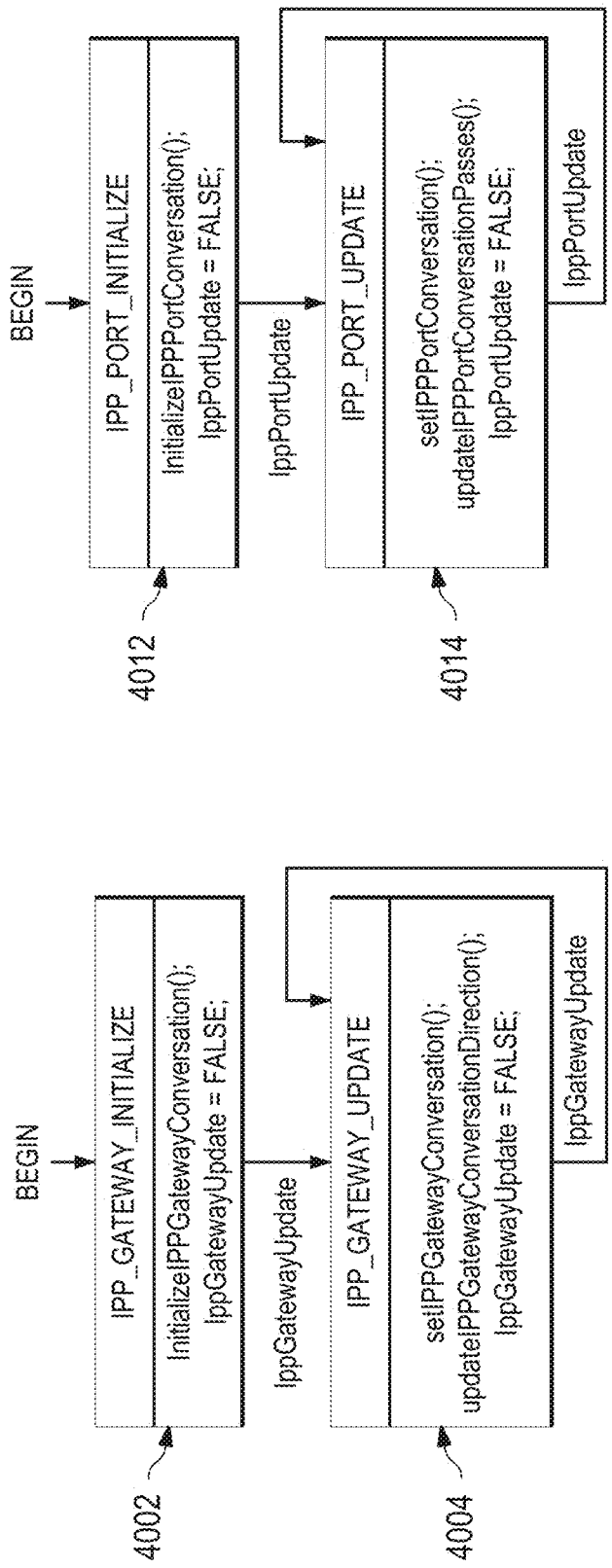

METHOD AND SYSTEM FOR SUPPORTING DISTRIBUTED RELAY CONTROL PROTOCOL (DRCP) OPERATIONS UPON MISCONFIGURATION

CROSS-REFERENCE TO RELATED APPLICATIONS

This application claims priority to U.S. Provisional Patent Application No. 62/043,970, entitled "A Method and System for Supporting Distributed Relay Control Protocol (DRCP) Operations Upon Misconfiguration," filed on Aug. 26, 2014, which is incorporated by reference herein in their entirety.

This application relates to U.S. Provisional Patent Application No. 61/815,204, entitled "A Method and System of Implementing Distributed Resilient Network Interconnect for a Link Aggregation Group," filed on Apr. 23, 2013, U.S. Provisional Patent Application No. 61/839,022, entitled "A Method and System of Implementing Intra-Portal Link of Distributed Resilient Network Interconnect for a Link Aggregation Group," filed on Jun. 25, 2013, U.S. Provisional Patent Application No. 61/865,126, entitled "A Method and System of Implementing Distributed Resilient Network Interconnect for a Link Aggregation Group," filed on Aug. 12, 2013, and U.S. Provisional Patent Application No. 61/902,518, entitled "A Method and System of Implementing Distributed Resilient Network Interconnect for a Link Aggregation Group," filed on Nov. 11, 2013, U.S. Provisional Patent Application No. 61/918,610, entitled "A Method and System of Implementing Distributed Resilient Network Interconnect for a Link Aggregation Group," filed on Dec. 19, 2013, U.S. Provisional Patent Application No. 61/941,977, entitled "A Method and System of Implementing Distributed Resilient Network Interconnect for a Link Aggregation Group," filed on Feb. 19, 2014, U.S. Provisional Patent Application No. 61/953,360, entitled "A Method and System of Implementing Distributed Resilient Network Interconnect for a Link Aggregation Group," filed on Mar. 14, 2014, and U.S. patent application Ser. No. 14/257,637, entitled "A Method and System for Synchronizing with Neighbor in a Distributed Resilient Network Interconnect (DRNI) Link Aggregation Group," filed on Apr. 21, 2014, U.S. Provisional Patent Application No. 61/815,200, entitled "A Method and System of Implementing Conversation-Sensitive Collection for A Link Aggregation Group," filed on Apr. 23, 2013, U.S. Provisional Patent Application No. 61/815,203, entitled "A Method and System of Updating Conversation Allocation In Link Aggregation," filed on Apr. 23, 2013, U.S. Provisional Patent Application No. 61/865,125, entitled "A Method and System of Updating Conversation Allocation in Link Aggregation," filed on Aug. 12, 2013, U.S. patent application Ser. No. 14/135,556, entitled "A Method and System of Updating Conversation Allocation In Link Aggregation," filed on Dec. 19, 2013, U.S. patent application Ser. No. 14/134,966, entitled "A Method and System of Implementing Conversation-Sensitive Collection for a Link Aggregation Group," filed on Dec. 19, 2013, which are incorporated by reference herein in their entirety.

This application is also related to U.S. patent application Ser. No. 14/257,252, entitled "A Method and System for Network and Intra-portal link (IPL) Sharing In Distributed Relay Control Protocol (DRCP)," filed on Apr. 21, 2014, U.S. patent application Ser. No. 14/257,360, entitled "A Packet Data Unit (PDU) Structure for Supporting Distributed Relay Control Protocol (DRCP)," filed on Apr. 21, 2014, U.S. patent application Ser. No. 14/257,769, entitled "A Method and System for Synchronizing With Neighbor In A Distributed Resilient Network Interconnect (DRNI) Link Aggregation Group," filed on Apr. 21, 2014, and U.S. patent application Ser. No. 14/257,859, entitled "A Method and System for Updating Distributed Resilient Network Interconnect (DRNI) States," filed on Apr. 21, 2014, and U.S. patent application Ser. No. 14/257,871, entitled "A Method and System for Supporting Distributed Relay Control Protocol (DRCP) Operations Upon Communication Failure," filed on Apr. 21, 2014, which are incorporated by reference herein in their entirety.

FIELD

The embodiments of the present invention generally relate to link aggregation, and more particularly relate to methods and apparatus for implementing Distributed Resilient Network Interconnect (DRNI) for a Link Aggregation Group (LAG).

BACKGROUND

As illustrated in FIG. 1A, link aggregation is a network configuration and process used to aggregate multiple links between a pair of nodes 120, 122 in the network to enable transmission of user data on each of the links participating in a Link Aggregation Group (LAG) 101 (see, e.g., Institute of Electrical and Electronics Engineers (IEEE) standard 802.1AX). Aggregating multiple network connections in this fashion can increase throughput beyond what a single connection can sustain, and/or can be used to provide resiliency in case of a failure of one of the links. The "Distributed Resilient Network Interconnect" (DRNI) 102 (see Clause 8 of IEEE P802.1AX-REV™/D1.0, entitled "Draft Standard for Local and Metropolitan Area Networks-Link Aggregation," dated Feb. 1, 2013, which is incorporated by reference in its entirety within) specifies extensions to link aggregation in order to be able to use link aggregation on a network interface even between more than two nodes, for example between four nodes K, L, M and O as illustrated in FIG. 1B.

As shown in FIG. 1B, a LAG is formed between Network 150 and Network 152. More specifically, a LAG is formed between LAG virtual nodes or "portals" 112, 114. The first LAG virtual node or portal 112 includes a first node (K) and a second node (L). The second LAG virtual node or portal 114 includes a third node (M) and a fourth node (O). These nodes can also be referred to as "Portal Systems". Note that both the first and second LAG virtual nodes or portals 112, 114 may include a single or more than two nodes in a portal. LAG Nodes K and M are connected as peer nodes, and LAG Nodes L and O are also connected as peer nodes. As used in this application, a "LAG virtual node" refers to a DRNI portal in the IEEE documentation discussed above (i.e., two or more nodes that appear as a single node to their respective peers). Additionally, the statement that virtual node or portal 112 "includes" two nodes K, L means that the virtual node or portal 112 is emulated by the nodes K, L, this can be referred to as an "emulated system." Similarly, the statement that virtual node or portal 114 "includes" two nodes M, O means that the virtual node or portal 114 is emulated by the nodes M, O. Note that link aggregation group 161 is also formed between K-M and L-O links.

Multiple nodes participating in the LAG appear to be the same virtual node or portal with a single System ID to their peering partner in the LAG. The System ID is used to identify each node (e.g., node K, node L, node M, and node O). The System ID is included in Link Aggregation Control Protocol Data Units (LACPDUs) sent between the individual partner nodes of the LAG (e.g., between K and M or between L and O). The System ID can be generated based on identifiers of the constituent nodes of a portal using any individual identifier or any combination thereof. A common and unique System ID for the corresponding LAG virtual node or portal can be consistently generated. Thus, as shown in FIG. 1B, node K and node L belong to the same Network 150 and they are part of the same DRNI Portal 112 (i.e., the same LAG virtual node), and use a common System ID of "K" for the emulated LAG virtual node 112. Similarly, Nodes M and O of Network 152 are seen as a single LAG virtual node or portal 114 with a System ID "M" by Nodes K and L.

FIG. 1B also shows a DRNI link allocation of a particular service (see bold link between K and M in FIG. 1B). The allocated link is the working link between two working nodes K and M for the particular service, while the unallocated link may be provisioned as the protection link between two protection nodes L and O. The service allocation of an interface may involve a Virtual Local Area Network (VLAN), and an identifier for the service may be a VLAN Identifier (VID), such as a Service VID (i.e., "S-VID") (typically identifying services on Network to Network Interfaces (NNIs)) or a Customer VID (i.e. "C-VID") (typically identifying services on User to Network Interfaces (UNIs)). (Note that backbone-VIDs are indistinguishable from S-VIDs as they have the same Ethertype.) In the example of FIG. 1B, the service is allocated to the upper link (between upper nodes K, M). The upper link is thus chosen as the "working" link and the lower link (between nodes L, O) is the "standby" link or "protection" link. Service link allocation, i.e. using the same physical link for frame transmission both in the forward and in the backward directions is highly desirable.

While FIG. 1B shows DRNI portals 112 and 114 each contain two nodes, DRNI portals are not so limited. Each portal may contain one to three nodes. FIG. 1C illustrates a DRNI in an alternate embodiment. Referring to FIG. 1C, link aggregation group 131 contains portal 142 (one network device 130) at one end, and portal 144 (two network devices 132 and 134) at the other end. Also note that FIG. 1C shows a DRNI link allocation of a particular service (see bold link between network devices 130 and 134). The allocated link is the working link between two working nodes (network devices 130 and 134) for the particular service, while the unallocated link may be provisioned as the protection link between two protection nodes (network devices 130 and 132). The working node is a single node in this configuration, but it may contain different sets of aggregation ports for connecting the working and protection links between the portals 142 and 144.

Service providers utilize various embodiments of link aggregation groups (such as illustrated in FIGS. 1A-C and other alternate DRNI systems) to provide services to end-users. How to provide services, particularly through a DRNI system, is a challenge.

SUMMARY

The embodiments of the invention enables operation of portal of a DRNI under misconfiguration of some conversation IDs.

Methods for supporting a distributed resilient network interconnect (DRNI) in a link aggregation group at a network device are disclosed. In one embodiment, the network device and a neighbor network device are included in a first portal of the link aggregation group, where the first portal is coupled via links of the link aggregation group with a second portal including of one or more remote network devices, and where the network device is communicatively coupled to the neighbor network device via an intra-portal port (IPP) using an intra-portal link (IPL). The method includes receiving a distributed relay control protocol data unit (DRCPDU), where the DRCPDU includes neighbor network device's state information and configuration information, where the configuration information includes its operational aggregation key, gateway digest, port digest. The method continues with determining that at least some of the received configuration information is different from the configuration information of the network device; determining whether a portion of the received operational aggregation key is identical to a corresponding portion of an operational aggregation key of the network device; determining whether settings for being three system portal and gateway algorithms are the same upon determining that the portion of the received operational aggregation key is identical to a corresponding portion of an operational aggregation key of the network device; and determining whether the received gateway digest is identical to a gateway digest of the network device upon determining that settings for being three system portal and gateway algorithms are the same. The method then continues with causing not to include a gateway conversation type/length/value (TLV) in a next DRCPDU to be transmitted by the network device to the neighbor network device upon determining that the received gateway digest is identical to the gateway digest of the network device.

Network devices supporting a distributed resilient network interconnect (DRNI) in a link aggregation group are disclosed. In one embodiment, the network device and a neighbor network device are included in a first portal of the link aggregation group, where the first portal is coupled via links of the link aggregation group with a second portal including of one or more remote network devices, and where the network device is communicatively coupled to the neighbor network device via an intra-portal port (IPP) using an intra-portal link (IPL). The network device includes ports coupled to the physical or aggregation link of the link aggregation group and a network processor coupled to the ports, the network processor executing a DRNI function. The DRNI function is operative to: receive a distributed relay control protocol data unit (DRCPDU), where the DRCPDU includes neighbor network device's state information and configuration information, where the configuration information includes its operational aggregation key, gateway digest, and port digest; determine that at least some of the received configuration information is different from the configuration information of the network device; determine whether a portion of the received operational aggregation key is identical to a corresponding portion of an operational aggregation key of the network device; determine whether settings for being three system portal and gateway algorithms are the same upon determining that the portion of the received operational aggregation key is identical to a corresponding portion of an operational aggregation key of the network device; determine whether the received gateway digest is identical to a gateway digest of the network device upon determining that settings for being three system portal and gateway algorithms are the same; and cause not to include a gateway conversation type/length/value (TLV) in a next DRCPDU to be transmitted by the network device to the neighbor network device upon the determination that the received gateway digest is identical to the gateway digest of the network device.

Non-transitory machine-readable storage media for supporting a distributed resilient network interconnect (DRNI) in a link aggregation group are disclosed. The storage media have instructions stored therein, which when executed by a processor, cause the processor to perform operations supporting a DRNI in a link aggregation group at a network device. In one embodiment, the network device and a neighbor network device are included in a first portal of the link aggregation group, where the first portal is coupled via links of the link aggregation group with a second portal including of one or more remote network devices, and where the network device is communicatively coupled to the neighbor network device via an intra-portal port (IPP) using an intra-portal link (IPL). The operations include receiving a distributed relay control protocol data unit (DRCPDU), where the DRCPDU includes neighbor network device's state information and configuration information, where the configuration information includes its operational aggregation key, gateway digest, port digest. The method continues with determining that at least some of the received configuration information is different from the configuration information of the network device; determining whether a portion of the received operational aggregation key is identical to a corresponding portion of an operational aggregation key of the network device; determining whether settings for being three system portal and gateway algorithms are the same upon determining that the portion of the received operational aggregation key is identical to a corresponding portion of an operational aggregation key of the network device; and determining whether the received gateway digest is identical to a gateway digest of the network device upon determining that settings for being three system portal and gateway algorithms are the same. The operations then continue with causing not to include a gateway conversation type/length/value (TLV) in a next DRCPDU to be transmitted by the network device to the neighbor network device upon determining that the received gateway digest is identical to the gateway digest of the network device.

BRIEF DESCRIPTION OF THE DRAWINGS

The invention may best be understood by referring to the following description and accompanying drawings that are used to illustrate embodiments of the invention. In the drawings:

FIG. 3A is a diagram of one embodiment of a basic distributed relay system.

FIG. 3B is a diagram of one embodiment of an emulated system created from two portal systems.

FIG. 5 is a diagram of DRCPDU data structure.

FIGS. 11A-B are flowcharts illustrating DRNI and Aggregator machine operations. FIG. 11A illustrates the DRNI gateway process and FIG. 11B illustrates the DRNI port update process.

FIG. 12A illustrates a state machine to update IPP gateway conversation according to one embodiment of the invention and FIG. 12B illustrates a state machine to update IPP port conversation according to one embodiment of the invention.

FIG. 14 is another diagram of DRCPDU data structure according to one embodiment of the invention.

FIG. 25 is another diagram of DRCPDU data structure according to one embodiment of the invention.

FIG. 29A is another topology state field of a DRCPDU structure according to one embodiment of the invention.

FIG. 29B a third topology state field of a DRCPDU structure according to one embodiment of the invention.

FIG. 37A illustrates a gateway conversation vector TLV according to one embodiment of the invention.

FIG. 37B illustrate a port conversation vector TLV according to one embodiment of the invention.

FIG. 39A illustrates the DRNI gateway process and FIG. 39B illustrates the DRNI port update process.

FIGS. 40A-B are another set of flowcharts illustrating DRNI IPP machine status. FIG. 40A illustrates a state machine to update IPP gateway conversation according to one embodiment of the invention and FIG. 40B illustrates a state machine to update IPP port conversation according to one embodiment of the invention.

DETAILED DESCRIPTION

Figure 1:
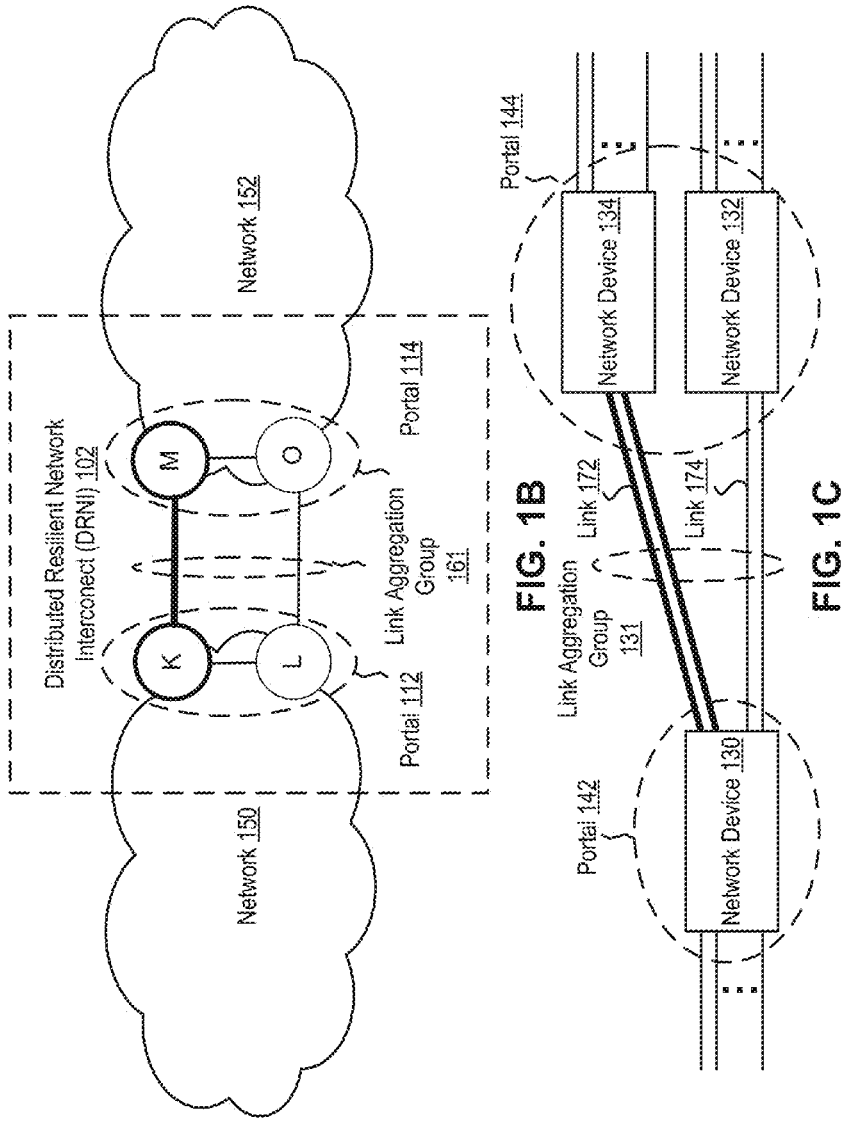
FIG. 1A is a diagram of one embodiment of a Link Aggregation Group between two network devices.
FIG. 1B is a diagram of one embodiment of two Portals connecting two networks via a Link Aggregation Group.
FIG. 1C is a diagram of another embodiment of two Portals connecting two networks via a Link Aggregation Group.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Terms

The following terms may be used in the description.

Actor: The local entity (i.e., node or network device) in a Link Aggregation Control Protocol (LACP) exchange Aggregation Key: A parameter associated with each Aggregation Port and with each Aggregator of an Aggregation System identifying those Aggregation Ports that can be aggregated together. Aggregation Ports in an Aggregation System that share the same Aggregation Key value are potentially able to aggregate together.

Aggregation Port: A Service Access Point (SAP) in an Aggregation System that is supported by an Aggregator.

Aggregation System: A uniquely identifiable entity comprising (among other things) an arbitrary grouping of one or more aggregation ports for the purpose of aggregation. An instance of an aggregated link always occurs between two aggregation systems. A physical device may comprise a signal aggregation system or more than one aggregation system.

Aggregation Client: The layered entity immediately above the Link Aggregation Sublayer, for which the Link Aggregation Sublayer provides an instance of the Internal Sublayer Services (ISS).

Conversation: A set of frames transmitted from one end station to another, where all the frames form an ordered sequence, and where the communicating end stations require the ordering to be maintained among the set of frames exchanged.

Conversation ID: An identifier using values (for example, in the range of 0 4095) to identify conversations.

Data Terminal Equipment (DTE): Any source or destination of data connected to the local area network.

Distributed Relay (DR): A functional entity, distributed over a Portal by a DR Function in each of the Aggregation Systems comprising a Portal, which distributes outgoing frames from Gateways to Aggregators, and distributes incoming frames from Aggregators to Gateways.

Distributed Resilient Network Interconnect (DRNI): Link Aggregation expanded to include each of a Portal and an Aggregation System, or two (or more) Portals.

DR Function: The part of a Distributed Relay residing within a single Portal System.

Gateway: A connection, typically virtual (not a physical link between systems) connecting a Distributed Relay to a System, consisting of a Gateway Link and two Gateway Ports.

Gateway Conversation ID: The Conversation ID value which is used to select frames passing through a Gateway.

Gateway Conversation ID: The Conversation ID value which is used to select frames passing through a Gateway.

Internal Sublayer Service (ISS): An augmented version of the MAC service, defined in IEEE Std 802.1AC-2012.

Intra-Portal Link (IPL): A link used to connect the DR Functions comprising a Distributed Relay.

Link Aggregation Group (LAG): A group of links that appear to an Aggregator Client as if they were a single link.

A Link Aggregation Group can connect two Aggregation Systems, an Aggregation System and a Portal, or two Portals. One or more conversations may be associated with each link that is part of a Link Aggregation Group.

Partner: The remote entity (i.e., node or network device) in a Link Aggregation Control Protocol exchange Port conversation identifier (ID): A conversation identifier value that is used to select frames passing through an Aggregation Port.

Portal: One end of a DRNI; including one or more Aggregation Systems, each with physical links that together comprise a Link Aggregation Group. The Portal's Aggregation Systems cooperate to emulate the presence of a single Aggregation System to which the entire Link Aggregation Group is attached.

Portal System Number: An integer (for example, from 1 through 3, inclusive) uniquely identifying a Portal System within its Portal.

Selection algorithm: The algorithm used to assign frames to Conversation IDs and Conversation IDs to Aggregation Ports and Gateways.

Service ID: A value extracted from a frame's header (VID, I-SID, etc.) that identifies the service instance with which that frame is associated.

Service instance: A service instance is a set of Service Access Points (SAPs) such that a Data.Request primitive presented to one SAP can result in a Data.Indication primitive occurring at one or more of the other SAPs in that set. In the context of operators and customers, a particular customer is given access to all of the SAPs of such a set by the operator Type/Length/Value (TLV): A short, variable length encoding of an information element consisting of sequential type, length, and value fields where the type field identifies the type of information, the length field indicates the length of the information field in octets, and the value field contains the information itself. The type value is locally defined and needs to be unique within the protocol defined in this standard.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions, e.g. a computer program comprising instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. In addition, the control plane also typically include ISO layer 2 control protocols such as Rapid Spanning Tree Protocol (RSTP), Multiple Spanning Tree Protocol (MSTP), and SPB (Shortest Path Bridging), which have been standardized by various standard bodies (e.g., SPB has been defined in IEEE Std 802.1aq-2012).

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network device can store one or more bridging tables that are used to forward data based on the layer 2 information in that data.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

Some network devices provide support for VPLS (Virtual Private LAN Service) (RFC 4761 and 4762). For example, in a VPLS network, subscriber end stations access content/services provided through the VPLS network by coupling to CEs, which are coupled through PEs coupled by other network devices. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

Link Aggregation Sublayer

Figure 2:
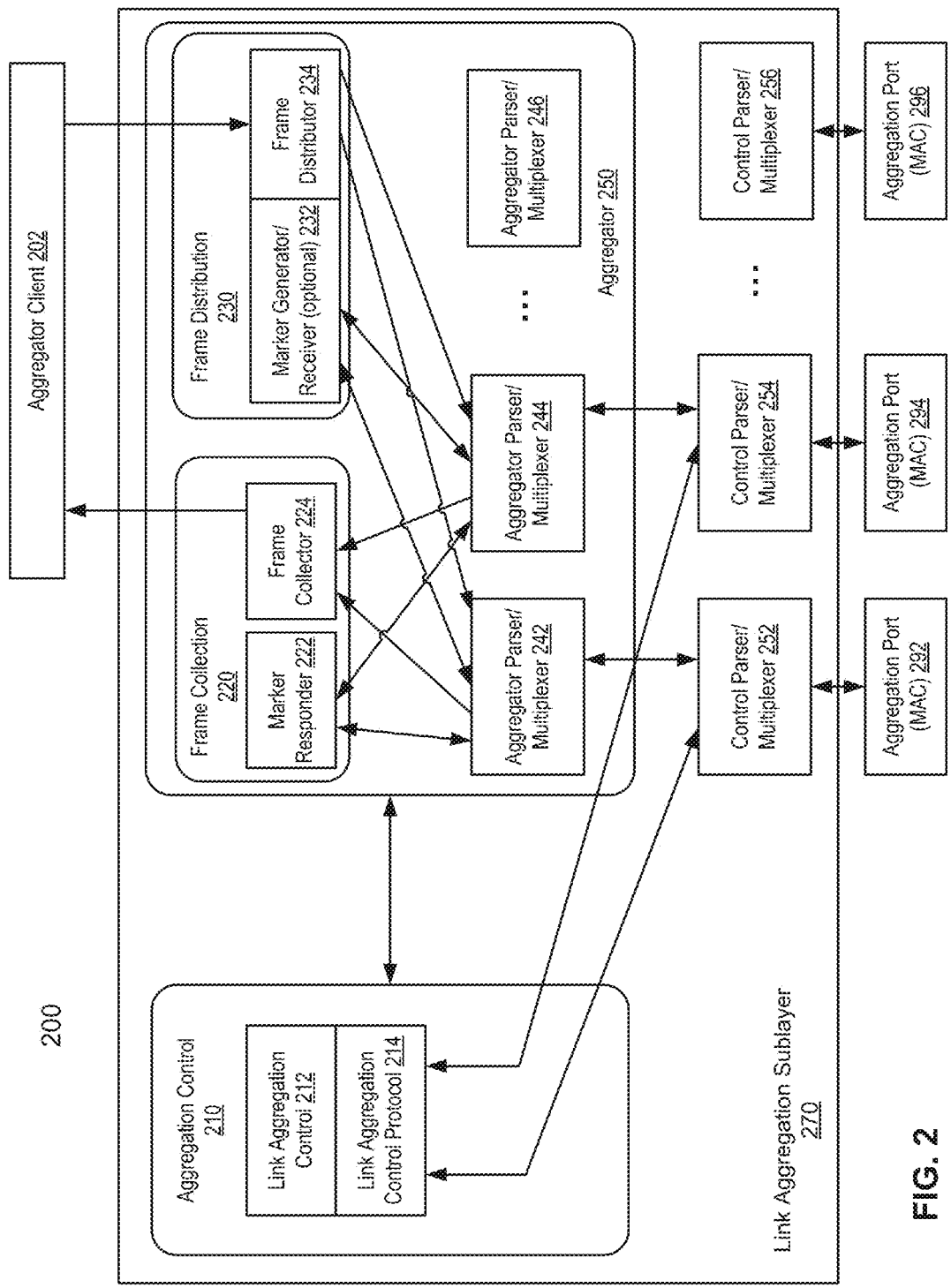
FIG. 2 is a diagram of one embodiment of a Link Aggregation Sublayer.

FIG. 2 is a diagram of one embodiment of Link Aggregation Sublayer 200. Aggregator client 202 communicates with a set of aggregation ports 292, 294, 296 through aggregator 250. In one embodiment, aggregator 250 presents a standard IEEE Std 802.1Q Internal Sublayer Service (ISS) interface to aggregator client 202. Aggregator 250 binds to one or more aggregation ports including aggregation Ports 292, 294, 296. Aggregator 250 distributes frame transmissions from aggregator client 202 to aggregation Ports 292, 294, 296, and to collect received frames from aggregation Ports 292, 294, 296 and pass them to aggregator client 202 transparently.

The binding of aggregation ports 292, 294, 296 to aggregator 250 is managed by link aggregation control 210, which is responsible for determining which links can be aggregated, aggregating them, binding aggregation ports to an appropriate aggregator, and monitoring conditions to determine when a change in aggregation is needed. Such determination and binding can be under manual control through direct manipulation of the state variables of link aggregation (e.g., through aggregation keys) by a network manager. In addition, automatic determination, configuration, binding, and monitoring may occur through the use of Link Aggregation Control Protocol (LACP) 214. LACP 214 uses peer exchanges across the links to determine, on an ongoing basis, the aggregation capability of the various links, and continuously provides the maximum level of aggregation capability achievable between a given pair of Aggregation Systems.

An Aggregation System can contain multiple aggregators, serving multiple aggregator clients. A given aggregation port will bind to (at most) a single aggregator at any time. An aggregator client is served by a single aggregator at a time.

Frame ordering is maintained for certain sequences of frame exchanges between aggregator clients (known as conversations). Frame distributor 234 ensures that all frames of a given conversation are passed to a single aggregation port. For a given conversation, frame collector 224 is required to pass frames to aggregator client 202 in the order that they are received from the aggregation port. Frame collector 224 is otherwise free to select frames received from aggregation ports 292, 294, 296 in any order. Since there are no means for frames to be misordered on a single link, this ensures that frame ordering is maintained for any conversation. Conversations can be moved among aggregation ports within a Link Aggregation Group, both for load balancing and to maintaining availability in the event of link failures.

Aggregation ports 292, 294, 296 are each assigned media access control (MAC) addresses, which are unique over the Link Aggregation Group and to any bridged local area network (LAN) (e.g., one complying with IEEE 802.1Q Bridged LAN) to which the Link Aggregation Group is connected. These MAC addresses are used as the source addresses for frame exchanges that are initiated by entities within Link Aggregation Sublayer 270 itself (i.e., LACP 214 and Marker protocol exchanges).

Aggregator 250 (and other aggregators if deployed) is assigned a MAC address, unique over the Link Aggregation Group and to bridged LAN (e.g., one complying with IEEE 802.1Q Bridged LAN) to which the Link Aggregation Group is connected. This address is used as the MAC address of the Link Aggregation Group from the perspective of the aggregator client 202, both as a source address for transmitted frames and as the destination address for received frames. The MAC address of aggregator 250 may be one of the MAC addresses of an aggregation port in the associated Link Aggregation Group.

Distributed Resilient Network Interconnect (DRNI)

Link aggregation creates a Link Aggregation Group that is a collection of one or more physical links that appears, to higher layers, to be a single logical link. The Link Aggregation Group has two ends, each terminating in an Aggregation System. DRNI expands the concept of link aggregation so that, at either or both ends of a link aggregation group, the single Aggregation System is replaced by a Portal, each composed from one or more Aggregation Systems.

DRNI is created by using a distributed relay to interconnect two or more systems, each running link aggregation, to create a Portal. Each Aggregation System in the Portal (i.e., each Portal System) runs link aggregation with a single aggregator. The distributed relay enables the Portal Systems to jointly terminate a Link Aggregation Group. To all other Aggregation Systems to which the Portal is connected, the Link Aggregation Group appears to terminate in a separate emulated Aggregation System created by the Portal Systems.

The intention is to create DRNI by introducing a Distributed Relay to interconnect two or three Systems, each running Link Aggregation, to create a Portal. Each System in the Portal (i.e., each Portal System) runs Link Aggregation with a single Aggregator. The Distributed Relay is intended to enable the Portal Systems to jointly terminate a Link Aggregation Group. To all other Systems to which the Portal is connected, the Link Aggregation Group shall appear to terminate in a separate emulated System created by the Portal Systems. The above mentioned IEEE 802.1AX-REV/D1.0, does not provide sufficient information with regards to how the Distributed Relay is to function.

Distributed Relays

DRNI is created by using a Distributed Relay to interconnect two or three Systems, each running Link Aggregation, to create a Portal. Each System in the Portal (i.e., each Portal System) runs Link Aggregation with a single Aggregator. The Distributed Relay enables the Portal Systems to jointly terminate a Link Aggregation Group. To all other Systems to which the Portal is connected, the Link Aggregation Group appears to terminate in a separate emulated System created by the Portal Systems.

FIG. 3A illustrates a basic distributed relay system as the starting point for describing the Distributed Relay. The network links depicted in the FIG. 3A and discussed herein correspond to physical or logical links that are visible to and are under the control of network protocols. In this diagram, Systems A and B each are characterized by performing a "Function 1," which is some kind of packet relay function, e.g., a router or a bridge. "Function 1" could also be a file server operation, in which case the outside two "ports" on each System would likely not be present. Each system runs a single instance of a Link Aggregation Sublayer. In one embodiment, it is desired that the shaded ports be associated into a Portal with a Distributed Relay.

FIG. 3A is an example, not the general case. In general, the Distributed Relay supports:

a) The necessary protocols and procedures for only the configurations listed herein below are provided by this application.

b) Link Aggregation functions, each subsuming one or more MACs.

c) Connections among the Portal Systems of the Distributed Relay.

The purpose of introducing the Distributed Relay functional layer in this example is to make these two Portal Systems appear, to the systems connected to them, to be in the configuration illustrated in FIG. 3B. There appears to exist a third emulated System C, connected to the original Portal Systems by a link that has been inserted between Function 1 and Link Aggregation. That is, Portal Systems A and B conspire to behave, insofar as any other Systems to which they are connected can discern, as if emulated System C actually exists, as shown in FIG. 3B. While FIG. 3B is an example, it illustrates the principles of the Distributed Relay:

d) The Distributed Relay in the emulated System C is an (N+1)-port relay for N Portal Systems, with N Gateway Ports connected to the Portal Systems, and a single Emulated Link Aggregation Sublayer associated with the original Portal Systems.

e) The Aggregation Ports (also referred to herein as MACs) have been moved to the emulated System, and thus appear, to all other Systems, to be equally distant from the real Portal Systems comprising the Distributed Relay.

Figure 4:
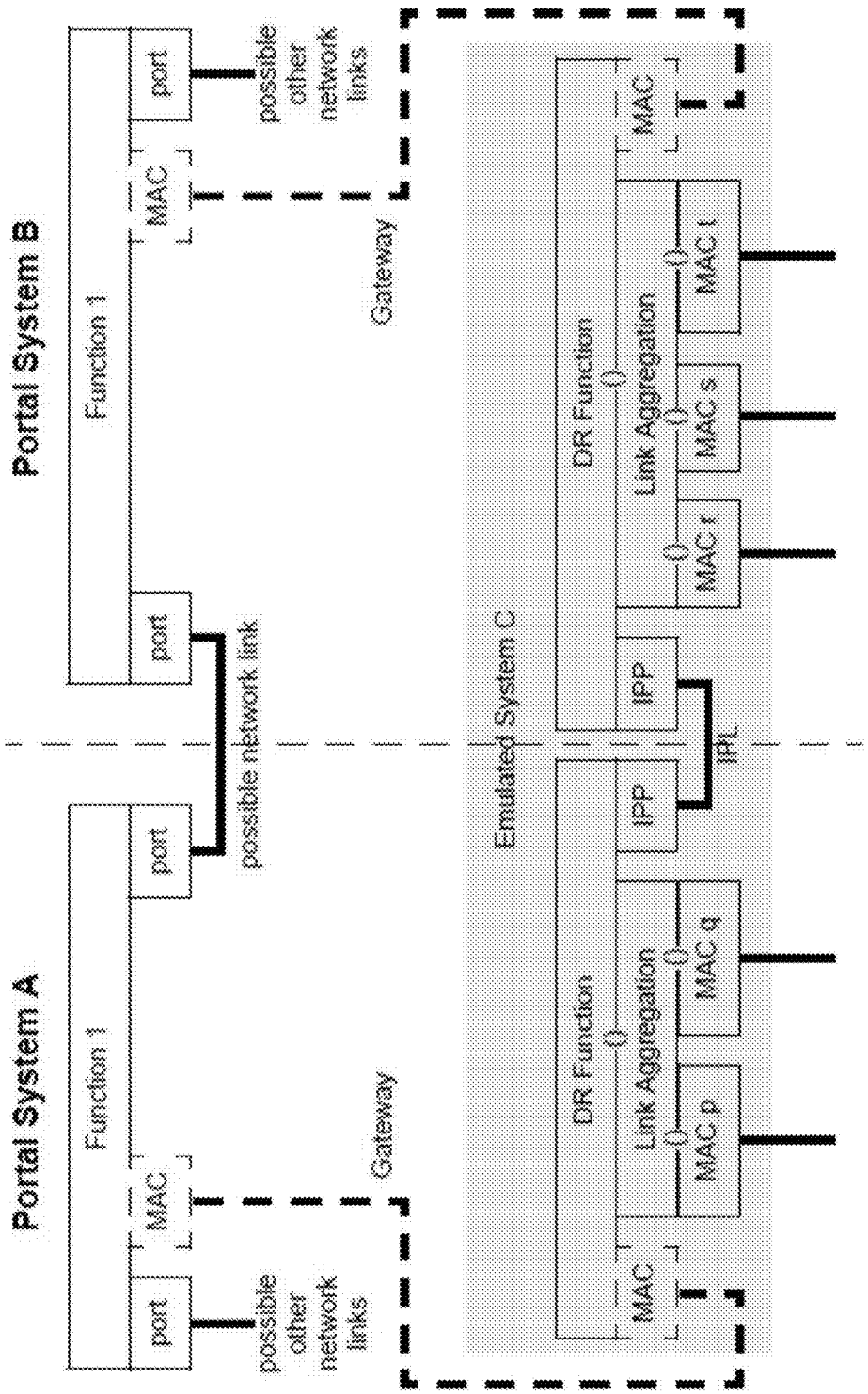
FIG. 4 is a diagram of one embodiment of two DR functions of a distributed relay.

The actual constructs used by the two Portal Systems to create the emulated System C are illustrated in FIG. 4. FIG. 4 shows the two DR Functions of the Distributed Relay, one DR Function in each System A and B. This example illustrates the remaining principles of the Distributed Relay:

f) In each System A and B, the ports that are to be associated with System C are moved to a position below the DR Function's Link Aggregation Sublayer.

g) A virtual link and its terminating virtual MACs, called a "Gateway," is constructed to connect each DR Function to its Function 1.

h) Between each pair of DR Functions in the Portal there is constructed an Intra-Portal Link (IPL), terminated at each end by an Intra-Portal Port (IPP). (This can exist in many forms; see discussion herein below)

i) There is a "Gateway algorithm" that decides through which Gateway a frame can pass into or out of the emulated Distributed Relay.

j) Similarly, a "Port algorithm" decides through which Portal System's Aggregation Ports a frame can pass into or out of the emulated Distributed Relay.

k) As mentioned above, there can be three Systems participating to create a Portal and a emulated System C. In that case, the Distributed Relay in emulated System C has an additional Gateway Port, one to each Portal System, and IPLs to interconnect the DR Functions.

l) The DR Functions, as specified herein below, work together to move frames between the Gateways, the IPL, and the Link Aggregation sublayers.

Distributed Relay Operation and Procedures

The DR Function in each Portal System (FIG. 4) is intended to have (subject to operational failures) three kinds of ports:

A) Intra-Portal Ports, at most one (perhaps complex in some embodiment) IPL Port connected to each of the other Portal System(s) belonging to the same Portal;

B) Exactly one virtual Gateway Port with a virtual Link to a virtual Gateway Port in the Portal System in which the DR Function resides; and C) Exactly one Aggregator Port (the port that is supported by the ISS instance identified by the prefix Agg) to the Link Aggregation sublayer with any number of Aggregation Ports, intended to connect to other systems in a manner such that those other Systems believe they are connected to a single emulated System.

In FIG. 3B, the Intra-Portal Links and IPL Ports are not visible, and the Distributed Relay of the emulated Aggregation System C has one Gateway to each of the Systems in its Portal.

The purpose of the emulated Distributed Relay is to pass every frame received from an Aggregation Port ("up frame") to a Gateway, or to discard it, and every frame received from a Gateway ("down frame") to an Aggregator Port, or discard it. The DR Functions comprising the Distributed Relay sometimes must send a frame across one or two Intra-Portal Links in order to get it to the correct Gateway or Aggregator Port. A DR Function makes the choice of whether to discard or pass a frame to its Gateway, Aggregator Port, or one of its IPLs by assigning every frame to two Conversation IDs, a Gateway Conversation ID and a Port Conversation ID, and configuring the Gateways, Aggregation Ports, and IPLs in terms of these Conversation IDs.

The "Gateway algorithm" mentioned consists of two parts, an algorithm for assigning any given frame to a Gateway Conversation ID, and an assignment of Gateway Conversation IDs to Gateways (e.g., using Drni_Gateway_Conversation).

If the Portal System is a VLAN Bridge performing learning, the mapping of a frame to a Getaway Conversation ID will be based on its VLAN ID, otherwise the learning process breaks throughout the network. For implementations of DRNI in these cases there can be a one-to-one map of VLAN ID to Conversation ID.

Similarly, the "Port algorithm" of item j in "Distributed Relays" section above consists of an algorithm for assigning any given frame to a Port Conversation ID, and an assignment of Port Conversation IDs to Aggregation Ports (using aAggConversationAdminPort[ ] for example).

Means are specified herein below to ensure that all of the DR Functions on a given Portal use the same Gateway algorithm and the same Port algorithm for assigning frames to their respective Conversation IDs, and to guarantee that any given Gateway Conversation ID is assigned to at most one of the Gateways, and any given Port Conversation ID to at most one of the Aggregation Ports of a Portal, at any given moment.

It is allowed, but not required, that the Gateway algorithm and the Port algorithm use the same means for assigning a frame to a Conversation ID, so that the Gateway Conversation ID equals the Port Conversation ID.

The Port algorithm is always applied to a frame as it enters the DR Function from the Gateway to determine whether to send it to the Aggregator Port or to a particular IPP. The Gateway algorithm is always applied to a frame as it enters from the Aggregator Port to determine whether to send it to the Gateway or to a particular IPP. Both algorithms have to be applied, and their results compared, in order to forward a frame entering a DR Function from an IPL, as shown in Table 1.

TABLE 1

DR Function: forwarding frame received from Intra-Portal Link n

| Gateway algorithm says, "Gateway is . . . " | Port algorithm says, "Aggregation Port is . . . " | DR Function emits frame to: |
|---|---|---|
| my Gateway behind IPL n | Any* | my Gateway |
| | one of my Aggregation Ports behind IPL n | my Aggregator Port |
| | behind IPL m (≠ n) | discard IPL m (≠ n) |
| behind IPL m (≠ n) | any[1] | IPL m (≠ n) |

A) [1] "Any" means that the output from the Port algorithm is not used; the Gateway algorithm determines to which port the frame is sent.

B) [2] DR Functions in different Portal Systems have incompatible configurations, or there is a malfunction. Discard frame to prevent looping.

C) Table 1 assumes one of three configurations:
Two Portal Systems connected by a single IPL;
Three Portal Systems connected linearly by two IPLs; or
Three Portal Systems connected circularly by three IPLs.

D) The Gateway algorithm is enforced in both directions through the Gateway; that is, a frame entering the DR Function from a Gateway is discarded if the Gateway algorithm, applied to that frame, would not send it back up the Gateway. This is necessary to prevent frames received from a Gateway being forwarded across an IPL and passed back into the network through another Gateway.

E) If the Gateway algorithm indicates that the frame should pass through the Gateway, it must be an up frame, because a down frame could not enter the Portal from any other DR Function, by item D) above.

F) Otherwise, if the Gateway algorithm indicates that the frame came from the IPL to which it would be forwarded, then it is a down frame, and so is forwarded using the Port algorithm. (If the Port algorithm would send it back on the port on which it arrived, there is some sort of malfunction or misconfiguration, and the frame is discarded.)

G) Otherwise, the Gateway algorithm indicates that the frame did not come from the IPL to which it would be forwarded, so it must be an up frame, and the frame is directed according to the Gateway algorithm.

NOTE—The Port algorithm and Distributed Relay Control Protocol of the Distributed Relay together determine the mapping of Port Conversation IDs to individual Aggregation Ports, and the variables in their control determine the operation of the Frame Distributor and Frame Collector. However, this does not alter the path of data and control as described, since the Distributed Relay passes all data to or from the Aggregation Ports through the Aggregator.

The application of the Gateway and Port algorithms on frames entering a DR Function from a Gateway and an Aggregator Port, as shown in Table 2 and Table 3 respectively.

TABLE 2

DR Function: forwarding frame received from my Gateway

| Gateway algorithm says, "Gateway is . . . " | Port algorithm says, "Aggregation Port is . . . " | DR Function emits frame to: |
|---|---|---|
| my Gateway | one of my Aggregation Ports behind IPL n | my Aggregator Port |
| | | IPL n |
| behind IPL n | any | discard |

TABLE 3

DR Function: forwarding frame received from one of my Aggregation Ports

| Gateway algorithm says, "Gateway is . . . " | Port algorithm says, "Aggregation Port is . . . " | DR Function emits frame to: |
|---|---|---|
| my Gateway | any | my Gateway |
| behind IPL n | any | IPL n |

Portal Topology

Figure 21:
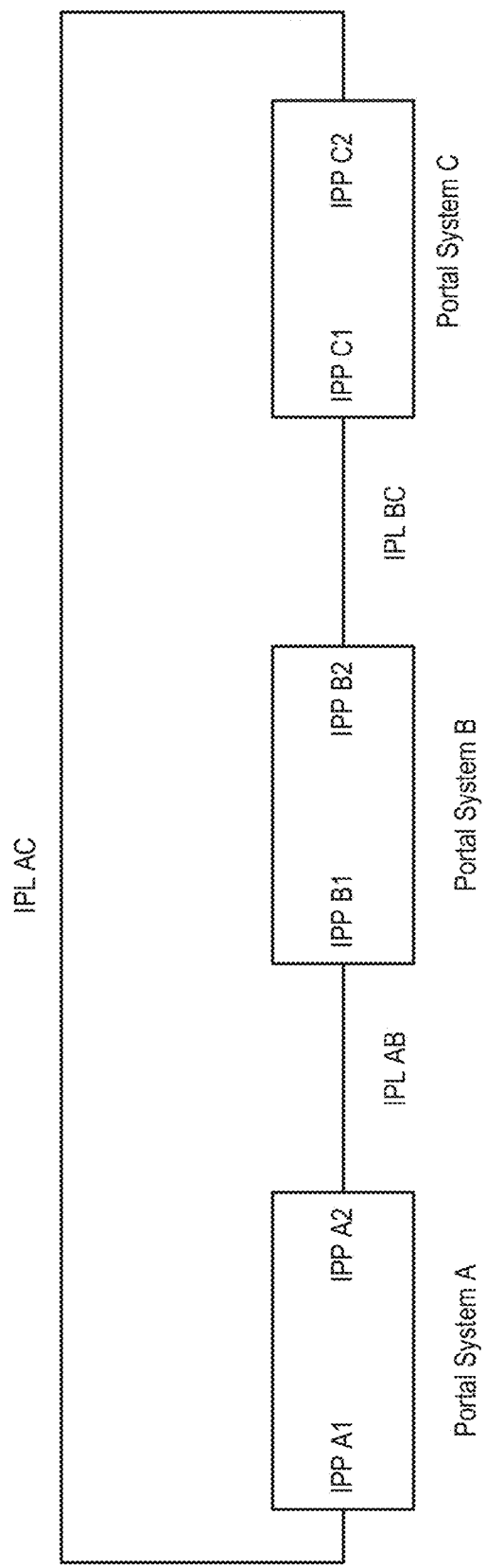
FIG. 21 is a diagram of portal topology according to one embodiment of the invention.

The most general topology of Portal is three Portal Systems connected in a ring by three Intra-Portal Links as illustrated in FIG. 21. Other supported topologies according to other embodiments of the invention are subsets of this, including:

Three Portal Systems connected in a chain by two IPLs,
Two Portal Systems connected by a single IPL,
A Portal System with no active IPLs.

The terms Home, Neighbor, and Other neighbor are used to identify the Portal Systems from the point of view of a given Intra-Portal Port. The Home is the system containing the IPP. The Neighbor is the system connected to the IPP. The Other neighbor is the system connected to the other IPP (if present) in the Home system. Referring to FIG. 21, using IPP B1 for an example, its home system is B, its immediate neighbor is A (because it is connected to IPP B1 via IPL AB), and its other neighbor is C (because it is connected to IPP B2 via IPL BC). Note that the Other neighbor of IPP A2 is also C (because it is connected to IPP A1 via IPL AC), so comparing the IDs of the Other neighbors of IPPs B1 and A2 verifies that there are no more than three systems in a ring or chain.

Intra-Portal Link

An Intra-Portal Link (IPL) is a single logical point-to-point link between DR Functions in two different Systems. A DR Function has at most one IPL for each of the other Systems comprising one end of a DRNI Link Aggregation Group. IPLs and network links can share a physical link or link aggregation (link aggregation being an aggregate of a set of links).

An IPL can be physical (e.g., an 802.3 Ethernet LAN) or logical (e.g., a 802.1Q Backbone Service Instance or an IETF pseudo wire). An Intra-Portal Link can share a physical link with other Intra-Portal Links or network links. An Intra-Portal Link can be a Link Aggregation Group, and thus consist of a number of physical links.

It will often be the case in deployed networks that two Systems will be configured with both a normal network link connecting them, and an IPL, as illustrated in FIG. 4. It would reduce the utility of DRNI if every Portal required its own separate physical IPL, especially if a pair of Systems is configured to support multiple Portals. DRNI supports a number of methods by which the Systems can distinguish frames on a network link from frames on a particular IPL:

Physical. A separate physical link can be used to support any particular network link or IPL.

Aggregated. A separate Aggregator Port can be used for supporting an IPL.

Time-shared. A network link and one or more IPLs can use the same physical link (or Aggregator Port), but at different times. This requires that the Systems disable the use of the network link when the IPL is required for connectivity, or else that the use of the Aggregation Links and the selection of Gateways be adjusted to eliminate the need for using the IPL when the network link is required. This technique is described herein.

Tag-shared. A network link and one or more IPLs can use the same physical link (or Aggregator Port), using different Service IDs. Tag sharing is described herein.

Logical. The frames on the network link and the IPL(s) can be encapsulated, as described herein.

A System implementing the DRNI may support using separate physical links for IPLs and network links, and may support any of the other methods.

At each end of the shared physical link or Aggregator Port, there is one virtual port for each function (network link or a particular IPL) that the link or Aggregator Port is used for. Any of the above methods can be used simultaneously between two Systems, by administrative choice, as long as both ends of any given physical link or Aggregator Port use the same method.

Network/IPL Sharing by Time

The goal of Network/IPL sharing by time is to support DRNI without requiring separate physical links for a network connection and the IPL, and without requiring any frame modification. When sharing a link, it is necessary to be able to determine for each frame whether that frame is intended to be traversing the network connection or the IPL. This determination can be made without modifying the frame (e.g. without translating the VLAN ID or adding a tag or encapsulation) if at any given time the physical link is known to be only used as a network link or only used as an IPL. Whether the link is used as a network link or an IPL at any given time is established by the control protocol used to establish a fully-connected, loop-free active topology for each VLAN in the network.

If the link is not included in the active topology of a VLAN (e.g. it has been blocked by the operation of the network control protocol), it is available to be used as the IPL. In this case the link is used by DRNI just as if it were a dedicated (unshared) IPL.

If the link is included in the active topology of a VLAN, then there is no IPL available for that VLAN. In this case the DRNI is unable to pass a frame between an Aggregation Port in one Portal System and a Gateway in another Portal System. Therefore for any given frame, DRNI is restricted to have the Gateway and the Aggregation Port in the same Portal System.

NOTE 1—The fact that the shared link can be unavailable for the transfer of frames between a Gateway and a specific Aggregation Port does not restrict the ability to exchange DRCPDUs on the shared link.

There are two cases to consider in meeting the restriction that for any given frame the Gateway and the Aggregation Port are in the same Portal System. The straightforward case is when the Port Conversation IDs are agreed and symmetric across the DRNI, and all frames with a given VLAN ID map to the Port Conversation IDs that select Aggregation Ports in the same Portal System. Then that Portal System is selected as the Gateway for that VLAN ID, and there is no need for any data frames to traverse the IPL. In any other circumstance the only way to assure that the Gateway and a specific Aggregation Port are in the same Portal System is that when a frame is received on any port other than the shared network/IPL port, that Portal System is considered the Gateway for that frame and in each Portal System all Port Conversation IDs map to an Aggregation Port attached to that System. In this mode, a Portal System which receives any frame on a network port (not being the IPP or the Aggregation Port) is responsible for forwarding that frame to the Aggregation Port if required. A Portal System which receives a frame on the IPP never forwards that frame to the Aggregation Port. In this case the gateway selection cannot necessarily be based on VID, so when the Portal Systems are 802.1Q Bridges the learning process on the shared network/IPL link is compromised. Because the learning issues are limited to this port, it can be remedied by synchronizing the addresses learned on the DRNI with the other Portal System.

Network/IPL Sharing by Tag

If per-service frame distribution is employed, and if the number of services required to support the network link, plus the number of services required to support one or more IPLs, is less than the number of services supplied by the frame format used (e.g., 4094 S-VLAN IDs), then VID translation can be used to separate the frames on the different logical links.

The method is selected by configuring the aDrniEncapsulationMethod with the value 2. If enabled, as indicated by the variable Enabled_EncTag_Shared which is controlled by the Network/IPL sharing machine, every frame which is to be transported by the IPL to the Neighbor Portal System and is associated with a Gateway Conversation ID, is translated to use a value configured in aDrniIPLEncapMap and every frame, that is to be transported by network link, shared with the IPL, and is associated with a Gateway Conversation ID, is translated to use a value configured in aDrniNetEncapMap.

Network/IPL Sharing by Encapsulation

This method enables sharing an IPL with a network link by using encapsulation techniques (e.g., an 802.1Q Backbone Service Instance, a B-VLAN, an IETF pseudowire, etc.)

The method is selected by configuring the aDrniEncapsulationMethod with a value representing the encapsulation method that is used to transport IPL frames (date frames passing through an IPL, i.e., non DRCPDU carrying frames) to the Neighbor Portal System when the IPL and network link are sharing the same physical link. This value consists of the three-octet Organization Unique Identifier (OUI) identifying the organization which is responsible for this encapsulation and one following octet used to identify the encapsulation method defined by that organization. If enabled, as indicated by the variable Enabled_EncTag_Shared which is controlled by the Network/IPL sharing machine, every frame, that is to be transmitted on the IPL to the Neighbor Portal System and is associated with a Gateway Conversation ID, is encapsulated with a method specified by aDrniEncapsulationMethod to use a value configured in aDrniIPLEncapMap and every frame, that is received by the IPL is de-encapsulated and mapped to a Gateway Conversation ID using the same table.

DR Function State Machine

The DR Function state machines shall implement the forwarding rules specified in Tables 1-3. These forwarding rules can be summarized as follows:

a) For frames entering through an Aggregation Port, Up frames, the Gateway algorithm decides whether to transmit it to the Gateway link or to the IPP according to its Gateway Conversation ID. If the frame's Gateway Conversation ID matches the Portal System's operational Gateway Conversation ID, the frame will be forwarded to the Gateway, otherwise it will be forwarded to the IPP.

b) For frames entering through a Gateway, Down frames, the Port algorithm decides whether to transmit it to the Aggregation Port or to the IPP according to its Port Conversation ID. If the frame's Port Conversation ID matches the Portal System's operational Port Conversation ID, the frame will be forwarded to the Aggregation Port, otherwise it will be forwarded to the IPP.

c) An Up frame offered to an IPP is only transmitted if the Portal System for this Gateway Conversation ID lies behind that IPP, otherwise it is discarded.

d) A Down frame offered to an IPP is only transmitted if the target Portal System for this Port Conversation ID lies behind that IPP, otherwise it is discarded.

Some of the Link Aggregation variables used by a Distributed Relay have to be formed in a particular manner, so that multiple Portal Systems can cooperate to create a single emulated System:

e) The two least significant bits of the Port Priority in the Port ID for each Aggregation Port in a Distributed Relay's Aggregator Port are set to the value of DRF_Portal_System_Number. The remainder of the bits is assigned a value unique within the DR Function.

f) The most significant two bits of the Administrative Key for each Aggregation Port and associated Aggregator in a Distributed Relay's Aggregator Port is set to the value of DRF_Portal_System_Number. The remainder of the bits can be used as described to reflect the physical characteristics of the Aggregation Ports.

Service Interfaces

Since a DR Function uses various instances of the ISS, it is necessary to introduce a notation convention so that the reader can be clear as to which interface is being referred to at any given time. A prefix is therefore assigned to each service primitive, indicating which of the interfaces is being invoked. The prefixes are as follows:

a) Agg: for primitives issued on the interface between the DR Function and the Link Aggregation sublayer.

b) Gate: for primitives issued on the Gateway.

c) MacIppN: for primitives issued on the interface between the MAC entities supporting the IPL n and the DRCP Control Parser/Multiplexer.

d) DRCPCtrlMuxN: for primitives issued on the interface between DRCP Control Parser/Multiplexer N and the DRCP control entity (where N is identifying the IPP associated with the DRCP Control Parser/Multiplexer).

e) IppN: for primitives issued on the interface of the DR Function supported by the DRCP Control Parser/Multiplexer N (where N is identifying the IPP associated with the DRCP Control Parser/Multiplexer).

Per-DR Function Variables

The following discussion focuses on a variety of pre-DR function variables according to one embodiment of the invention.

DA: Destination Address

SA: Source Address mac_service_data_unit

Priority: The parameters of the M_UNITDATA.indication primitive.

BEGIN: A Boolean variable that is set to TRUE when the System is initialized or reinitialized, and is set to FALSE when (re-)initialization has completed.

Value: Boolean

Drni_Portal_System_Gateway_Conversation: Operational Boolean vector, indexed by Gateway Conversation ID, indicating whether the indexed Gateway Conversation ID is allowed to pass through this DR function's Gateway (TRUE=passes). Its values are computed by the updatePortalSystemGatewayConversation function in one embodiment In another embodiment, this variable is constructed from the Drni_Gateway_Conversation, by setting to FALSE, all the indexed Gateway Conversation ID entries that are associated with other Portal Systems in the Portal and, of the remaining indexed Gateway Conversation ID entries, all that are not in agreement with other Portal Systems.

Value: sequence of Boolean values, indexed by Gateway Conversation ID.

Drni_Portal_System_Port_Conversation: Operational Boolean vector, indexed by Port Conversation ID, indicating whether the indexed Port Conversation ID is allowed to be distributed through this DR function's Aggregator (TRUE=passes). Its values are computed by the updatePortalSystemPortConversation in one embodiment. In another embodiment, this variable is constructed from the Drni_Port_Conversation, by setting to FALSE all the indexed Port Conversation ID entries that are associated with other Portal Systems in the Portal and, of the remaining indexed Gateway Conversation ID entries, all that are not in agreement with other Portal Systems.

Value: sequence of Boolean values, indexed by Port Conversation ID.

Messages

Agg:M_UNITDATA.indication

Gate:M_UNITDATA.indication

IppN:M_UNITDATA.indication

Agg:M_UNITDATA.request

Gate:M_UNITDATA.request

IppN:M_UNITDATA.request

The service primitives used to pass a received frame to a client with the specified parameters.

Figure 22:
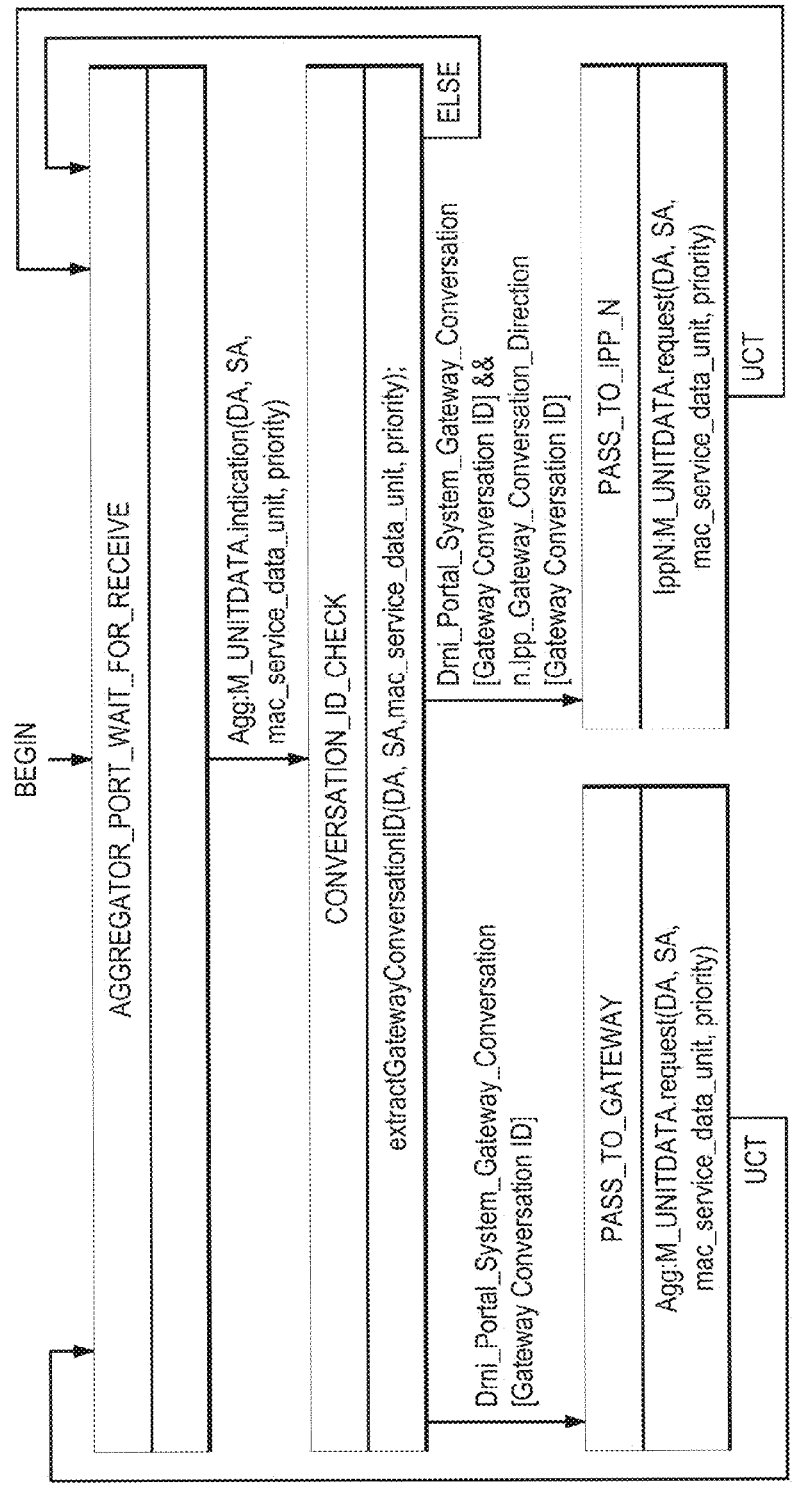
FIG. 22 is a diagram of an aggregator port reception state machine according to one embodiment of the invention.

If Network/IPL sharing by tag, or Network/IPL sharing by encapsulation methods are used, the service primitives IppN:M_UNITDATA.indication and IppN:M_UNITDATA.request need to be manipulated through the operation of functions which are controlled by the Network/IPL sharing machine DR Function: Aggregator Port Reception State Machine The DR Function: Aggregator Port reception state machine may implement the function specified in FIG. 22 with its associated parameters according to one embodiment of the invention. There is one DR Function: Aggregator Port reception state machine per Portal System and there are as many PASS_TO_IPP_N states as IPPs in a Portal System, each identified by the index n, The prefix "n." in the diagram is used to identify the specific IPP n that the associated variable is related to.

DR Function: Gateway Distribution State Machine

Figure 23:
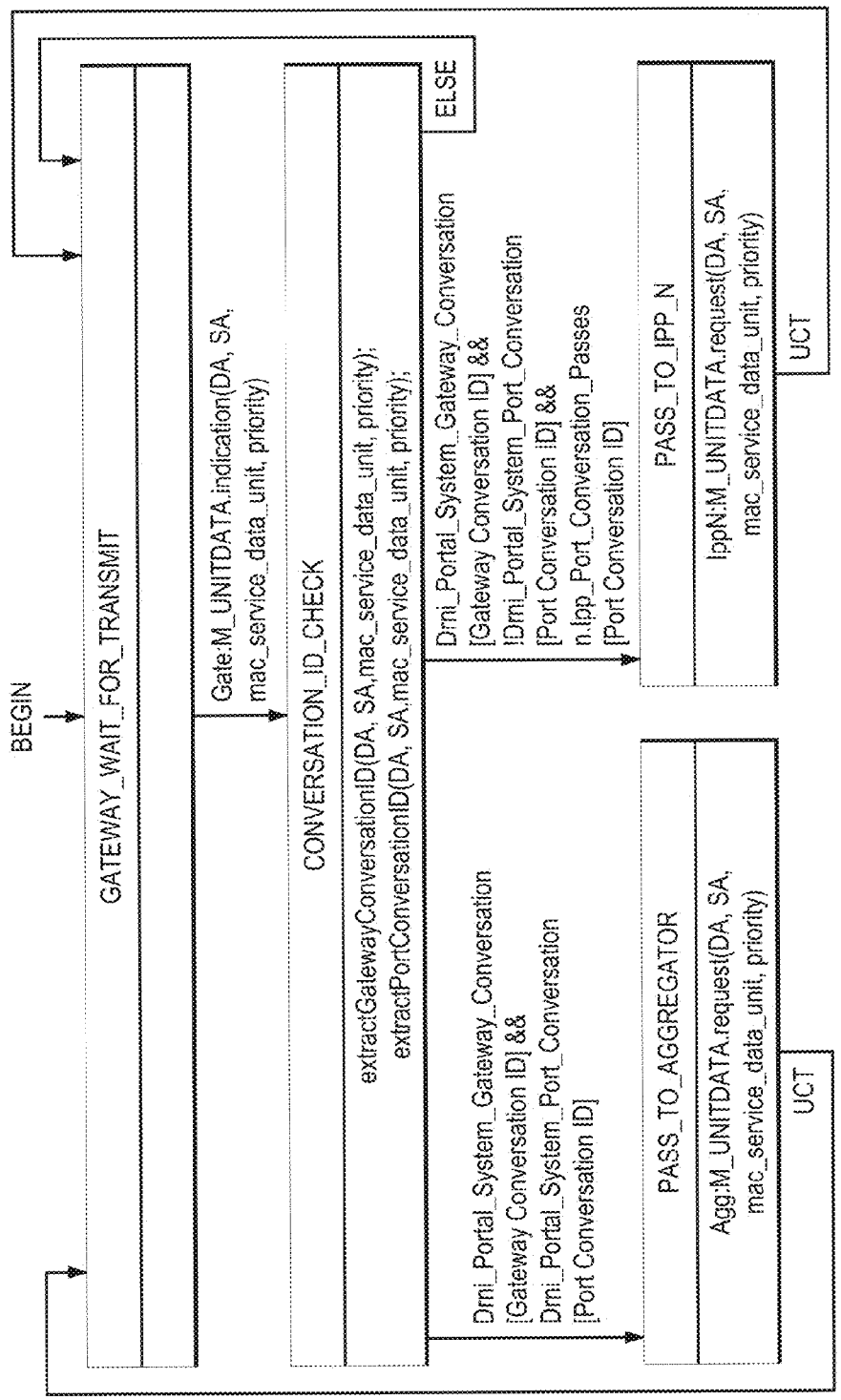
FIG. 23 is a diagram of a gateway distribution state machine according to one embodiment of the invention.

The DR Function: Gateway distribution state machine may implement the function specified in FIG. 23 with its associated parameters according to one embodiment of the invention. There is one DR Function: Gateway distribution state machine per Portal System and there are as many PASS_TO_IPP_N states as IPPs in a Portal System, each identified by the index n. The prefix "n." in the diagram is used to identify the specific IPP n that the associated variable is related to.

DR Function: IPP N Reception State Machine

Figure 24:
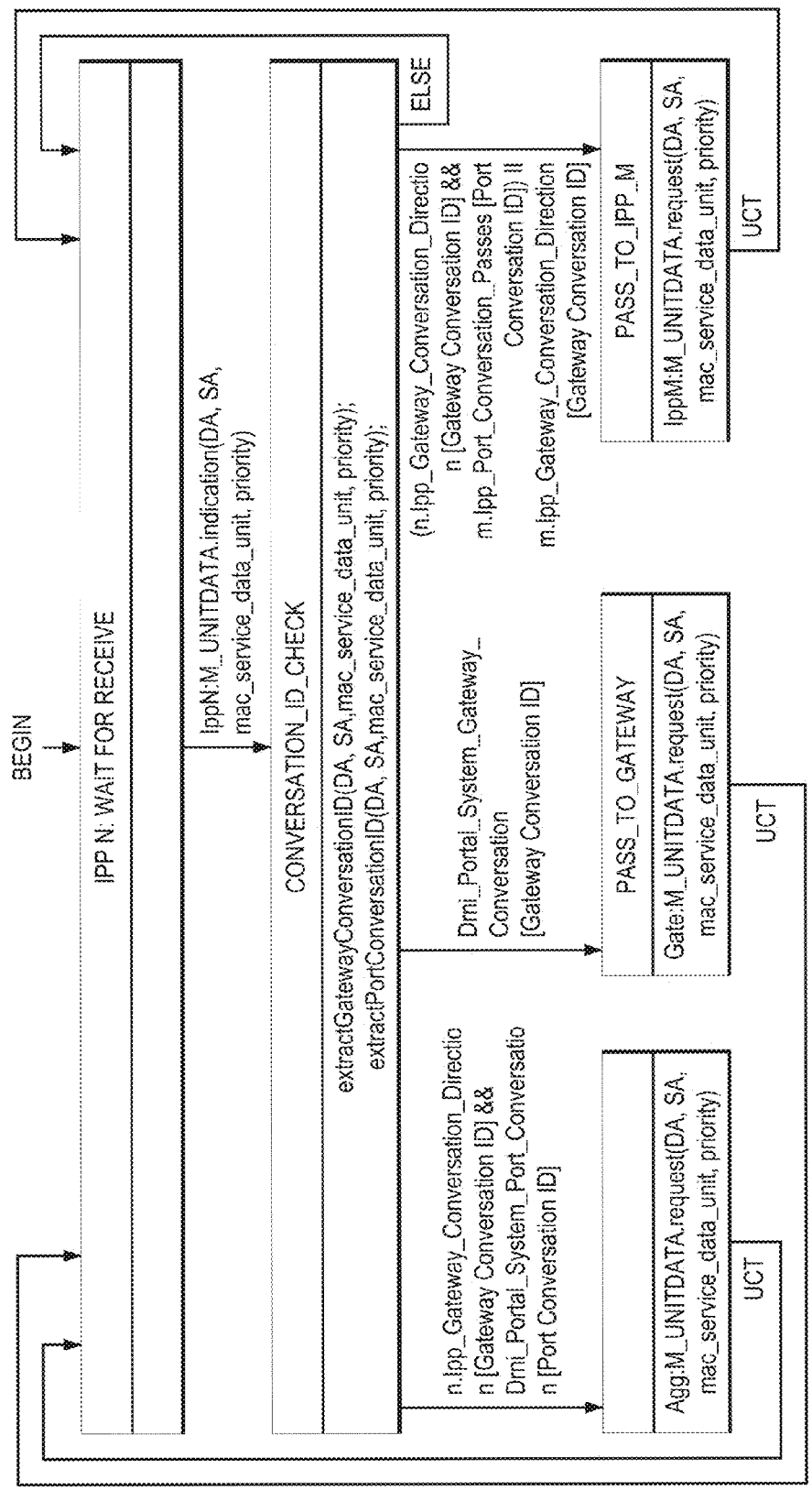
FIG. 24 is a diagram of an IPP N reception state machine according to one embodiment of the invention.

The DR Function: IPP N reception state machine may implement the function specified in FIG. 24 with its associated parameters according to one embodiment of the invention. There is one DR Function: IPP N reception state machine per IPP per Portal System and there are as many PASS_TO_IPP_M states as IPPs in a Portal System, each identified by the index m. The prefix "n." or "m." in the diagram is used to identify the specific IPP n or IPP m that the associated variable is related to.

Distributed Relay Control Protocol

The purpose of the Distributed Relay Control Protocol (DRCP) is to:

A) Establish communication between Portal Systems across an Intra-Portal Link;

B) Verify the consistent configuration of Portal Systems;

C) Determine the identity to be used for the emulated system;

D) Distribute the current states of the Portal Systems and their Aggregation Ports among each other;

E) Compute the resultant path of any frame required to pass through each IPL, and exchange the information with adjacent Portal Systems as required to ensure against forwarding loops and duplicate frame delivery.

F) Exchange information among Portal Systems in order to support distributed functions not specified in this specification;

The result of the operation of DRCP is to maintain the variables that control the forwarding of frames by the Distributed Relay.

DRCP exchanges information to ensure that the Portal Systems can work together. The first class of such information includes the managed objects and variables that must be compatible in order to pass any data at all (item A above). In one embodiment, these include:

G) aAggPortAlgorithm: All Portal Systems must use the same Port algorithm.

H) aDrniGatewayAlgorithm: All Portal Systems must use the same Gateway algorithm.

I) aDrniPortalId: All Portal Systems must have the same value for aDrniPortalId, to ensure that they are all supposed to belong to the same Portal.

J) aDrniPortalTopology: All Portal Systems have to have the same value for aDrniPortalTopology and in the case of a Portal of three Portal Systems connected in a ring, the same "Loop Break Link", aDrniLoopBreakLink needs to be configured consistently through the Portal K) aDrniThreePortalSystem: All Portal Systems have to have the same value for
aDrniThreePortalSystem.

L) aDrniPortalSystemNumber: All Portal Systems must have different aDrniPortalSystemNumber values, and all of these values must be in the range 1 . . . 3, to ensure that information can be labeled meaningfully.

M) aAggActorAdminKey: The most significant two bits of the Administrative Key for each Aggregator in a Distributed Relay's Aggregator Port is set to the value of DRF_Portal_System_Number. The remainder of the bits reflect the physical characteristics of the associated Aggregation Ports and they have to be the same for all Portal Systems in the Portal.

The second class of managed objects (item B) control through which Gateway and which Aggregation Ports each Conversation ID passes. For these managed objects, if the information about one Conversation ID is configured differently in different Portal Systems, only that Conversation ID is affected. Therefore, the Portal can operate normally, and the mechanisms that ensure against duplicate delivery or forwarding loops will block the passage of any frames belonging to misconfigured Conversation IDs. In order to detect misconfiguration, so that the blocking is not permanent, the DR Functions can notify the network administrator if the configurations differ. Since these configurations are quite large, a checksum of their contents is exchanged, rather than the configurations, themselves. This method detects differences to a high probability, but not a certainty. In one embodiment, these managed objects include:

N) aDrniConvAdminGateway[ ]: The list that is used to dynamically determine which Conversation ID flows through which Gateway.

O) aAggConversationAdminPort[ ]: The list that is used to dynamically determine which Conversation ID flows through which Aggregation Port.

DRCP uses its information on which of the expected Portal Systems are either connected or are not connected via IPLs to determine the identity of the emulated Distributed Relay (item C above in this section).

The current operational states of all of the Portal Systems and their Aggregation Ports is exchanged so that each of the DR Functions can determine to which Portal System's Gateway or Aggregator Port each frame is to be delivered (item D above in this section). Each DR Function computes a vector specifying exactly which Port Conversation IDs and which Gateway Conversation IDs can pass through each Gateway, Aggregation Port, or IPP. On each IPP, this information is exchanged (item E above in this section). If there is a difference between two DR Functions' vectors for any given Conversation ID, the output variables are set so that the DR Function will block frames with that Conversation ID. This prevents looping or duplicate delivery of any frame.

Establishing the Portal and Distributed Relay

The creation of Portals automatically is not specified direction. Instead, DRCP compares the network administrator's intentions, as defined by managed objects, to the physical topology of the configured Systems, and if the connected Systems' configurations are compatible, DRCP establishes and enables the operation of the Portal. In order to establish a Distributed Relay across a Portal, a network administrator configures the following managed objects A) There may be many Systems in a network, and some or all of the selected Portal Systems may participate in other Portals. Determining which other Portal Systems belong to this Portal System's Portal is accomplished by configuring variables such as aDrniPortalId and aDrniPortalSystemNumber.

B) As described herein above, any point-to-point instance of the MAC Service can be assigned to be an Intra-Portal Link. The particular instances assigned to the use of a DR Function are configured in aDrniIntraPortalLinkList for example.

C) Which Aggregator in each Portal System is to be assigned to this DR Function is configured in aDrniAggregator in one embodiment.

D) The methods to be used by the DR Functions to assign frames to Gateway Conversation IDs and Port Conversation IDs are configured in two managed objects, aDrniGatewayAlgorithm and aAggPortAlgorithm in one embodiment.

E) The initial and backup assignments of Conversation IDs to Gateways and Aggregation Ports to cover failure modes are configured in several managed objects: aDrniConvAdminGateway[ ], and aAggConversationAdminPort[ ] in one embodiment.

DRCPDU Transmission, Addressing, and Protocol Identification

Distributed Relay Control Protocol Data Units (DRCPDUs) are transmitted and received using the service provided by an LLC entity that uses, in turn, a single instance of the MAC Service provided at an MSAP associated with an IPP. Each DRCPDU is transmitted as a single MAC service request, and received as a single MAC service indication, with the following parameters:
destination address
source address
MSDU (MAC Service Data Unit)
priority The MSDU of each request and indication comprises a number of octets that provide EtherType protocol identification followed by the DRCPDU proper.

NOTE 1—For the purposes of this standard, the term "LLC entity" includes entities that support protocol discrimination using the EtherType field as specified in IEEE Std 802.

NOTE 2—The complete format of an DRCP frame depends not only on the DRCPDU format, as specified here, but also on the media access method dependent procedures used to support the MAC Service.

Destination MAC Address

The destination address for each MAC service request used to transmit a DRCPDU may be a group address selected by IPP Managed Objects. Its default values may be the nearest non-TPMR (Two-Port Media Access Control (MAC) Relay) Bridge group address.

Source MAC address: The source address for each MAC service request used to transmit a DRCPDU may be an individual address associated with the IPP MSAP (MAC Service Access Point) at which the request is made.

Priority: The priority associated with each MAC service request should be the default associated with the IPP MSAP.

Encapsulation of DRCPDUs in Frames

A DRCPDU is encoded in the mac_service_data_unit parameter of an M_UNITDATA.request or M_UNITDATA.indication. The first octets of the mac_service_data_unit are a protocol identifier, followed by the DRCPDU, followed by padding octets, if any, as required by the underlying MAC service.

Where the ISS instance used to transmit and receive frames is provided by a media access control method that can support EtherType encoding directly (e.g., is an IEEE 802.3 MAC), the protocol identifier is two octets in length. All DRCPDUs are identified by the EtherType specified. Where the ISS instance is provided by a media access method that cannot directly support EtherType encoding (e.g., is an IEEE 802.11 MAC), the TPID is encoded according to the rule for a Subnetwork Access Protocol (Clause 10 of IEEE Std 802) that encapsulates Ethernet frames over LLC, and comprises the SNAP header (hexadecimal AA-AA-03) followed by the SNAP PID (hexadecimal 00-00-00) followed by the Protocol's EtherType (hexadecimal xx-xx).

DRCPDU Structure and Encoding

Transmission and Representation of Octets

All DRCPDUs comprise an integral number of octets. The bits in each octet are numbered from 0 to 7, where 0 is the low-order bit. When consecutive octets are used to represent a numerical value, the most significant octet is transmitted first, followed by successively less significant octets.

When the encoding of (an element of) a DRCPDU is depicted in a diagram:

A) Octets are transmitted from top to bottom.

B) Within an octet, bits are shown with bit 0 to the left and bit 7 to the right, and are transmitted from left to right.

C) When consecutive octets are used to represent a binary number, the octet transmitted first has the more significant value.

D) When consecutive octets are used to represent a MAC address, the least significant bit of the first octet is assigned the value of the first bit of the MAC address, the next most significant bit the value of the second bit of the MAC address, and so on through the eighth bit. Similarly, the least significant through most significant bits of the second octet are assigned the value of the ninth through seventeenth bits of the MAC address, and so on for all the octets of the MAC address.

Encapsulation of DRCPDUs in Frames

A DRCPDU is encoded in the mac_service_data_unit parameter of an M_UNITDATA.request or M_UNITDATA.indication in one embodiment. The first octets of the mac_service_data_unit are a protocol identifier, followed by the DRCPDU, followed by padding octets, if any, as required by the underlying MAC service.

Where the ISS instance used to transmit and receive frames is provided by a media access control method that can support EtherType encoding directly (e.g., is an IEEE 802.3 MAC), the protocol identifier is two octets in length, and the value is the Protocol's EtherType (hexadecimal xx-xx).

Where the ISS instance is provided by a media access method that cannot directly support EtherType encoding (e.g., is an IEEE 802.11 MAC), the TPID is encoded according to the rule for a Subnetwork Access Protocol (Clause 10 of IEEE Std 802) that encapsulates Ethernet frames over LLC, and comprises the SNAP header (hexadecimal AA-AA-03) followed by the SNAP PID (hexadecimal 00-00-00) and EtherType (hexadecimal xx-xx).

DRCPDU Structure

FIG. 5 illustrates one embodiment of the DRCPDU structure according to the invention. The fields are defined as the following:

A) Subtype. The Subtype field identifies the specific Slow Protocol being encapsulated. DRCPDUs carry the Subtype value OxOX. Note A) not be present if the choice is not the use the Slow Protocol EtherType to identify DCRP operation.

B) Version Number. This identifies the DRCP version; implementations conformant to one embodiment carries the value 0x01.

C) TLV_type=Portal Information. This field indicates the nature of the information carried in this TLV-tuple. DRNI information is identified by the value 0x01 in one embodiment.

D) Portal_Information_Length. This field indicates the length (in octets) of this TLV-tuple, Actor information uses a length value of 18 (0x12) in one embodiment. In an alternate embodiment, the length value is 16.

E) Aggregator_Priority. The priority assigned to the Actor System ID (by management or administration policy) of the Aggregator attached to the DR Function, encoded as an unsigned integer from aAggActorSystemPriority in one embodiment.

F) Aggregator_ID. The MAC address component of Actor System ID of the Aggregator attached to the DR Function from a in one embodiment.

G) Portal_Priority. The priority assigned to Portal ID (by management or administration policy), encoded as an unsigned integer from aDrniPortalPriority in one embodiment.

H) Portal_ID. The MAC address component of Portal IDs from aDrniPortalId in one embodiment.

I) TLV_type=Portal Configuration Information. This field indicates the nature of the information carried in this TLV-tuple. Portal Configuration Information is identified by the value 0x02 in one embodiment.

J) Portal_Configuration_Information_Length. This field indicates the length (in octets) of this TLV-tuple, Portal Configuration Information uses a length value of 46 (0x2E) in one embodiment. In an alternate embodiment, the length value is 43.

Figures 6A, 6B, 6C:
FIG. 6A is a diagram of Distributed Relay Control Protocol (DRCP) state.
FIG. 6B is a diagram of one embodiment of DRCP.
FIG. 6C is a topology state field of a DRCPDU structure according to one embodiment of the invention.

K) Topology_State. This DR Function's topology related variables for the IPP, encoded as individual bits within a single octet, as follows and as illustrated in FIG. 6C:

1) Portal_System_Number is encoded in bits 0 and 1. It is the Portal System Number of this DR Function from aDrniPortalSystemNumber.

2) Portal_Topology is encoded in bits 2 and 3. It is the Portal Topology of this DR Function as configured in aDrniPortalTopology.

3) Neighbor_Conf_Portal_System_Number is encoded in bits 4 and 5. It is the configured Portal System Number of the Portal System that is attached to this IPP.

4) Loop_Break_Link is encoded in bit 6. This flag indicates that the IPL attached to this IPP is configured as a Loop Break Link. TRUE indicates that the IPL is configured in aDrniLoopBreakLink and is encoded as a 1; otherwise, the flag is encoded as a 0.

5) Bit 7 is reserved for future use. It set to 0 on transmit and it is ignored on receipt.

K2) Topology_State. In an alternate embodiment, topology state may be encoded in a different octet, as follows and as illustrated in FIG. 29A.

1) Portal_System_Number is encoded in bits 0 and 1. The Portal System Number of this DR Function from aDrniPortalSystemNumber in one embodiment.

2) Neighbor_Conf_Portal_System_Number is encoded in bits 2 and 3. The configured Portal System Number of the Portal System that is attached to this IPP in one embodiment.

3) Bits 4 to 6 are reserved for future use. They are set to 0 on transmit and they are ignored on receipt in one embodiment.

4) Other_Non_Neighbor in encoded in bit 7. TRUE (encoded as 1) indicates that the Other Ports Information TLV is not associated with an immediate Neighbor of this Portal System. FALSE (encoded as 0) indicates that the Other Ports Information TLV is an immediate Neighbor on the other IPP on this Portal System in one embodiment.

K3) Topology_State. In a third embodiment, topology state may be encoded in a different octet, as follows and as illustrated in FIG. 29B, where bits 0-3 are the same, and 3_System_Portal is encoded in bit 4. This bit indicates if this is a Portal System that is part of a Portal consisting of three Portal Systems. It is encoded as 1 for a Portal of three Portal Systems and as 0 otherwise. It is always set equal to aDrniThreePortalSystem. Common_Methods is encoded in bit 5. It is encoded as 1 when aDrniPortConversationControl is set to TRUE and as 0 otherwise. Bit 6 is still reserved for future use and bit 7 is still ONN bit.

L) Oper_Aggregator_Key. The current operational Aggregator Key value of the Aggregator attached to the DR Function.

M) Port_Algorithm. The Port algorithm used by this DR Function and Aggregator from aAggPortAlgorithm in one embodiment.

N) Gateway_Algorithm. The Gateway algorithm used by this DR Function from aDrniGatewayAlgorithm in one embodiment.

O) Port_Digest. The DRF_Home_Conversation_GatewayList_Digest of this DR Function's prioritized Port Conversation ID-to-Aggregation Port assignments from aAggConversationAdminPort[ ] in one embodiment.

P) Gateway_Digest. The DRF_Home_conversation_GatewayList_Digest of this DR Function's prioritized Gateway Conversation ID-to-Gateway assignments from aDrniConvAdminGateway[ ] in one embodiment.

Q) TLV_type=DRCP State. This field indicates the nature of the information carried in this TLV-tuple. DRCP State is identified by the value 0x03 in one embodiment.

R) DRCP_State_Length. This field indicates the length (in octets) of this TLV-tuple, DRCP State uses a length value of 3 (0x03) in one embodiment.

S) DRCP_State. This DR Function's DRCP variables for the IPP, encoded as individual bits within a single octet, as follows and as illustrated in FIG. 6B:

1) Home_Gateway. In one embodiment, it is encoded in bit 0. This flag indicates the operation state of this DR Functions' Gateway. TRUE indicates operational and is encoded as a 1 and non-operational is encoded as a 0.

2) Neighbor_Gateway is encoded in bit 1 in one embodiment. This flag indicates the operation state of the Neighbor's DR Functions' Gateway. TRUE indicates operational and is encoded as a 1 and non-operational is encoded as a 0.

3) Other_Gateway is encoded in bit 2 in one embodiment. This flag indicates the operation state of a potential other DR Functions' Gateway. TRUE indicates operational and is encoded as a 1 and non-operational is encoded as a 0.

4) IPP_Activity is encoded in bit 3 in one embodiment. This flag indicates the Neighbor's DRCP Activity on this IPP. Active DRCP Neighbor is encoded as a 1 and no DRCP activity is encoded as 0.

5) DRCP_Timeout is encoded in bit 4 in one embodiment. This flag indicates the Timeout control value with regard to this link. Short Timeout is encoded as a 1 and Long Timeout is encoded as a 0.

6) Gateway Sync is encoded in bit 5 in one embodiment. If TRUE (encoded as a 1), this DR Function considers this IPP's Neighbor Partner Systems to have their Gateways IN_SYNC; i.e., this Portal System's operational vector listing which Portal System's Gateway (if any) is passing each Gateway Conversation ID is in agreement with this IPP's Neighbors' operational vector. If FALSE (encoded as a 0), then this IPP is currently OUT_OF_SYNC; i.e., this IPP's Neighbors' operational vector listing which Portal System's Gateway (if any) is passing each Gateway Conversation ID is in disagreement.

7) Port Sync is encoded in bit 6. If TRUE (encoded as a 1), this DR Function considers this IPP's Neighbor Partner Systems to have their Aggregator Ports IN_SYNC; i.e., this Portal System's operational vector listing which Portal System's Aggregation Port (if any) is passing each Port Conversation ID is in agreement with this IPP's Neighbors' operational vector. If FALSE (encoded as a 0), then this IPP is currently OUT_OF_SYNC; i.e., this IPP's Neighbors' operational vector listing which Portal System's Aggregation Port (if any) is passing each Port Conversation ID is in disagreement.

8) Expired is encoded in bit 7. If TRUE (encoded as a 1), this flag indicates that the DR Function's Receive machine is in the EXPIRED or DEFAULTED state; if FALSE (encoded as a 0), this flag indicates that the DR Function's Receive machine is not in the EXPIRED nor DEFAULTED state.

The received values of Expired state are not used by DRCP; however, knowing their values can be useful when diagnosing protocol problems. Also note that the order of the fields and the length of the fields may be different in a different embodiment but still complies with the spirit of this invention.

T) TLV_type=Home Ports Information. This field indicates the nature of the information carried in this TLV-tuple. Home Ports information is identified by the integer value 0x04 in one embodiment.

U) Home_Ports_Information_Length. This field indicates the length (in octets) of this TLV-tuple, Home Ports information uses a length value of 4 times the number of this Portal System's Aggregation Ports that are included.

V) Home_Admin_Aggregator_Key. The administrative Aggregator Key value of the Aggregator attached to this DR Function from aAggActorAdminKey.

W) Home_Oper_Partner_Aggregator_Key. The operational Partner Aggregator Key associated with this Portal System's Aggregator LAG ID.

X) Active Home Ports. The list of active Aggregation Ports in increasing Port Number order. The list is controlled by the operation of LACP (listing all the Ports on this Portal System for which LACP is declaring Actor_Oper_Port_State.Distributing=TRUE).

Y) TLV_type=Neighbor Ports Information. This field indicates the nature of the information carried in this TLV-tuple. Neighbor Ports information is identified by the integer value 0x05.

Z) Neighbor_Ports_Information_Length. This field indicates the length (in octets) of this TLV-tuple, Neighbor Ports information uses a length value of 4 times the number of the Neighbor Aggregation Ports that are included.

Aa) Neighbor_Admin_Aggregator_Key. The administrative Aggregator Key value of the Aggregator attached to the Neighbor Portal System.

Ab) Neighbor_Oper_Partner_Aggregator_Key. The operational Partner Aggregator Key associated with the Neighbor Portal System's Aggregator LAG ID.

Ac) Active Neighbor Ports. The list of active Aggregation Ports in increasing Port Number order. The list is controlled by the operation of LACP (listing all the Ports on the immediate Neighbor Portal System for which LACP is declaring Actor_Oper_Port_State.Distributing=TRUE).

Ad) TLV_type=Other Ports Information. This field indicates the nature of the information carried in this TLV-tuple. The Other Ports information is identified by the integer value 0x06. This TLV is only used if the Portal Topology contains three Portal Systems.

Ae) Other_Ports_Information_Length. This field indicates the length (in octets) of this TLV-tuple, Other Ports information uses a length value of 4 times the number of the Other Portal System's Aggregation Ports that are included.

Af) Other_Admin_Aggregator_Key. The administrative Aggregator Key value of the Aggregator attached to the other neighbor Portal System.

Ag) Other_Oper_Partner_Aggregator_Key. The operational Partner Aggregator Key associated with the other neighbor Portal System's Aggregator LAG ID.

Ah) Active Other Ports. The list of active Aggregation Ports in increasing Port Number order. The list is controlled by the operation of LACP (listing all the Ports on an optional other Portal System for which LACP is declaring Actor_Oper_Port_State.Distributing=TRUE).

Ai) TLV_type=Other Information. This field indicates the nature of the information carried in this TLV-tuple. Other information is identified by the integer value OxOx in one embodiment.

Aj) TLV_type=Terminator. This field indicates the nature of the information carried in this TLV-tuple. Terminator (end of message) information is identified by the integer value 0x00 in one embodiment.

Ak) Terminator_Length. This field indicates the length (in octets) of this TLV-tuple. Terminator information uses a length value of 0 (0x00) in one embodiment.

Note, the use of a Terminator_Length of 0 is intentional. In TLV encoding schemes it is common practice for the terminator encoding to be 0 both for the type and the length.

Also note, the Version 1 implementation is guaranteed to be able to receive version N PDUs successfully, although version N PDUs may contain additional information that cannot be interpreted (and will be ignored) by the Version 1. A crucial factor in ensuring backwards compatibility is that any future version of the protocol is required not to redefine the structure or semantics of information defined for the previous version; it may only add new information elements to the previous set. Hence, in a version N PDU, a Version 1 implementation can expect to find the Version 1 information in exactly the same places as in a Version 1 PDU, and can expect to interpret that information as defined for Version 1.

Note, that he DRCPDU grows in size with the number of Aggregation Ports. A maximum of (1500−88)/4=353 Aggregation Ports spread across a Portal's Portal Systems are supported. The minimum number of Aggregation Ports that need to be supported by a Portal is two.

The table below provides a list of the TLVs that are applicable for DRCP.

TABLE 4

Type field values of DRCP TLVs

| TLV | Type Field |
|---|---|
| Terminator TLV | 0x00 |
| Portal Information TLV | 0x01 |
| Portal Configuration Information TLV | 0x02 |
| DRCP State TLV | 0x03 |
| Home Ports Information TLV | 0x04 |
| Neighbor Ports Information TLV | 0x05 |
| Other Ports TLV | 0x06 |
| Network/IPL Sharing Method TLV | 0x07 |
| Network/IPL Sharing Encapsulation TLV | 0x08 |
| Reserved for IEEE 802.1 | 0x09-0x0E |
| Organization Specific TLV | 0x0F |
| Reserved for IEEE 802.1 | 0x10-0xFF |

Embodiments thus provide encapsulation of DRCPDUs into frames, wherein each DRCPDU comprises a field indicating DRCP state, such as DRCP variables for an IPP. The field may be one octet. The field may further include, encoded in the different bits of the octet, information stating one or more of the following: Home_Gateway; Neighbor_Gateway; Other_Gateway; IPP_Activity; DRCP_Timeout; Gateway Sync; Port Sync; Expired.

Conversation Vector TLVs

Table 5 provides the list of the Conversation Vector TLVs. These TLVs should be present in a DRCPDU only when certain conditions are met. In particular the Gateway Conversation Vector TLV shall only be present when Gateway-ConversationTransmit is TRUE and the Port Conversation Vector TLV shall only be present when PortConversationTransmit is TRUE. See the DRCPDU Transmit machine for details regarding the presence of the Conversation Vector TLVs in a DRCPDU.

TABLE 5

Type field values of Conversation Vector TLVs

| TLV | Type Field |
| --- | --- |
| Gateway Conversation Vector TLV | 10 |
| Port Conversation Vector TLV | 11 |

Gateway Conversation Vector TLV

The Gateway Conversation Vector TLV structure may be as shown in FIG. 37A and as further described in the following field definitions.

a) TLV_type=Gateway Conversation Vector. This field indicates the nature of the information carried in this TLV-tuple. Gateway Conversation Vector is identified by the integer value 10.

b) Gateway_Conversation_Vector_Length. This field indicates the length (in octets) of this TLV-tuple, Gateway Conversation Vector uses a length value of 512 or 1024.

c) Gateway_Conversation. The contents of this field depend on the value of the aDrniThreePortalSystem flag. If aDrniThreePortalSystem==FALSE, the field provides the operational Drni_Portal_System_Gateway_Conversation Boolean vector. Drni_Portal_System_Gateway_Conversation is encoded as a 512-octet Boolean vector, indexed by Gateway Conversation ID. The first bit indicates if Gateway Conversation ID 0 is allowed to pass through this DR Function's Gateway, the second bit indicates if Gateway Conversation ID 1 is allowed to pass through this DR Function's Gateway, and so on until the final bit which indicates if Gateway Conversation ID 4095 is allowed to pass through this DR Function's Gateway. If aDrniThreePortalSystem==TRUE, the field provides the operational Drni_Gateway_Conversation vector, listing which Portal System's Gateway (if any) is passing each Gateway Conversation ID. Drni_Gateway_Conversation is encoded as a 1024-octet vector as sequence of Portal System Numbers (0 for none), indexed by Gateway Conversation ID. The first two bits provide the Portal System Number of the Portal System that is passing Gateway Conversation ID 0, the second two bits provide the Portal System Number of the Portal System that is passing Gateway Conversation ID 1, and so on until the final two bits which provide the Portal System Number of the Portal System that is passing Gateway Conversation ID 4095.

Port Conversation Vector TLV

The Port Conversation Vector TLV structure may be as shown in FIG. 37B and as further described in the following field definitions.

a) TLV_type=Port Conversation Vector. This field indicates the nature of the information carried in this TLV-tuple. Port Conversation Vector is identified by the integer value 11.

b) Port_Conversation_Vector_Length. This field indicates the length (in octets) of this TLV-tuple, Port Conversation Vector uses a length value of 512 or 1024.

c) Port_Conversation. The contents of this field depend on the value of the aDrniThreePortalSystem flag. If aDrniThreePortalSystem==FALSE, the field provides the operational Drni_Portal_System_Port_Conversation Boolean vector. Drni_Portal_System_Port_Conversation is encoded as a 512-octet Boolean vector, indexed by Port Conversation ID. The first bit indicates if Port Conversation ID 0 is allowed to pass through this DR Function's Aggregator, the second bit indicates if Port Conversation ID 1 is allowed to pass through this DR Function's Aggregator, and so on until the final bit which indicates if Port Conversation ID 4095 is allowed to pass through this DR Function's Aggregator. If aDrniThreePortalSystem==TRUE, the field provides the operational Drni_Port_Conversation (9.4.7) vector listing which Portal System's Aggregator (if any) is passing each Port Conversation ID. It is encoded in a 1024-octet vector as sequence of Portal System Numbers (0 for none), indexed by Port Conversation ID. The first two bits provide the Portal System Number of the Portal System that is passing Port Conversation ID 0, the second two bits provide the Portal System Number of the Portal System that is passing Port Conversation ID 1, and so on until the final two bits which provide the Portal System Number of the Portal System that is passing Port Conversation ID 4095.

FIG. 14 illustrates another embodiment of the DRCPDU structure according to the invention. While the DRCPDU structure in FIG. 14 is similar to that of FIG. 5, several fields are different. For example, the Home_Ports_Information_Length is 2+4*PN in FIG. 14, not 2+2*PN as in FIG. 5. Similarly, several other fields of the DRCPDU structure in FIG. 14 contain lengths different from those of the DRCPDU structure in FIG. 5, and the two DRCPDU structures also contain fields not present in the other embodiment. In each example DRCPDU structure, the fields have descriptive names for the content of the fields. Some of the differing fields contain similar information, but have been renamed or reorganized. One skilled in the art would understand that other similar DRCPDU structures are possible consistent with the principles and structures described herein.

FIG. 25 illustrates another embodiment of the DRCPDU structure according to the invention. The DRCPDU structure in FIG. 25 is similar to that of FIGS. 5 and 14 with several differences. For example, the Port information lengths (for home, neighbor, and other ports) are difference. In addition, the DRCPDU structure in FIG. 25 includes a topology state, and several fields for aggregator keys such as Oper_Aggregator_Key, Home_Admin_Aggregator_Key, Home_Oper_Partner_Aggregator_Key, Neighbor_Admin_Aggregator_Key, Other_Admin_Aggregator_Key, and Other_Oper_Partner_Aggregator_Key discussed herein above.

Figure 32:
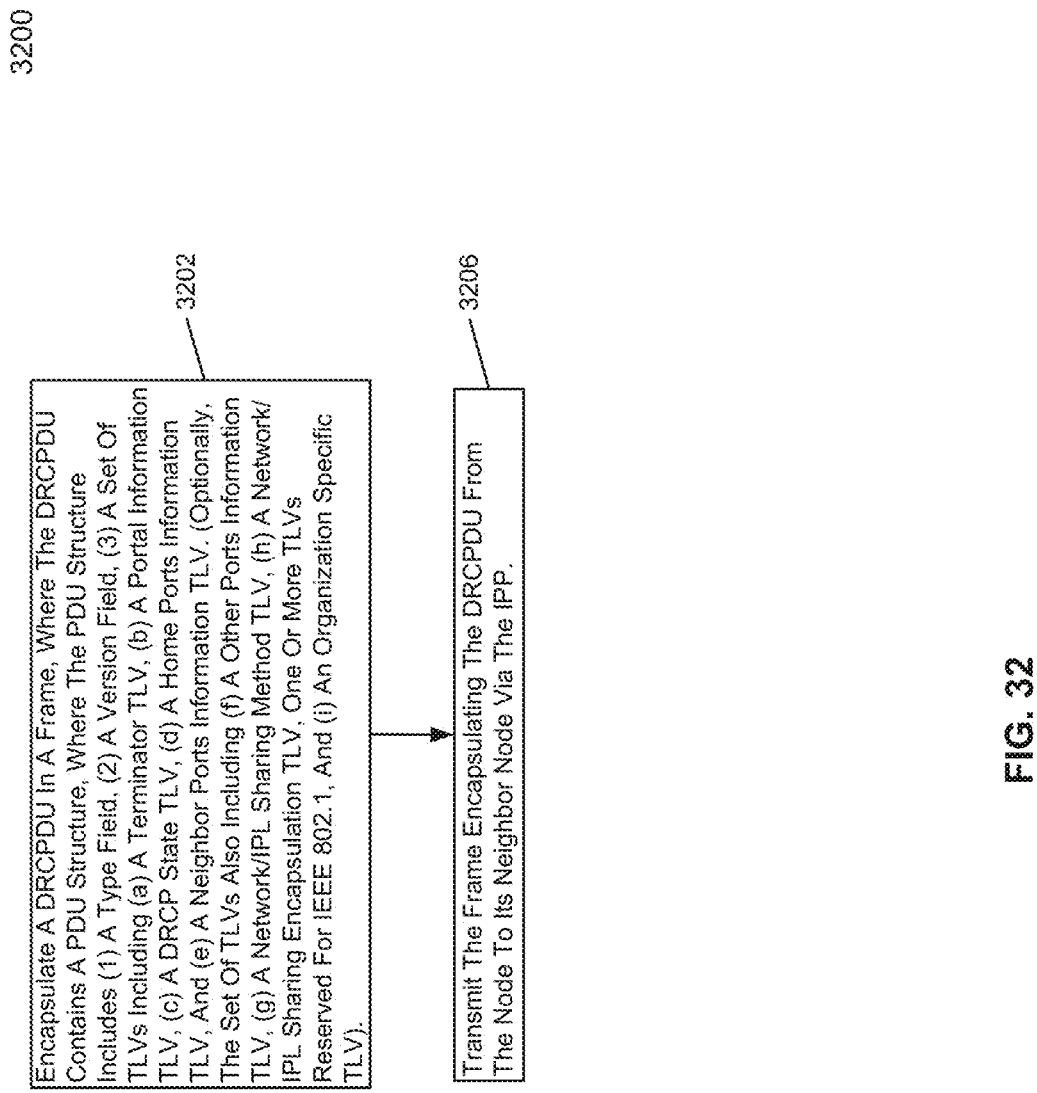
FIG. 32 illustrates a method of communicating through a frame containing DRCPDU structure according to one embodiment of the invention

FIG. 32 illustrates a method of communicating through a frame including DRCPDU structure according to one embodiment of the invention. Method 3200 may be implemented on a DRCP node (e.g., a network device) of a DRCP portal (referred to as a local portal) as a part of a DRNI such as nodes K-O of FIG. 1B and network devices 132 and 134 of FIG. 1C.

At 3202, a DRCP node of a portal encapsulate a DRCPDU in a frame. The DRCPDU includes a structure including (1) a type field (referred to as subtype) indicating the PDU is for DRCP, (2) a version field indicating the version number of the DRCPDU, and (3) a set of TLVs. The set of TLVs includes a terminator TLV, a portal information TLV, a portal configuration TLV, a DRCP state TLV, a home ports information TLV, and a neighbor ports information TLV. When a portal includes more than two nodes, the PDU structure may include another ports TLV in one embodiment.

In one embodiment, the set of TLVs further include at least one of network/IPL sharing method TLV, network/IPL sharing encapsulation TLV, one or more TLVs reserved for IEEE 802.1, and organization specific TLVs, each TLV being discussed herein.

Each of the set of TLVs include a TLV type field. In one embodiment, the TLV type field of each includes values specified in Table 4 illustrated above. Each of the TLVs includes fields which may set to values discussed herein above. For example:

The terminator TLV indicates the end of the PDU structure. In one embodiment, it includes a TLV type field and a terminator length field, where the terminator length field indicate a length of zero as discussed herein above.

The portal information TLV indicates characteristics of the portal, of which the DRCP node belongs to. In one embodiment, the characteristics are indicated in (1) an aggregator priority field indicating a priority assigned to the aggregator of the node, (2) an aggregator identifier (ID) field indicating an ID of the aggregator, (3) a portal priority field indicating a priority assigned to the portal, and (4) a portal address field indicating an MAC address component associated with the network device as discussed herein above.

The portal configuration information TLV indicates configuration information of the portal, of which the DRCP node belongs to. In one embodiment, the configuration information is indicated in (1) a topology state field indicating a topology state of the portal such as illustrated in FIGS. 6C and 29, (2) an operational aggregator key field indicating an operational aggregator key of the node, (3) a portal algorithm field indicating a portal algorithm used, (4) a gateway algorithm field indicating a gateway algorithm used, (5) a port digest field indicating a port digest used for port conversation identifier (ID) to aggregation port assignment, and (6) a gateway digest field indicating a gateway digest used for gateway conversation ID to gateway assignment as discussed herein above.

The DRCP state TLV indicates variables associated with the IPP. In one embodiment, the DRCP state includes values encoded as illustrated in FIG. 6B as discussed herein above.

The home ports information TLV indicates current status of the node in association with the DRCP node. In one embodiment, the current status of the node is indicated in (1) an administrative aggregator key field indicating an administrative aggregator key value of the aggregator attached, (2) an operational partner aggregator key field indicating an operational partner aggregator key associated with the node's aggregator LAG ID, (3) an active aggregation port field indicating a list of active aggregation ports in the node as discussed herein above.

The neighbor ports information TLV indicates current status of the neighbor node in association with the DRNI. In one embodiment, the current status of the neighbor node is indicated in (1) an administrative aggregator key field indicating an administrative aggregator key value of the aggregator attached to the neighbor network device, (2) an operational partner aggregator key field indicating an operational partner aggregator key associated with the neighbor node's aggregator LAG ID, and (3) an active aggregation port field indicating a list of active aggregation ports in an immediate neighbor portal system associated with the IPP as discussed herein above.

The other ports information TLV indicates current status of the other neighbor node associated with the DRNI when the local portal includes more than two nodes. In one embodiment, the current status of the other neighbor node is indicated in (1) an administrative aggregator key field indicating an administrative aggregator key value of the aggregator attached to the other node, (2) an operational partner aggregator key field indicating an operational partner aggregator key associated with the other neighbor node's aggregator LAG ID, and (3) a list of active aggregation ports in the other neighbor node on the IPP as discussed herein above.

The network/IPL sharing method TLV indicates a network and IPL sharing method associated with the node; and The network/IPL sharing encapsulation TLV indicates information relating to encapsulation of the sharing method.

At 3206, the DRCP node sends the frame to its neighbor node of the portal via the IPP, wherein the neighbor node uses the encapsulated information to control forwarding of frames.

As discussed herein above, through method 3200, the node exchanges information with its neighbor node and thus establishes and enables DRCP operations of the portal. Method 3200 provides an efficient way for the node to exchange information with its neighboring node.

Network/IPL Sharing TLV

These TLVs are only required when the Network/IPL sharing method used is one of Network/IPL sharing by tag, or Network/IPL sharing by encapsulation in order to ensure consistent configuration among the Portal Systems. The Network/IPL sharing by time method requires the exchange of the Network/IPL Sharing Method TLV but not the Network/IPL Sharing Encapsulation TLV.

NOTE—No Network/IPL sharing TLVs are required when the Network/IPL sharing method used is the physical or aggregated method discussed herein.

The following table provides a list of the TLVs that are applicable for Network/IPL sharing methods.

TABLE 5

Type field values of Network/IPL sharing TLVs

| TLV | Type Field |
| --- | --- |
| Network/IPL Sharing Method TLV | 0x07 |
| Network/IPL Sharing Encapsulation TLV | 0x08 |

Network/IPL Sharing Method TLV

The network/IPL sharing method TLV structure may be shown as table below and as further described in the following field definitions:

TABLE 6

Network/IPL Sharing Method TLV

| TLV | Length (Octets) |
| --- | --- |
| TLV_type = Network/IPL Sharing Method | 1 |
| Network/IPL_Sharing_Method_Length = 6 | 1 |
| DRF_Home_Network/IPL_Sharing_Method | 4 |

TLV_type=Network/IPL Sharing Method TLV. This field indicates the nature of the information carried in this TLV-tuple. The Network/IPL sharing TLVs is identified by the integer value 0x07.

Network/IPL_Sharing_Method_Length. This field indicates the length (in octets) of this TLV-tuple. The Network/IPL sharing TLVs uses a length value of 6 (0x06). DRF_Home_Network/IPL_Sharing_Method. This field contains the value representing the Network/IPL sharing method that is used to transport IPL frames to the Neighbor Portal System on this IPP when the IPL and network link are sharing the same physical link. It consists of the three-octet Organization Unique Identifier (OUI) identifying the organization which is responsible for this encapsulation and one following octet used to identify the encapsulation method defined by that organization. Always set equal to aDrniEncapsulationMethod. A value of 1 indicates that Network/IPL sharing by time is used. A value of 2 indicates that the encapsulation method used is the same as the one used by network frames and that Network/IPL sharing by tag is used. Table below provides the IEEE OUI (01-80-C2) encapsulation method encodings.

TABLE 7

IEEE Encapsulation methods

| Encapsulation Method Field | Value |
|---|---|
| IPL is using a separate physical or Aggregation link | 0 |
| Network/IPL sharing by time | 1 |
| Network/IPL sharing by tag | 2 |
| IEEE802.1Q I-TAG based encapsulation | 3 |
| IEEE802.1Q B-VLAN based encapsulation | 4 |
| IETF Pseudowire based encapsulation | 5 |
| Reserved | 6-255 |

Network/IPL Sharing Encapsulation TLV

The Network/IPL Sharing Encapsulation TLV structure may be as shown below and as further described in the following field definitions.

TABLE 8

Network/IPL Sharing Encapsulation TLV

| TLV | Length (Octets) |
|---|---|
| TLV_type = Network/IPL Sharing Encapsulation | 1 |
| Network/IPL_Sharing_Encapsulation_Length = 34 | 1 |
| DRF_Home_Network/IPL_IPLEncap_Digest | 16 |
| DRF_Home_Network/IPL_NetEncap_Digest | 16 |

TLV_type = Network/IPL Sharing Encapsulation TLV. This field indicates the nature of the information carried in this TLV-tuple. The Network/IPL sharing TLVs is identified by the integer value 0x08.
Network/IPL_Sharing_Encapsulation_Length. This field indicates the length (in octets) of this TLV-tuple. The Network/IPL sharing TLVs uses a length value of 34 (0x22).
DRF_Home_Network/IPL_IPLEncap_Digest. This field contains the value of the MD5 digest computed from aDrniIPLEncapMap for exchange with the Neighbor Portal System on the IPL.
DRF_Home_Network/IPL_NetEncap_Digest. This field contains the value of the MD5 digest computed from aDrniNetEncapMap for exchange on the shared network link.

DrniEncapsulationMethod
ATTRIBUTE
APPROPRIATE SYNTAX
A SEQUENCE OF OCTETS consisting of an Organization Unique Identifier (OUI) and one following octet.
BEHAVIOR DEFINED AS
This managed object is applicable only when Network/IPL sharing by time or Network/IPL sharing by tag or Network/IPL sharing by encapsulation is supported. The object identifies the value representing the encapsulation method that is used to transport IPL frames to the Neighbor Portal System when the IPL and network link are sharing the same physical link. It consists of the three-octet Organization Unique Identifier (OUI) identifying the organization which is responsible for this encapsulation and one following octet used to identify the encapsulation method defined by that organization. Table on IEEE encapsulation methods provides the IEEE OUI (01-80-C2) encapsulation method encodings. A Default value of 0x01-80-C2-00 indicates that the IPL is using a separate physical or Aggregation link. A value of 1 indicates that Network/IPL sharing by time is used. A value of 2 indicates that the encapsulation method used is the same as the one used by network frames and that Network/IPL sharing by tag is used.

DrniIPLEncapMap
ATTRIBUTE
APPROPRIATE SYNTAX
A SEQUENCE OF INTEGERs, indexed by Gateway Conversation ID.
BEHAVIOR DEFINED AS
This managed object is applicable only when Network/IPL sharing by tag or Network/IPL sharing by encapsulation is supported. Each entry represents the value of the identifier used for an IPL frame associated with that Gateway Conversation ID for the encapsulation method specified herein.
aDrniNetEncapMap
ATTRIBUTE
APPROPRIATE SYNTAX
A SEQUENCE OF INTEGERs, indexed by Gateway Conversation ID.
BEHAVIOR DEFINED AS
This managed object is applicable only when Network/IPL sharing by tag is supported. Each entry represents the translated value of the identifier used for a network frame associated with that Gateway Conversation ID when the method specified herein is the Network/IPL sharing by tag method specified herein and the network frames need to share the tag space used by IPL frames.
aAggPortAlgorithm
ATTRIBUTE
APPROPRIATE SYNTAX
A SEQUENCE OF OCTETS consisting of a three-octet Organization Unique Identifier (OUI) and one following octet.
BEHAVIOR DEFINED AS
This object identifies the algorithm used by the Aggregator to assign frames to a Port Conversation ID.
aAggActorSystemID
ATTRIBUTE
APPROPRIATE SYNTAX:
MACAddress
BEHAVIOUR DEFINED AS:
A 6-octet read-write MAC address value used as a unique identifier for the System that contains this Aggregator.
NOTE—From the perspective of the Link Aggregation mechanisms described in Clause 6, only a single combination of Actor's System ID and System Priority are considered, and no distinction is made between the values of these parameters for an Aggregator and the Aggregation Port(s) that are associated with it (i.e., the protocol is described in terms of the operation of aggregation within a single System). However, the managed objects provided for the Aggregator and the Aggregation Port both allow management of these parameters. The result of this is to permit a single piece of equipment to be configured by management to contain more than one System from the point of view of the operation of Link Aggregation. This may be of particular use in the configuration of equipment that has limited aggregation capability.
aAggActorSystemPriority
ATTRIBUTE
APPROPRIATE SYNTAX:
INTEGER
BEHAVIOUR DEFINED AS:
A 2-octet read-write value indicating the priority value associated with the Actor's System ID.
Organization-Specific TLV
Any organization can define TLVs for use in DRCP. These TLVs are provided to allow different organizations, such as IEEE 802.1, ITU-T, IETF, as well as individual software and equipment vendors, to define TLVs that advertise information to Neighbor Portal Systems. The Organization-Specific TLV structure shall be as shown in table below and as further described in the following field definitions.

| TLV_type = Organization-Specific | 1 |
| Organization_Specific_Length = LL | 1 |
| OUI | 3 |
| Subtype | 7 |
| Value (Optional) | LL-12,,,,, |

TLV_type = Organization-Specific TLV. This field indicates the nature of the information carried in this TLV-tuple. The Organization-Specific TLV is identified by the integer value 0x0F.
Network/IPL_Sharing_Encapsulation_Length. This field indicates the length (in octets) of this TLV-tuple. The Organization-Specific TLV uses a length value of LL.
OUI. This field contains the 3-byte long Organizationally Unique Identifier, obtainable from IEEE.
Subtype. This field contains a Subtype value, so that an additional OUI will not be required if more Organization-Specific TLVs are required by an owner of an OUI.
Value. This field contains the information that needs to be communicated to the Neighbor Portal Systems.

DRCP State Machine Overview

The operation of the protocol is controlled by a number of state machines, each of which performs a distinct function. These state machines are for the most part described on a per-IPP basis; any deviations from per-Aggregation Port description are highlighted in the text. Events (such as expiration of a timer or received DRCPDUs) may cause state transitions and also cause actions to be taken; those actions may include the need for transmission of a DRCPDU containing repeated or new information. Periodic and event-driven transmissions are controlled by the state of a Need-To-Transmit (NTT) variable, generated by the state machines as necessary.

Figure 8:
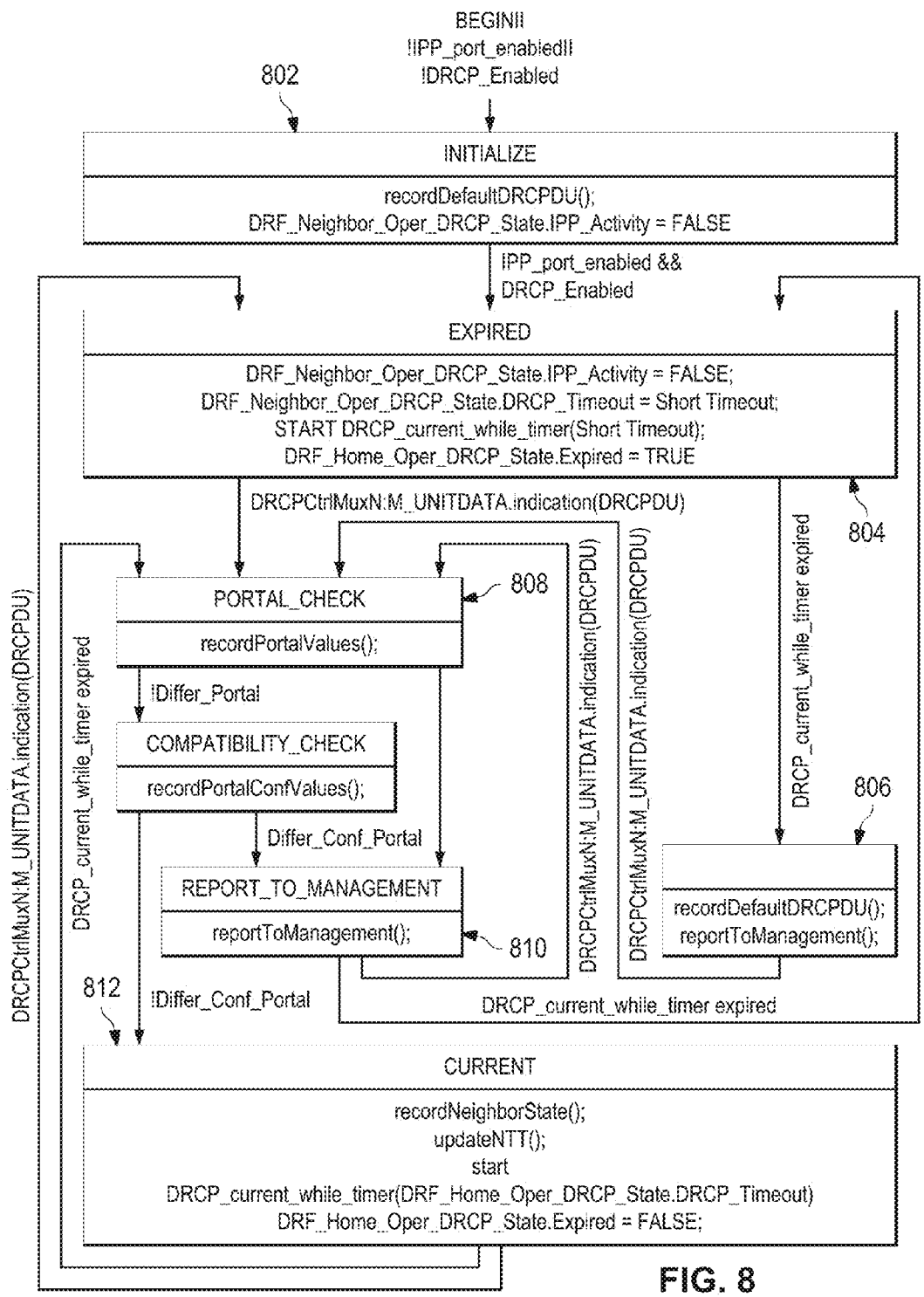
FIG. 8 is a flowchart illustrating a state machine for a receive machine.

The state machines are as follows:

A) Receive machine (see FIG. 8). This state machine receives DRCPDUs from the Neighbor Portal System on this IPP, records the information contained, and times it out using either Short Timeouts or Long Timeouts, according to the setting of DRCP_Timeout. It evaluates the incoming information from the Neighbor Portal System to determine whether the Home and Neighbor have both agreed upon the protocol information exchanged to the extent that the Home Portal System can now be safely used, either in Portal with other Portal Systems or as an individual Portal; if not, it asserts NTT in order to transmit fresh protocol information to the Neighbor Portal System. If the protocol information from the Neighbor Portal Systems times out, the Receive machine installs default parameter values for use by the other state machines.

Figure 9:
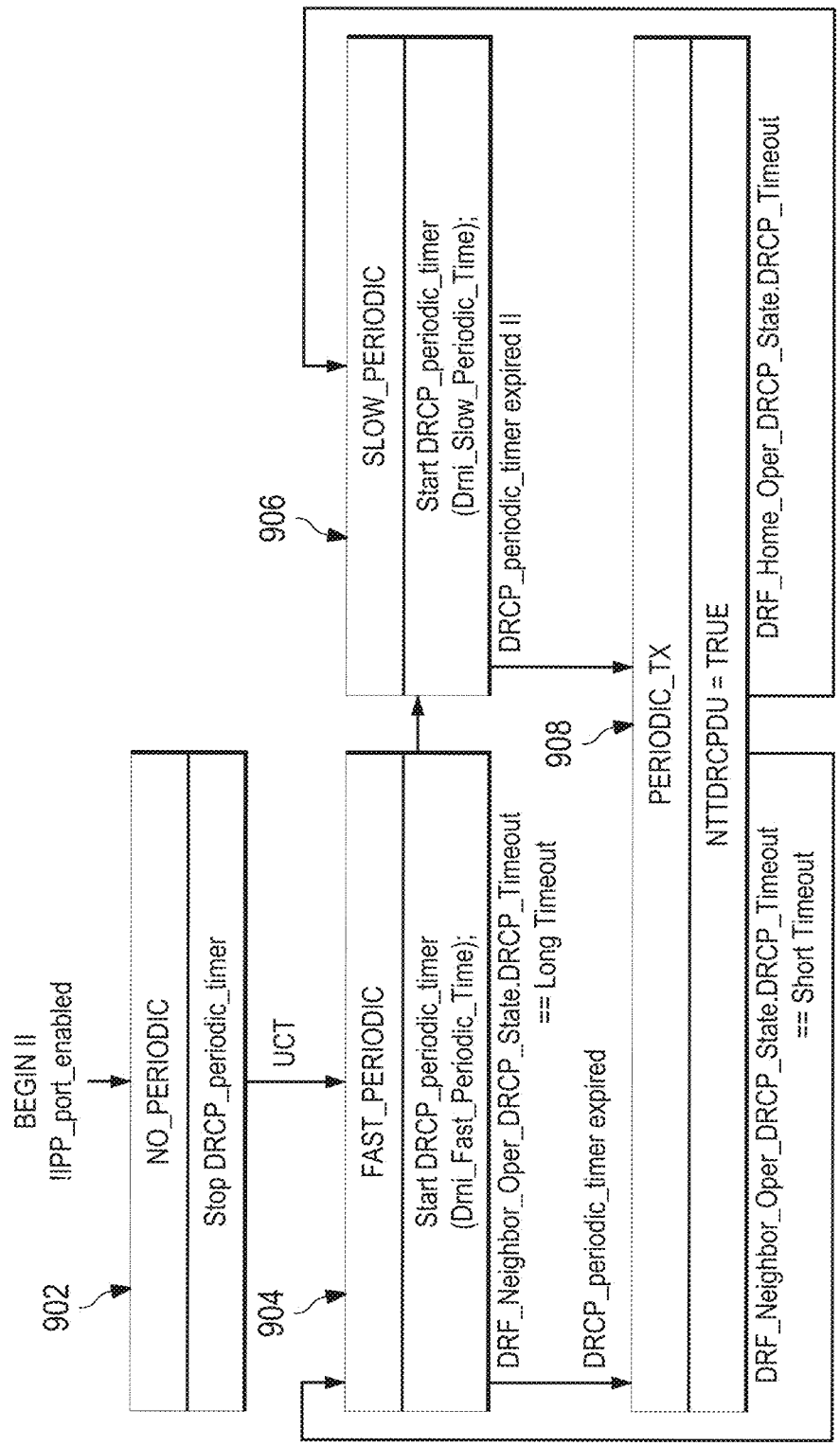
FIG. 9 is a flowchart illustrating a state machine for periodic transmission.

B) Periodic Transmission machine (PTS—see FIG. 9). This state machine determines the period that the Home Portal System and its Neighbors will exchange DRCPDUs in order to maintain the Portal.

Figure 10:
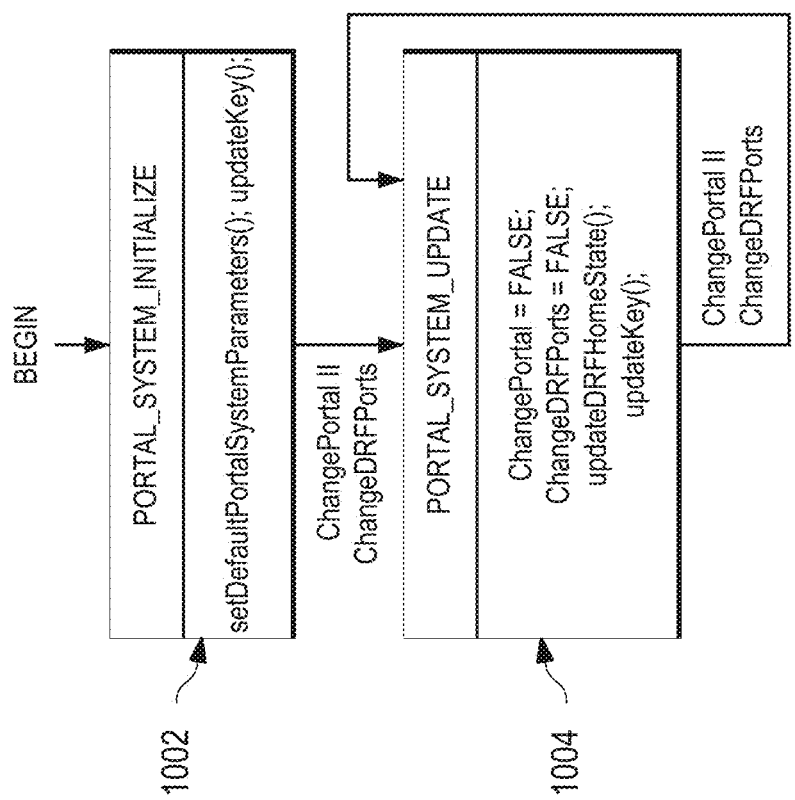
FIG. 10 is a flowchart illustrating a portal system machine.

C) Portal System machine (PS—see FIG. 10). This state machine is responsible to update the operational status of all the Gateways and Aggregation Ports in the Portal based on local information and DRCPDUs received on the Home Portal System's IPPs. This state machine is per Portal System.

D) DRNI Gateway and Aggregator machines (DGA—see FIG. 11). These state machines are responsible for configuring the Gateway Conversation IDs which are allowed to pass through this DR function's Gateway and the Port Conversation IDs which are allowed to be distributed through this DR function's Aggregator. These state machine are per Portal System.

E) DRNI IPP machine (IPP—see FIG. 12). These state machines are responsible for configuring the Gateway Conversation IDs and the Port Conversation IDs which are allowed to pass through this DR Function's IPPs.

F) Transmit machine (TX—see subsection Transmit machine herein below). This state machine handles the transmission of DRCPDUs, both on demand from the other state machines, and on a periodic basis.

Figure 7:
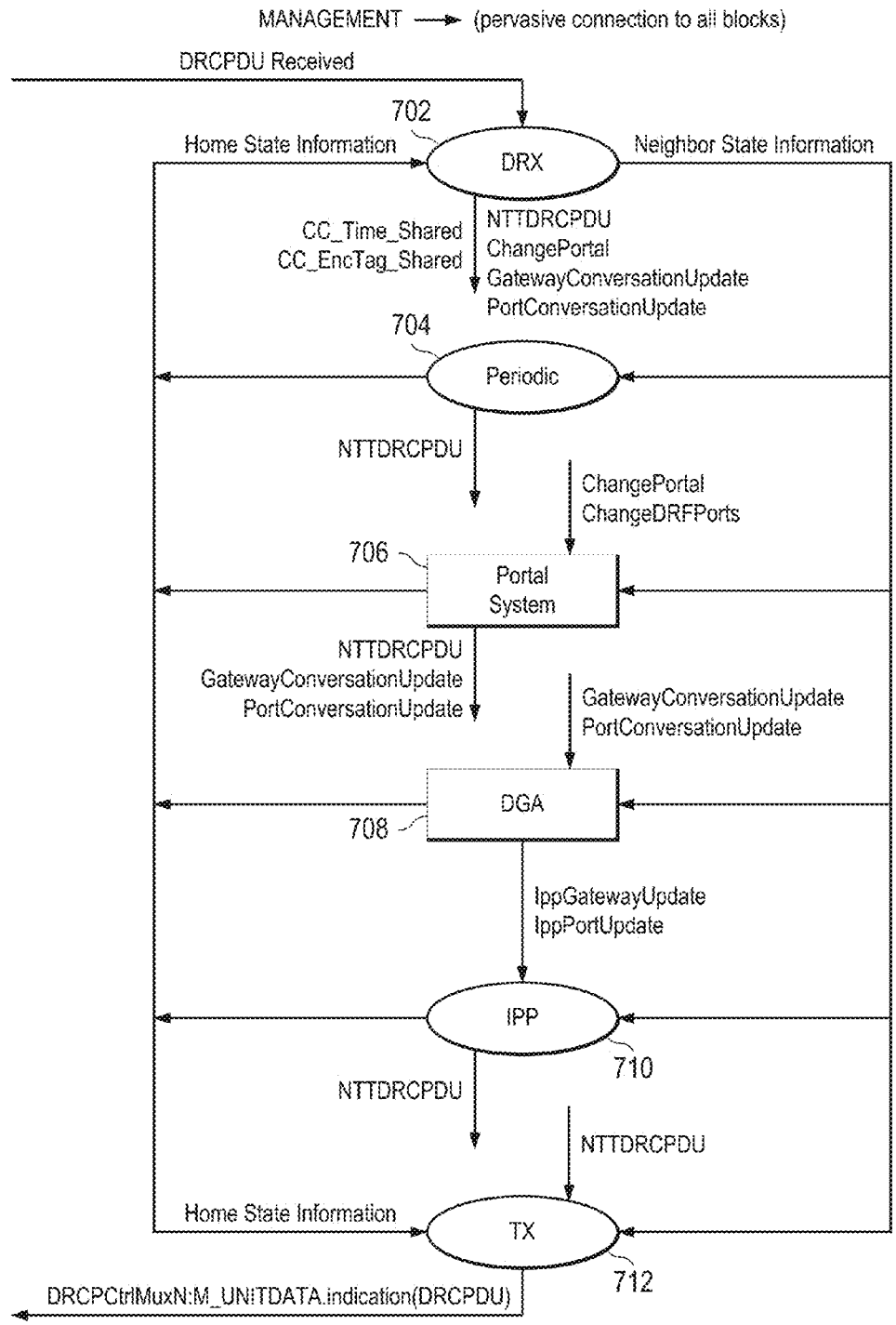
FIG. 7 is a flowchart illustrating relationships among state machines.

FIG. 7 illustrates the relationships among these state machines and the flow of information between them according to one embodiment of the invention. The set of arrows labeled Neighbor State Information represents new Neighbor information, contained in an incoming DRCPDU or supplied by administrative default values, being fed to each state machine by the Receive machine. The set of arrows labeled Home State Information represents the flow of updated Home state information between the state machines. Transmission of DRCPDUs occurs either as a result of the Periodic machine determining the need to transmit a periodic DRCPDU, or as a result of changes to the Home's state information that need to be communicated to the Neighbors. The need to transmit a DRCPDU is signaled to the Transmit machine by asserting NTT. The remaining arrows represent shared variables in the state machine description that allow a state machine to cause events to occur in another state machine.

Figure 15:
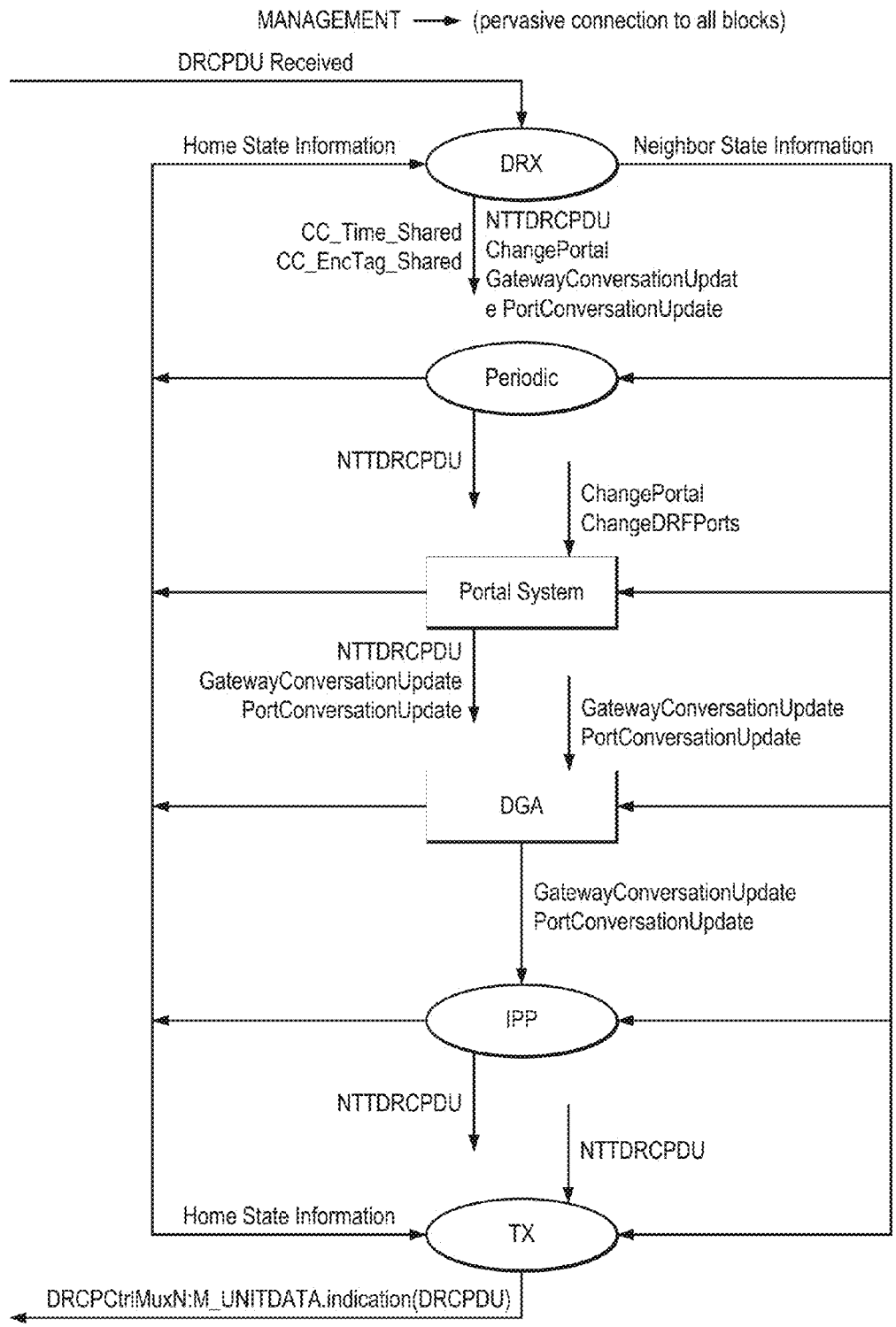
FIG. 15 is another flowchart illustrating relationships among state machines according to one embodiment of the invention.

FIG. 15 illustrates the relationships among these state machines and the flow of information between them according to another embodiment of the invention. The alternate embodiment operates in a similar fashion according the principles and structures described herein and illustrated in the diagram of FIG. 15. Thus, the description generally applies to both embodiments except where noted.

These state machines utilize a set of constants, variables, messages and functions as detailed herein below.

Management for Distributed Resilient Network Interconnect

Distributed Relay Attributes
aDrniPortalId
ATTRIBUTE
APPROPRIATE SYNTAX: A SEQUENCE OF 8 OCTETS that match the syntax of a 48-bit MAC Address
BEHAVIOUR DEFINED AS: A read-write identifier of a particular Portal. aDrniPortalId has to be unique among at least all of the potential Portal Systems to which a given Portal System might be attached via an IPL. Also used as the Actor's System ID for the emulated system.

DrniDescription
ATTRIBUTE
APPROPRIATE SYNTAX:
A PrintableString, 255 characters max.
BEHAVIOUR DEFINED AS:
A human-readable text string containing information about the Distribute Relay. This string is read-only. The contents are vendor specific.

aDrniName
ATTRIBUTE
APPROPRIATE SYNTAX:
A PrintableString, 255 characters max.
BEHAVIOUR DEFINED AS:
A human-readable text string containing a locally significant name for the Distributed Relay. This string is read-write.

aDrniPortalAddr
ATTRIBUTE
APPROPRIATE SYNTAX:
A SEQUENCE OF 6 OCTETS that match the syntax of a 48-bit MAC Address
BEHAVIOUR DEFINED AS:
A read-write identifier of a particular Portal. aDrniPortalAddr has to be unique among at least all of the potential Portal Systems to which a given Portal System might be attached via an IPL. Also used as the Actor's System ID (6.3.2) for the emulated system.

aDrniPortalPriority
ATTRIBUTE
APPROPRIATE SYNTAX: INTEGER
BEHAVIOUR DEFINED AS: A 2-octet read-write value indicating the priority value associated with the Portal's ID. Also used as the Actor's System Priority for the emulated system.

aDrniPortalTopology
ATTRIBUTE
APPROPRIATE SYNTAX:
INTEGER
BEHAVIOUR DEFINED AS:
A read-write value indicating the Portal's topology. Value 3 stands for a Portal of three Portal Systems connected in a ring by three Intra-Portal Links, Value 2 stands for a Portal of three Portal Systems connected in a chain by two IPLs, Value 1 stands for a Portal of two Portal Systems connected by a single IPL and Value 0 stands for a Portal of a single Portal System with no active IPLs. The default value is 1.

aDrniPortalSystemNumber
ATTRIBUTE
APPROPRIATE SYNTAX: A Portal System Number, which is an integer in the range 1 through 3 inclusive.
BEHAVIOR DEFINED AS: A read-write identifier of this particular Portal System within a Portal. Must be unique among the Portal Systems with the same aDrniPortalId.

aDrniIntraPortalLinkList
ATTRIBUTE
APPROPRIATE SYNTAX: A SEQUENCE OF INTEGERs that match the syntax of an Interface Identifier.
BEHAVIOR DEFINED AS: Read-write list of the Intra-Portal Links assigned to this Distributed Relay. The Port Number of each IPL is configured to much the Portal System Number of the attached Portal System.

aDrniLoopBreakLink
ATTRIBUTE
APPROPRIATE SYNTAX
An INTEGER that match the syntax of an Interface Identifier.
BEHAVIOR DEFINED AS
A read-write identifier that matches one of the Interface Identifiers of the aDrniIntraPortalLinkList. Its value identifies the interface ("Loop Break Link") that needs to break the data loop, in the case of a Portal of three Portal Systems connected in a ring, when all the IPLs are operational. This managed object is only used when the value in aDrniPortalTopology is 3.

aDrniAggregator
ATTRIBUTE
APPROPRIATE SYNTAX: An INTEGER that matches the syntax of an Interface Identifier.
BEHAVIOR DEFINED AS: Read-write Interface Identifier of the Aggregator Port assigned to this Distributed Relay.

aDrniConvAdminGateway[ ]
ATTRIBUTE
APPROPRIATE SYNTAX: An array of SEQUENCE OF INTEGERs that match the syntax of Portal System Number.
BEHAVIOR DEFINED AS: There are 4096 aDrniConvAdminGateway[ ] variables, aDrniConvAdminGateway[0] through aDrniConvAdminGateway[4095], indexed by Gateway Conversation ID. Each contains the current administrative value of the Gateway selection priority list for the Distributed Relay. This selection priority list, a sequence of integers for each Gateway Conversation ID, is a list of Portal System Numbers in the order of preference, highest to lowest, for the corresponding preferred Portal System's Gateway to carry that Conversation.

NOTE—To the extent that the network administrator fails to configure the same values for the aDrniConvAdminGateway[ ] variables in all of the DR Functions of a Portal, frames can be misdirected. The Distributed Relay Control Protocol (DRCP, 9.4) prevents against such type of misconfigurations.

aDrniGatewayAlgorithm
ATTRIBUTE
APPROPRIATE SYNTAX: A SEQUENCE OF OCTETS consisting of an Organization Unique Identifier (OUI) and one or more following octets.
BEHAVIOR DEFINED AS: This object identifies the algorithm used by the DR Function to assign frames to a Gateway Conversation ID.

Constants
The following discussion focuses on a variety of constants applicable according to one embodiment of the invention. All timers specified in this section have an implementation tolerance of ±250 ms.

Fast_Periodic_Time: The number of seconds between periodic transmissions using Short Timeouts.
Value: Integer; 1
Slow_Periodic_Time: The number of seconds between periodic transmissions using Long Timeouts.
Value: Integer; 30
Short_Timeout_Time: The number of seconds before invalidating received LACPDU information when using Short Timeouts (3×Fast_Periodic_Time).
Value: Integer; 3
Long_Timeout_Time: The number of seconds before invalidating received LACPDU information when using Long Timeouts (3×Slow_Periodic_Time).
Value: Integer; 90
Aggregate_Wait_Time: The number of seconds to delay aggregation, to allow multiple links to aggregate simultaneously.
Value: Integer; 2

Variables Associated with the Distributed Relay
The following discussion focuses on a variety of variables associated with the distributed relays according to one embodiment of the invention.

Drni_Aggregator_Priority: The System Priority of the Aggregator associated to this Portal. Always set equal to aAggActorSystemPriority. Transmitted in DRCPDUs.
Value: Integer; Assigned by administrator or System policy.

Drni_Aggregator_ID: The MAC address component of the System Identifier of the Aggregator associated with this Portal. Always set equal to aAggActorSystemID and it is ransmitted in DRCPDUs.
Value: 48 bits Drni_Gateway_Conversation: Operational vector listing which Portal System's Gateway (if any) is passing each Gateway Conversation ID.
Value: sequence of Portal System Numbers (0 for none), indexed by Gateway Conversation ID.
Value computed from aDrniConvAdminGateway[ ] and Drni_Portal_System_State[ ] upon initialization and whenever the managed object or variable changes.

Drni_Port_Conversation: Operational vector listing which Portal System (if any) is passing each Port Conversation ID.

Value: sequence of Portal System Numbers (0 for none), indexed by Port Conversation ID.

Value computed from aAggConversationAdminPort[ ] and Drni_Portal_System_State[ ] upon initialization and whenever the managed object or variable changes.

Drni_Portal_Priority: The System Priority of the Portal. Always set equal to aDrniPortalPriority. Transmitted in DRCPDUs.

Value: Integer

Assigned by administrator or System policy.

Drni_Three_System_Portal

A Boolean indicating if this is a Portal System that is part of a Portal consisting of three Portal Systems. Always set equal to aDrniThreePortalSystem. Transmitted in DRCPDUs.

Value: Boolean

Assigned by administrator or System policy.

Drni_PortalID (or Drni_Portal_Addr in some embodiment): The MAC address component of the System Identifier of the Portal. Always set equal to aDrniPortalId. Transmitted in DRCPDUs.

Value: 48 bits

Assigned by administrator or System policy.

Drni_Portal_Topology: The Portal's configured topology. Always set equal to aDrniPortalTopology. Transmitted in DRCPDUs.

Value: An integer in the range [0 . . . 3]

Assigned by administrator or System policy.

Per-DR Function Variables

ChangeDRFPorts: This variable tracks the operational state of the Gateway and all Aggregation Ports associated to this Portal System and is set to TRUE when any of them changes. This variable can also be set to TRUE if new values for the Drni_Conversation_GatewayList[ ] or Drni_Conversation_PortList[ ] are initiated.

Value: Boolean

ChangePortal: This variable is set to TRUE when the DRF_Neighbor_Oper_DRCP_State.IPP_Activity on any IPP on this Portal System changes. The variable can also be set to TRUE by the recordPortalConfValues function.

Value: Boolean

Drni_Common_Methods

A flag indicating whether the Gateway and the Port Algorithms use the same methods for frame distribution across the Portal Systems within a Portal. Always set equal to aDrniPortConversationControl. Transmitted in DRCPDUs.

Value: Boolean

Drni_Conversation_GatewayList[ ]: An array of 4096 lists, indexed by Gateway Conversation ID, that determines which Gateway in this Portal carries which Gateway Conversation ID. Each item in the array is a list of Gateways in this Portal, in priority order from most desired to least desired, for carrying the indexed Gateway Conversation ID. Assigned by administrator or system policy. Always set equal to aDrniConvAdminGateway[ ].

Drni_Conversation_PortList[ ]: An array of 4096 lists, indexed by Port Conversation ID, that determines which Aggregation Port in this Portal carries which Port Conversation ID. Each item in the array is a list of Aggregation Ports in this Portal, in priority order from most desired to least desired, for carrying the indexed Port Conversation ID. Assigned by administrator or system policy. Always set equal to aAggConversationAdminPort[ ].

Value: sequence of Port IDs

Drni_Portal_System_State[ ]: The states of all Portal Systems in this Portal, indexed by Portal System Number.

Value: Boolean flag indication operation state of Gateway (TRUE indicates operational), a List (perhaps empty) of the Port IDs of the operational Aggregation Ports in that Portal System, and the identity of the IPP, if any, from which the Portal System's state was obtained. This variable is set by the updatePortalState function. Transmitted in DRCPDUs.

DRF_Home_Admin_Aggregator_Key: The administrative Aggregator Key value associated with this Portal System's Aggregator. Transmitted in DRCPDUs.

Value: Integer

In one embodiment, DRF_Home_Admin_Aggregator_Key is assigned by administrator or System policy. The DRF_Home_Admin_Aggregator_Key is configured and must be different for each Portal System. Specifically the two most significant bits must be different in each Portal System. The lower 14 bits may be any value, do not need to be the same in each Portal System, and have a default of zero.

Assigned by Administrator or System Policy.

DRF_Home_Conversation_GatewayList_Digest: A digest of aDrniConvAdminGateway[ ], configured in this DR Function, for exchange with the Neighbor Portal Systems. The digest, is a 16-octet MD5 fingerprint [see IETF RFC 1321 (1992)] created from the aDrniConvAdminGateway[ ]. To calculate the digest, aDrniConvAdmin Gateway[ ] is considered to contain 4096 consecutive elements, where each element contains a list of Portal System Numbers, encoded as binary numbers in the order of preference, highest to lowest, followed by the Gateway Conversation ID. The first element of the table contains the prioritized list of Portal System Numbers assigned to Gateway Conversation ID 0, the second element the prioritized list of Portal System Numbers assigned to Gateway Conversation ID 1, the third element the prioritized list of Portal System Numbers assigned to Gateway Conversation ID 2, and so on, with the last element containing the prioritized list of Portal System Numbers assigned to Gateway Conversation ID 4095. This variable is referenced by the DRCPDU.

Value: MD5 digest

DRF_Home_Conversation_PortList_Digest: A digest of aAggConversationAdminPort[ ], configured in this DR Function, for exchange with the Neighbor Portal Systems. Transmitted in DRCPDUs.

Value: MD5 digest

DRF_Home_Gateway_Algorithm: The gateway algorithm used by this DR Function to assign frames to Gateway Conversation IDs. Always set equal to the aDrniGatewayAlgorithm. Transmitted in DRCPDUs.

Value: 4-octet (3-octet OUI identifying the organization that is responsible for setting this algorithm followed by two octets identifying this specific algorithm). In another embodiment, 5 octets are used.

DRF_Home_Port_Algorithm: The port algorithm used by this DR Function to assign frames to Port Conversation IDs. Always set equal to the associated Aggregator's aAggPortAlgorithm. Transmitted in DRCPDUs.

Value: 4-octet (3-octet OUI identifying the organization that is responsible for setting this algorithm followed by two octets identifying this specific algorithm). In another embodiment, 5 octets are used.

DRF_Home_Oper_Aggregator_Key: The operational Aggregator Key value associated with this Portal System's Aggregator. Its value is computed by the updateKey function. Transmitted in DRCPDUs.

Value: Integer

DRF_Home_Oper_Partner_Aggregator_Key: The operational Partner Aggregator Key associated with this Portal System's Aggregator LAG ID. Transmitted in DRCPDUs.

Value: Integer

DRF_Home_State: The operational state of this DR Function. Transmitted in DRCPDUs.

Value: Boolean flag indication operation state of this Portal System's Gateway (TRUE indicates operational) and a List (perhaps empty) of the Port IDs of the operational Aggregation Ports in this Portal System.

DRF_Neighbor_Admin_Conversation_GatewayList_Digest: The value for the Algorithm of the Neighbor Portal System, assigned by administrator or System policy for use when the Neighbor's information is unknown. Its default value is the MD5 digest computed from aDrniConvAdminGateway[ ].

Value: MD5 digest

DRF_Neighbor_Admin_Conversation_PortList_Digest: The value for the Algorithm of the Neighbor Portal System, assigned by administrator or System policy for use when the Neighbor's information is unknown. Its default value is the MD5 digest computed from aAggConversationAdmin Port[ ].

Value: MD5 digest

DRF_Neighbor_Admin_Gateway_Algorithm: The value for the gateway algorithm of the Neighbor Systems, assigned by administrator or System policy for use when the Neighbor's information is unknown. Its default value is set equal to aDrniGatewayAlgorithm.

Value: 4-octet (3-octet OUI identifying the organization that is responsible for setting this algorithm followed by two octets identifying this specific algorithm). In another embodiment, 5 octets are used.

DRF_Neighbor_Admin_DRCP_State: Default value for the Neighbor Portal's DRCP state parameters, assigned by administrator or System policy for use when the Partner's information is unknown or expired. The value consists of the following set of variables, as described one embodiment:

HomeGateway
NeighborGateway
OtherGateway
IPPActivity
Timeout
GatewaySync
PortSync
Expired
Value: 8 bits DRF_Neighbor_Admin_Port_Algorithm: The value for the port algorithm of the Neighbor Systems, assigned by administrator or System policy for use when the Neighbor's information is unknown. Its default value is set equal to aAggPortAlgorithm.

Value: 4-octet (3-octet OUI identifying the organization that is responsible for setting this algorithm followed by two octets identifying this specific algorithm). In another embodiment, 5 octets are used.

DRF_Portal_System_Number: A unique identifier for this Portal System in the Portal.

Value: An integer in the range [1 . . . 3] in one embodiment.

Copied from aDrniPortalSystemNumber. Transmitted in DRCPDUs.

PSI (portal state isolated): This variable is set to TRUE by the updateDRFHomeState function when the Portal System is isolated from the other Portal Systems within the same Portal.

Value: Boolean.

Per-IPP Variables

The following discussion focuses on a variety of variables per IPP according to one embodiment of the invention.

Ipp_Gateway_Conversation_Direction: Operational list of which Gateway Conversation IDs are passing through Gateways reachable through this IPP. It is set by the operation of DRCP.

Value: Vector of Boolean flags indexed by Gateway Conversation ID; TRUE=some Gateway reachable through this IPP is enabled for this Gateway Conversation ID.

For each Gateway Conversation ID, the value is TRUE if and only if a) the variables Drni_Gateway_Conversation and Drni_Portal_System_State[ ] indicate that the target Portal System for this Gateway Conversation ID lies behind this IPP, and b) Drni_Gateway_Conversation and Ipp_Other_Gateway_Conversation are in agreement as to which Portal System should get this Gateway Conversation ID. Ipp_Gateway_Conversation_Direction is initialized to FALSE and recomputed whenever any of its contributing variables changes. For frames received on this IPP, TRUE means that the frame is a Down frame, ultimately destined for an Aggregator (or discard), and FALSE means the frame is an Up frame, ultimately destined for a Gateway (or discard). For frames offered for transmission on this IPP, TRUE indicates that the frame can pass, and FALSE that it cannot. This variable is not used to control Down frames.

Ipp_Port_Conversation_Passes: Operational list of which Port Conversation IDs are allowed to be transmitted through this IPP.

Value: Vector of Boolean flags indexed by Port Conversation ID.

This variable is examined only when a Down frame is offered for transmission on this IPP. For each Port Conversation ID, the value is TRUE (ID passes) if and only if a) the variables Drni_Port_Conversation and Drni_Portal_System_ State[ ] indicate that the target Portal System for this Port Conversation ID lies behind this IPP, and b) Drni_Port_Conversation and Ipp_Other_Port_Conversation_Portal_System are in agreement as to which Portal System should get this Port Conversation ID. Ipp_Port_Conversation_Passes is initialized to FALSE and recomputed whenever any of its contributing variables changes.

ChangePortal: This variable is set to TRUE when the DRF_Neighbor_Oper_DRCP_State.IppActivity on any IPP on this Portal System Changes.

Value: Boolean

CC_Time_Shared: A Boolean indicating that Neighbor and Home Portal Systems on this IPP are consistently configured to use Network/IPL sharing by time.

Value: Boolean

CC_EncTag_Shared: A Boolean indicating that Neighbor and Home Portal Systems on this IPP are consistently configured to use Network/IPL sharing by tag or Network/IPL sharing by encapsulation as dictated by the Network/IPL method selected the aDrniEncapsulationMethod.

Value: Boolean

Differ_Conf_Portal: A Boolean indicating that the configured 14 least significant bit of administrative value of the key for the Portal Aggregator used by the immediate Neighbor Portal System on this IPP are different from the expected ones.

Value: Boolean

Differ_Conf_Portal_System_Number

A Boolean indicating the configured Portal System Numbers used by the immediate Neighbor Portal System on this IPP are different from the expected ones.

Value: Boolean

Differ_Gateway_Digest

A Boolean indicating that the Gateway_Digest used by the immediate Neighbor Portal System on this IPP is different from the expected one.

Value: Boolean

Differ_Port_Digest

A Boolean indicating that the Port_Digest used by the immediate Neighbor Portal System on this IPP is different from the expected one.

Value: Boolean

Differ_Portal: A Boolean indicating that the received DRCPDU on this IPP is associated with a different Portal.

Value: Boolean

DRF_Home_Conf_Neighbor_Portal_System_Number: This Portal System's configuration value for the Portal System Number of the Neighbor Portal System attached to this IPP. Always set equal to the value assigned to the two least significant bits of the priority component of the Port ID of this IPP. Transmitted in DRCPDUs.

Value: An integer in the range [1 . . . 3].

DRF_Home_Loop_Break_Link: A Boolean indicating that the IPL attached to this IPP is configured in aDrniLoopBreakLink as a Loop Break Link. Transmitted in DRCPDUs.

Value: Boolean

DRF_Home_Network/IPL_IPLEncap_Digest: A digest of aDrniIPLEncapMap, configured on this IPP, for exchange with the Neighbor Portal System on the IPL. Transmitted in the Network/IPL Sharing Encapsulation TLV. The digest is calculated in a way similar to that specified for DRF_Home_Conversation_GatewayList_Digest where in place of the list of Portal System Numbers provided by aDrniConvAdminGateway[ ], the identifiers for the encapsulation method provided by aDrniIPLEncapMap are used instead.

Value: MD5 digest

DRF_Home_Network/IPL_NetEncap_Digest: A digest of aDrniNetEncapMap, configured on this IPP, for exchange on the shared network link. The digest is calculated in a way similar to that specified for DRF_Home_Conversation_GatewayList_Digest where in place of the list of Portal System Numbers provided by aDrniConvAdminGateway[ ], the identifiers for he translated values of the identifiers used for a network frame provided by aDrniNetEncapMap are used instead. Transmitted in the Network/IPL Sharing Encapsulation TLV.

Value: MD5 digest

DRF_Home_Network/IPL_Sharing_Method: The Network/IPL sharing method used by this DR Function to share this IPP with network data. Always set equal to the aDrniEncapsulationMethod. Transmitted in the Network/IPL Sharing Method TLV when the aDrniEncapsulationMethod is not set to the default NULL value.

Value: 4-octet (3-octet OUI identifying the organization that is responsible for defining this method followed by one octet identifying this specific method).

DRF_Home_Oper_DRCP_State: The operational values of this Portal System's DRCP state parameters as reported on this IPP. This consists of the following set of variables, as described herein above:

HomeGateway
NeighborGateway
OtherGateway
IPPActivity
Timeout
GatewaySync
PortSync
Expired Value: 8 bits DRF_Neighbor_Admin_Aggregator_Key: In one embodiment, it is defined as the administrative Aggregator Key value of the Neighbor Portal System on this IPP. Transmitted in DRCPDUs.

Value: Integer

DRF_Neighbor_Aggregator_Priority: The last received, System Priority of the Neighbor's Aggregator, on this IPP.

Value: Integer

DRF_Neighbor_AggregatorID: The last received, MAC address component of Aggregator System ID of the Neighbor Portal System, on this IPP.

Value: 48 bits

DRF_Neighbor_Aggregator_Priority: The last received, System Priority of the Neighbor Portal System's Aggregator, on this IPP.

Value: Integer

DRF_Neighbor_Conversation_GatewayList_Digest: The last-received gateway conversation ID digest of the Neighbor Portal System on this IPP.

Value: MD5 digest

DRF_Neighbor_Conversation_PortList_Digest: The last-received Port Conversation ID digest of the Neighbor Portal system on this IPP Value: MD5 digest DRF_Neighbor_Gateway_Algorithm: The value of the algorithm used by the Neighbor Portal System to assign frames to Gateway Conversation IDs received on this IPP.

Value: 4-octet (3-octet OUI identifying the organization that is responsible for setting this algorithm followed by two octets identifying this specific algorithm). In another embodiment, 5 octets are used.

DRF_Neighbor_Loop_Break_Link: A Boolean indicating that the IPL attached to this IPP is identified by the Neighbor Portal System on this IPP as a Loop Break Link.

Value: Boolean

DRF_Neighbor_Network/IPL_IPLEncap_Digest: The last-received digest of aDrniIPLEncapMap of the Neighbor Portal System on this IPP.

Value: MD5 digest

DRF_Neighbor_Network/IPL_NetEncap_Digest: The last-received digest of aDrniNetEncapMap, for exchange on the shared network link of the Neighbor Portal System on this IPP.

Value: MD5 digest

DRF_Neighbor_Network/IPL_Sharing_Method: The last-received Network/IPL sharing method used of the Neighbor Portal System on this IPP.

Value: 4-octet (3-octet OUI identifying the organization that is responsible for defining this method followed by one octet identifying this specific method).

DRF_Neighbor_Oper_Aggregator_Key: The last-received operational Aggregator Key value of the Neighbor Portal System on this IPP.

Value: Integer

DRF_Neighbor_Oper_Partner_Aggregator_Key: The operational Partner Aggregator Key value of the Neighbor Portal System on this IPP. Transmitted in DRCPDUs.

Value: Integer

DRF_Neighbor_Oper_DRCP_State: The operational value of this Portal System's view of the current values of the Neighbor's DRCP state parameters. The Home DR Function sets this variable either to the value received from the Neighbor Portal System in an DRCPDU. The value consists of the following set of variables, as described herein above:

HomeGateway
NeighborGateway
OtherGateway
IPPActivity
Timeout
GatewaySync
PortSync
Expired
Value: 8 bits DRF_Neighbor_Conf_Portal_System_Number: The Neighbor Portal System's configuration Portal System Number value for this Portal System that was last received on this IPP.
Value: An integer in the range [1 . . . 3].

DRF_Neighbor_Port_Algorithm: The value of the algorithm used by the Neighbor Portal System to assign frames to Port Conversation IDs received on this IPP.
Value: 4-octet (3-octet OUI identifying the organization that is responsible for setting this algorithm followed by two octets identifying this specific algorithm). In another embodiment, 5 octets are used.

DRF_Neighbor_Portal_System_Number: The last received identifier of the Neighbor Portal System on this IPP.
Value: An integer in the range [1 . . . 3].

DRF_Neighbor_Portal_Topology: The last received identifier of the Neighbor's Portal Topology on this IPP.
Value: An integer in the range [0 . . . 3].

DRF_Neighbor_State: The operational state of the immediate Neighbor Portal System on this IPP.
Value: Boolean flag indicating the operational state of the Neighbor Portal System's Gateway (TRUE indicates operational) and a List (perhaps empty) of the Port IDs of the operational Aggregation Ports on this IPP.

Drni_Neighbor_ONN
The last received ONN flag of the Neighbor Portal System on this IPP carried within the Topology State field.
Value: Integer DRF_Other_Neighbor_Admin_Aggregator_Key: The administrative Aggregator Key value of the other neighbor Portal System associated this IPP. Transmitted in DRCPDUs.
Value: Integer DRF_Other_Neighbor_Oper_Partner_Aggregator_Key: The operational Partner Aggregator Key value of the other neighbor Portal System associated this IPP. Transmitted in DRCPDUs.
Value: Integer DRF_Other_Neighbor_State: The operational state of the other neighbor Portal System on this IPP.
Value: Boolean flag indicating the operational state of the other neighbor Portal System's Gateway (TRUE indicates operational), the Boolean Gateway Vector associated with the most recent entry in the Gateway Vector database for the Other neighbor Portal System, and a List (perhaps empty) of the Port IDs of the operational Aggregation Ports of the Other neighbor Portal System on this IPP.

DRF_Rcv_Home_Gateway_Conversation_Mask
The operational value of this Portal System's Gateway Vector as reported by the Neighbor Portal System on this IPP. Its value is updated by the recordNeighborState function.
Value: sequence of Boolean values, indexed by Gateway Conversation ID.

DRF_Rcv_Home_Gateway_Sequence
The operational value of this Portal System's Gateway sequence number as reported by the Neighbor Portal System on this IPP. Its value is updated by the recordNeighborState function.
Value: Integer DRF_Rcv_Neighbor_Gateway_Conversation_Mask
The operational value of the Neighbor Portal System's Gateway Vector as reported by the Neighbor Portal System on this IPP itself. Its value is updated by the recordNeighborState function.
Value: sequence of Boolean values, indexed by Gateway Conversation ID.

DRF_Rcv_Neighbor_Gateway_Sequence
The operational value of the Neighbor Portal System's Gateway sequence number as reported by the Neighbor Portal System on this IPP itself. Its value is updated by the recordNeighborState function.
Value: Integer DRF_Rcv_Other_Gateway_Conversation_Mask
The operational value of the Other Portal System's Gateway Vector as reported by the Neighbor Portal System on this IPP. Its value is updated by the recordNeighborState function.
Value: sequence of Boolean values, indexed by Gateway Conversation ID.

DRF_Rcv_Other_Gateway_Sequence
The operational value of the Other Portal System's Gateway sequence number as reported by the Neighbor Portal System on this IPP. Its value is updated by the recordNeighborState function.
Value: Integer Drni_Neighbor_Common_Methods
The last received Common_Methods flag of the Neighbor Portal System on this IPP carried within the Topology State field.
Value: Boolean Drni_Neighbor_Gateway_Conversation
The last received operational Gateway_Conversation vector of the Neighbor Portal System on this IPP carried within the received Gateway Conversation Vector TLV (9.4.3.3.1).
Value: a 1024-octet vector of a sequence of Portal System Numbers (0 for none), indexed by Gateway Conversation ID if aDrniThreePortalSystem==1, or a 512-octet vector of a sequence of Boolean values, indexed by Gateway Conversation ID if aDrniThreePortalSystem==0.

Drni_Neighbor_Port_Conversation
The last received operational Port_Conversation vector of the Neighbor Portal System on this IPP carried within the received Port Conversation Vector TLV (9.4.3.3.2).
Value: a 1024-octet vector of a sequence of Portal System Numbers (0 for none), indexed by Port Conversation ID if aDrniThreePortalSystem==1, or a 512-octet vector of a sequence of Boolean values, indexed by Port Conversation ID if aDrniThreePortalSystem==0.

Drni_Neighbor_ONN
The last received ONN flag of the Neighbor Portal System on this IPP carried within the Topology State field.
Value: Boolean Drni_Neighbor_Portal_Addr: The last received MAC address component of Portal's System ID of the Neighbor Portal System on this IPP.
Value: 48 bits Drni_Neighbor_Portal_Priority: The last received System Priority of the Neighbor Portal system on this IPP.

Value: Integer

Drni_Neighbor_PortalID: The last received MAC address component of Portal System ID of the Neighbor Portal System on this IPP.

Value: 48 bits

Drni_Neighbor_State[ ]: The last received operational value of Drni_Portal_System_State[ ] used by the Neighbor Portal System on this IPP.

Value: For each Portal System, Boolean flag indicating the operational state of the current Portal System's Gateway (TRUE indicates operational) and a List (perhaps empty) of the Port IDs of the operational Aggregation Ports in this Portal System as reported by the Neighbor Portal System on this IPP.

Drni_Neighbor_Three_System_Portal

The last received Boolean flag indicating if the Neighbor Portal System on this IPP is a Portal System that is part of a Portal consisting of three Portal Systems.

Value: Boolean

Enabled_Time_Shared: A Boolean indicating that Neighbor and Home Portal System on this IPP are consistently configured and the Network/IPL sharing by time methods specified herein are enabled.

Value: Boolean

Enabled_EncTag_Shared: A Boolean indicating that Neighbor and Home Portal System on this IPP are consistently configured to use the tag manipulation methods of Network/IPL sharing by tag or Network/IPL sharing by encapsulation, as dictated by the Network/IPL method, selected by the aDrniEncapsulationMethod.

Value: Boolean

Ipp_Other_Gateway_Conversation: The operational vector listing which Portal System's Gateway (if any) is passing each Gateway Conversation ID as reported by the immediate Neighbor on this IPP.

Value: sequence of Portal System Numbers (0 for none), indexed by Gateway Conversation ID. Value computed from aDrniConvAdminGateway[ ] and DRF_Neighbor_State[ ] upon initialization and whenever the managed object changes or GatewayConversationUpdate is FALSE.

Ipp_Other_Port_Conversation_Portal_System: The operational vector listing which Portal System (if any) is passing each Port Conversation ID as reported by the immediate Neighbor on this IPP.

Value: sequence of Portal System Numbers (0 for none), indexed by Port Conversation ID. Value computed from aAggConversationAdminPort[ ] and DRF_Neighbor_State[ ] upon initialization and whenever the managed object changes or PortConversationUpdate is FALSE.

IPP_port_enabled: A variable indicating that the link has been established and the IPP is operable.

Value: Boolean

TRUE if the IPP is operable (MAC_Operational==TRUE).

FALSE otherwise.

NOTE—The means by which the value of the IPP_port_enabled variable is generated by the underlying MAC is implementation-dependent.

Ipp_Portal_System_State[ ]: The List of the states of the Portal Systems reachable through this IPP that was last received in a DRCPDU from this IPP. This variable is updated by the updatePortalSystem function.

Value: For each Portal System, Boolean flag indicating the operational state of the current Portal System's Gateway reachable through this IPP (TRUE indicates operational) and a List (perhaps empty) of the Port IDs of the operational Aggregation Ports in that Portal System.

In this list, the state of the immediately adjacent Portal System is the first state in the list. The list can have at most two Portal System's states.

Missing_Rcv_Gateway_Con_Vector

This variable indicates that Differ_Gateway_Digest is set to TRUE and no Drni_Neighbor_Gateway_Conversation can be extracted from the last received DRCPDU.

Value: Boolean

Missing_Rcv_Port_Con_Vector

This variable indicates that Differ_Port_Digest is set to TRUE and no Drni_Neighbor_Port_Conversation can be extracted from the last received DRCPDU.

Value: Boolean

NTTDRCPDU: TRUE indicates that there is new protocol information that should be transmitted on this IPP, or that the Neighbor Portal System needs to be reminded of the old information. FALSE is used otherwise.

ONN

Other Non Neighbor flag. This value is updated by the updatePortalState function and is applicable only on Portals consisting of three Portal Systems. Transmitted in DRCPDUs.

Value: Boolean

TRUE indicates that the Other Ports Information TLV is not associated with an immediate Neighbor of this Portal System. FALSE (encoded as 0) indicates that the Other Ports Information TLV is an immediate Neighbor on the other IPP on this Portal System.

DRCP_current_while_timer

This timer is used to detect whether received protocol information has expired. If DRF_Home_Oper_DRCP_State.DRCP_Timeout is set to Short Timeout, the timer is started with the value Short_Timeout_Time. Otherwise, it is started with the value Long_Timeout_Time.

DRCP_periodic_timer (time_value)

This timer is used to generate periodic transmissions. It is started using the value Slow_Periodic_Time or Fast_Periodic_Time, as specified in the Periodic Transmission state machine.

Constants

All timers specified in this subclause have an implementation tolerance of ±250 ms.

Drni_Fast_Periodic_Time

The number of seconds between periodic transmissions using Short Timeouts.

Value: Integer

1

Drni_Slow_Periodic_Time

The number of seconds between periodic transmissions using Long Timeouts.

Value: Integer

30

Drni_Short_Timeout_Time

The number of seconds before invalidating received DRCPDU information when using Short Timeouts (3×Fast_Periodic_Time).

Value: Integer

3

Drni_Long_Timeout_Time

The number of seconds before invalidating received DRCPDU information when using Long Timeouts (3×Slow_Periodic_Time).

Value: Integer

90

Variables Used for Managing the Operation of the State Machines

The following discussion focuses on a variety of Variables used for managing the operation of the state machines according to one embodiment of the invention.

BEGIN: This variable indicates the initialization (or reinitialization) of the DRCP protocol entity. It is set to TRUE when the System is initialized or reinitialized, and is set to FALSE when (re-)initialization has completed.

Value: Boolean

DRCP_Enabled

This variable indicates that the associated IPP is operating the DRCP. If the link is not a point-to-point link, the value of DRCP_Enabled shall be FALSE. Otherwise, the value of DRCP_Enabled shall be TRUE.

Value: Boolean

HomeGatewayVectorTransmit

This variable indicates to the DRCPDU Transmit machine (9.4.19) that it needs to transmit the DRF_Home_Gateway_Conversation_Mask in the Home_Gateway_Vector field of the Home Gateway Vector TLV. There is one HomeGatewayVectorTransmit variable per IPP on this Portal System.

Value: Boolean

GatewayConversationTransmit

This variable indicates to the DRCPDU Transmit machine that it needs to transmit the Gateway Conversation Vector TLV. It is set equal to TRUE when new values for the Drni_Conversation_GatewayList[ ] are initiated and to TRUE or FALSE as specified by the recordPortalConfValues function. There is one GatewayConversationTransmit variable per IPP on this Portal System.

Value: Boolean

GatewayConversationUpdate: This variable indicates that the per Gateway Conversation ID distributions need to be updated.

Value: Boolean

IppAllGatewayUpdate: This variable is the logical OR of the IppGatewayUpdate variables for all IPPs on this Portal System.

Value: Boolean

IppGatewayUpdate: This variable indicates that the per Gateway Conversation ID distributions on the associated IPP need to be updated. There is one IppGatewayUpdate variable per IPP on this Portal System.

Value: Boolean

IppAllPortUpdate: This variable is the logical OR of the IppPortUpdate variables for all IPPs in this Portal System.

Value: Boolean

IppAllUpdate

This variable is the logical OR of the IppPortUpdate and the IppGatewayUpdate variables for all IPPs in this Portal System.

Value: Boolean

IppGatewayUpdate

This variable indicates that the per Gateway Conversation ID distributions on the associated IPP need to be updated. There is one IppGatewayUpdate variable per IPP on this Portal System.

Value: Boolean

IppPortUpdate: This variable indicates that the per Port Conversation ID distributions on the associated IPP need to be updated. There is one IppPortUpdate variable per IPP on this Portal System.

Value: Boolean

OtherGatewayVectorTransmit

This variable indicates to the DRCPDU Transmit machine that it needs to transmit the DRF_Home_Gateway_Conversation_Mask in the Other_Gateway_Vector field of the Other Gateway Vector TLV. There is one OtherGatewayVectorTransmit variable per IPP on this Portal System.

Value: Boolean

PortConversationTransmit

This variable indicates to the DRCPDU Transmit machine that it needs to transmit the Port Conversation Vector TLV. It is set equal to TRUE when new values for the aAggConversationAdminLink[ ] are initiated and to TRUE or FALSE as specified by the recordPortalConfValues function. There is one PortConversationTransmit variable per IPP on this Portal System.

Value: Boolean

PortConversationUpdate: This variable indicates that the per Port Conversation ID distributions need to be updated.

Value: Boolean

Functions

The following discussion focuses on a variety of functions according to one embodiment of the invention.

extractGatewayConversationID

This function extracts a Gateway Conversation ID value by applying the Gateway Algorithm to the values of the parameters of the service primitive that is invoked on the DR Function's Relay entity on receipt of an ISS primitive at one of the DR Function's port. The relationship of the parameter values on the ISS primitives and the service primitives on the DR Function's Relay entity ports is provided by the associated supporting functions on those ports and their configuration.

NOTE—These supporting functions can be as simple as the EISS supporting functions specified in 6.9 of IEEE Std 802.1Q-2011, for the case of a DRNI supported on a Customer Network Port or a Provider Network Port on a Provider Bridge (Clause 15 in IEEE Std 802.1Q), or more complex, like the EISS supporting functions specified in 6.10 or 6.11 in IEEE Std 802.1Q-2011, for the case of DRNI supported on a Provider Instance Port or a Customer Backbone Port respectively on a Backbone Edge Bridge (Clause 16 in IEEE Std 802.1Q) or, like the C-tagged Service Interface supporting functions or the Remote Customer Service Interface supporting functions specified in 15.4 or 15.6 in IEEE Std 802.1Q-2013 for the case of DRNI supported on a Customer Edge Port or a Remote Access Port respectively on a Provider Edge Bridge.

Value: Integer in the range of 0 through 4095.

extractPortConversationID extractPortConversationID

This function extracts a Port Conversation ID value by applying the Port Algorithm to the values of the parameters of the service primitive that is invoked on the Aggregator on receipt of a ISS primitive at one of the other DR Function's port. The relationship of the parameter values on the ISS primitives on the Aggregator and the corresponding service primitives on the DR Function's port is provided by the associated supporting function on the Aggregator and the DR Function port and their configurations. Check the NOTE above.

Value: Integer in the range of 0 through 4095.

InitializeDRNIGatewayConversation

This function sets the Drni_Portal_System_Gateway_Conversation to a sequence of zeroes, indexed by Gateway Conversation ID.

InitializeDRNIPortConversation

This function sets the Drni_Portal_System_Port_Conversation to a sequence of zeros, indexed by Port Conversation ID.

InitializeIPPGatewayConversation

This function sets the Ipp_Gateway_Conversation_Direction to a sequence of zeros, indexed by Gateway Conversation ID.

InitializeIPPPortConversation

This function sets the Ipp_Port_Conversation_Passes to a sequence of zeros, indexed by Port Conversation ID.

recordDefaultDRCPDU

This function sets the default parameter values for the Neighbor Portal System on the IPP, provided by the administrator, to the current Neighbor Portal System's operational parameter values as follows:

DRF_Neighbor_Port_Algorithm=DRF_Neighbor_Admin_Port_Algorithm;

DRF_Neighbor_Gateway_Algorithm=DRF_Neighbor_Admin_Gateway_Algorithm;

DRF_Neighbor_Conversation_PortList_Digest=DRF_Neighbor_Admin_Conversation_PortList_Digest;

DRF_Neighbor_Conversation_GatewayList_Digest=DRF_Neighbor_Admin_Conversation_GatewayList_Digest;

DRF_Neighbor_Oper_DRCP_State=DRF_Neighbor_Admin_DRCP_State;

DRF_Neighbor_Aggregator_Priority=aAggPortPartnerAdminSystemPriority;

DRF_Neighbor_Aggregator_ID=aAggPortPartnerAdminSystemID;

Drni_Neighbor_Portal_Priority=aAggPortPartnerAdminSystemPriority;

Drni_Neighbor_Portal_Addr=aAggPortPartner AdminSystemID;

DRF_Neighbor_Portal_System_Number=DRF_Home_Conf_Neighbor_Portal_System_Number;

DRF_Neighbor_Portal_Topology=Drni_Portal_Topology;

DRF_Neighbor_Loop_Break_Link=DRF_Home_Loop_Break_Link, and;

DRF_Neighbor_Conf_Portal_System_Number= DRF_Portal_System_Number. In addition for the Neighbor Portal System on the IPP:

The DRF_Neighbor_State is set to NULL (the Boolean flag for the Neighbor Portal System's Gateway is set to FALSE and the list of the operational Aggregation Ports on the Neighbor Portal System on this IPP is emptied) and if aDrniPortalTopology is configured to contain three Portal Systems, the DRF_Other_Neighbor_State is also set to NULL (the Boolean flag for the Other neighbor Portal System's Gateway is set to FALSE and the list of the operational Aggregation Ports on the Other neighbor Portal System on this IPP is emptied). No Portal System state information is available for any Portal System on this IPP;

The DRF_Neighbor_Admin_Aggregator_Key on this IPP is set to zero;

The DRF_Other_Neighbor_Admin_Aggregator_Key on this IPP is set to zero;

The DRF_Neighbor_Oper_Partner_Aggregator_Key on this IPP is set to zero;

The DRF_Other_Neighbor_Oper_Partner_Aggregator_Key on this IPP is set to zero;

The Drni_Neighbor_Gateway_Conversation on this IPP is set
  to All_Neighbor_Conversation, which is a Portal System Number vector with all its 4096 elements set to the DRF_Home_Conf_Neighbor_Portal_System_Number, if Drni_Three_System_Portal==1 or;
  to 1, which is a Boolean Vector with all its 4096 elements set to 1, if
  Drni_Three_System_Portal==0.

The Drni_Neighbor_Port_Conversation on this IPP is set to
  All_Neighbor_Conversation, if Drni_Three_System_Portal==1 or;
  to 1, if Drni_Three_System_Portal==0; and;

The variable ChangePortal is set to TRUE.

Finally it sets CC_Time_Shared and CC_EncTag_Shared to FALSE.

recordNeighborState

This function sets DRF_Neighbor_Oper_DRCP_State.IPP_Activity to TRUE and records the parameter values for the Drni_Portal_System_State[ ] and DRF_Home_Oper_DRCP_State carried in a received DRCPDU on the IPP, as the current parameter values for Drni_Neighbor_State[ ] and DRF_Neighbor_Oper_DRCP_State associated with this IPP respectively. In particular, the operational Boolean Gateway Vectors for each Portal System in the Drni_Neighbor_State[ ] are extracted from the received DRCPDU as follows:

For the DRF_Rcv_Neighbor_Gateway_Conversation_Mask, if the Home_Gateway bit in the DRF_Home_Oper_DRCP_State carried in the received DRCPDU is 0;

DRF_Rcv_Neighbor_Gateway_Conversation_Mask is set to NULL;

Otherwise if the Home_Gateway_Vector field is present in the received Home Gateway Vector TLV;

DRF_Rcv_Neighbor_Gateway_Conversation_Mask=Home_Gateway_Vector;

The tuple (Home_Gateway_Sequence, Home_Gateway_Vector) in the received Home Gateway Vector TLV is stored as an entry in the Gateway Vector database for the Neighbor Portal System on this IPP, indexed by the received Home_Gateway_Sequence in increasing sequence number order, and;

The OtherGatewayVectorTransmit on the other IPP, if it exists and is operational, is set to TRUE;

Otherwise if the Home_Gateway_Vector field is not present in the received Home Gateway Vector TLV;

The OtherGatewayVectorTransmit on the other IPP, if it exists and is operational, is set to FALSE, and;

The Home_Gateway_Sequence is used as an index for a query in the Gateway Vector database for the Neighbor Portal System on this IPP and;

If the tuple (Home_Gateway_Sequence, Neighbor_Gateway_Vector) is stored as the first entry in the database, then;

DRF_Rcv_Neighbor_Gateway_Conversation_Mask=Neighbor_Gateway_Vector;

Otherwise

DRF_Rcv_Neighbor_Gateway_Conversation_Mask=1, where 1 is a Boolean Vector with all its 4096 elements set to 1.

NOTE—If a Gateway bit is set but no valid Gateway Vector is available then to avoid looping the recipient must assume that the neighbor Portal System has unblocked its associated gateway to all conversations.

For the DRF_Rcv_Home_Gateway_Conversation_Mask, if the Neighbor_Gateway bit in the DRF_Home_Oper_DRCP_State carried in the received DRCPDU is 0;

DRF_Rcv_Home_Gateway_Conversation_Mask is set to NULL;

Otherwise;

The Neighbor_Gateway_Sequence carried in the received Neighbor Gateway Vector TLV is used as an index for a query in the Gateway Vector database of this Portal System and;

If the tuple (Neighbor_Gateway_Sequence, Home_Gateway_Vector) is stored in the database, then;

DRF_Rcv_Home_Gateway_Conversation_Mask= Home_Gateway_Vector;

In addition, if that is the first entry in the database, then;

The HomeGatewayVectorTransmit on this IPP is set to FALSE;

Otherwise;

The HomeGatewayVectorTransmit on this IPP is set to TRUE, and if the Neighbor_Gateway_Sequence value is larger than the currently used Home_Gateway_Sequence a new entry is created in Gateway Vector database of this Portal System with the tuple values (Neighbor_Gateway_Sequence+1, Home_Gateway_Vector);

Otherwise

DRF_Rcv_Home_Gateway_Conversation_Mask=1, where 1 is a Boolean Vector with all its 4096 elements set to 1, and;

The HomeGatewayVectorTransmit is set to TRUE.

For the DRF_Rcv_Other_Gateway_Conversation_Mask, if the Other_Gateway bit in the DRF_Home_Oper_DRCP_State carried in the received DRCPDU is 0;

DRF_Rcv_Other_Gateway_Conversation_Mask is set to NULL;

Otherwise if the Other_Gateway_Vector field is present in the received Other Gateway Vector TLV;

DRF_Rcv_Other_Gateway_Conversation_Mask= Other_Gateway_Vector; and

If on this IPP, Drni_Neighbor_ONN==FALSE;

The tuple (Other_Gateway_Sequence, Other_Gateway_Vector) in the received Other Gateway Vector TLV is stored as an entry in the Gateway Vector database for the Other neighbor Portal System on this IPP indexed by the received Other_Gateway_Sequence in increasing sequence number order;

Otherwise if the Other_Gateway_Vector field is not present in the received Other Gateway Vector TLV;

The Other_Gateway_Sequence is used as an index for a query in the Gateway Vector database for the Other neighbor Portal System on this IPP and;

If the tuple (Other_Gateway_Sequence, Other_Gateway_Vector) is stored in the database, then;

DRF_Rcv_Other_Gateway_Conversation_Mask= Other_Gateway_Vector;

In addition, if that is the first entry in the database, then;

The OtherGatewayVectorTransmit on this IPP is set to FALSE;

Otherwise;

The OtherGatewayVectorTransmit on this IPP is set to TRUE;

Otherwise

DRF_Rcv_Other_Gateway_Conversation_Mask=1, where 1 is a Boolean Vector with all its 4096 elements set to 1, and;

The OtherGatewayVectorTransmit on this IPP is set to TRUE.

It also records the variables below as follows:

The parameter values for the Home_Gateway in the DRF_Home_Oper_DRCP_State, the Gateway Vector from the most recent entry in the Gateway Vector database for the Neighbor Portal System, and the Active_Home_Ports in the Home Ports Information TLV, carried in a received DRCPDU on the IPP, are used as the current values for the DRF_Neighbor_State on this IPP and are associated with the Portal System identified by DRF_Neighbor_Portal_System_Number;

The parameter values for the Other_Gateway in the DRF_Home_Oper_DRCP_State, the Gateway Vector from the most recent entry in the Gateway Vector database for the Other neighbor Portal System, and the Other_Neighbor_Ports in the Other Ports Information TLV, carried in a received DRCPDU on the IPP, are used as the current values for the DRF_Other_Neighbor_State on this IPP and are associated with the Portal System identified by the value assigned to the two most significant bits of the DRF_Other_Neighbor_Admin_Aggregator_Key carried within the Other Ports Information TLV in the received DRCPDU. If no Other Ports Information TLV is carried in the received DRCPDU and the Portal Topology contains three Portal Systems, the DRF_Other_Neighbor_State is set to NULL (Other_Gateway is set to FALSE, the Other_Gateway_Vector is set to NULL, and the list of the operational Aggregation Ports on the Other neighbor Portal System on this IPP is emptied) and no Portal System state information is available on this IPP for the distant Neighbor Portal System on the IPP;

DRF_Neighbor_Admin_Aggregator_Key=DRF_Home_Admin_Aggregator_Key;

DRF_Neighbor_Oper_Partner_Aggregator_Key= DRF_Home_Oper_Partner_Aggregator_Key;

DRF_Other_Neighbor_Admin_Aggregator_Key= DRF_Other_Neighbor_Admin_Aggregator_Key, and;

DRF_Other_Neighbor_Oper_Partner_Aggregator_Key=DRF_Other_Neighbor_Oper_Partner_Aggregator_Key.

Both DRF_Other_Neighbor_Admin_Aggregator_Key and DRF_Other_Neighbor_Oper_Partner_Aggregator_Key are set to NULL when the received DRCPDU does not contain the Other Ports Information TLV.

In addition, if Network/IPL sharing by time (9.3.2.1) is supported, the function records the parameter value for the DRF_Home_Network/IPL_Sharing_Method carried in the received Network/IPL Sharing Method TLV (9.4.3.4.1) as the current parameter value for the DRF_Neighbor_Network/IPL_Sharing_Method and if this is the same as the System's DRF_Home_Network/IPL_Sharing_Method, it sets CC_Time_Shared to TRUE, otherwise it sets CC_Time_ Shared to FALSE.

Further, if Network/IPL sharing by tag or Network/IPL sharing by encapsulation is supported, the function records the Neighbor Portal System's Network/IPL sharing related parameter values carried in the received Network/IPL sharing TLVs from an IPP, as the current operational parameter values for the immediate Neighbor Portal System on this IPP as follows:

DRF_Neighbor_Network/IPL_Sharing_Method

=DRF_Home_Network/IPL_Sharing_Method, carried in the received Network/IPL Sharing Method TLV;

DRF_Neighbor_Network/IPL_IPLEncap_Digest

=DRF_Home_Network/IPL_IPLEncap_Digest, carried in the received Network/IPL Sharing Encapsulation TLV; and DRF_Neighbor_Network/IPL_NetEncap_Digest =DRF_Home_Network/IPL_NetEncap_Digest carried in the received Network/IPL Sharing Encapsulation TLV.-

It then compares the newly updated values of the Neighbor Portal System to this Portal System's expectations and if DRF_Neighbor_Network/IPL_Sharing_Method==DRF_Home_Network/IPL_Sharing_Method, and DRF_Neighbor_Network/IPL_IPLEncap_Digest==DRF_Home_Network/IPL_IPLEncap_Digest, and DRF_Neighbor_Network/IPL_NetEncap_Digest==DRF_Home_Network/IPL_NetEncap_Digest, then it sets CC_EncTag_Shared to TRUE;

Otherwise if one or more of the comparisons shows that the values differ, it sets CC_EncTag_Shared to FALSE.

It then compares the Gateway operational state and Gateway Vector for each Portal System as reported by this Portal System's Drni_Portal_System_State[ ] to the Gateway operational state and Gateway Vector for the same Portal System as reported by the Drni_Neighbor_State[ ] and if any of these differ;

It sets GatewayConversationUpdate to TRUE;

It sets DRF_Home_Oper_DRCP_State.Gateway_Sync to FALSE, and;

If Missing_Rcv_Gateway_Con_Vector==TRUE;

The Drni_Neighbor_Gateway_Conversation on this IPP is set;

to All_Neighbor_Conversation, which is a Portal System Number vector with all its 4096 elements set to the DRF_Home_Conf_Neighbor_Portal_System_Number, if Drni_Three_System_Portal==1 or;

to 1, which is a Boolean Vector with all its 4096 elements set to 1, if Drni_Three_System_Portal==0;

Otherwise;

Drni_Neighbor_Gateway_Conversation remains unchanged;

Otherwise if they are the same and DRF_Home_Oper_DRCP_State.Gateway_Sync is FALSE;

It sets GatewayConversationUpdate to TRUE and;

DRF_Home_Oper_DRCP_State.Gateway_Sync is set to TRUE;

Otherwise if they are the same and Differ_Gateway_Digest==TRUE;

It sets GatewayConversationUpdate to TRUE;

Otherwise;

GatewayConversationUpdate remains unchanged and;

DRF_Home_Oper_DRCP_State.Gateway_Sync is set to TRUE.

It also compares the list of the Port IDs of the operational Aggregation Ports for each Portal System as reported by this Portal System's Drni_Portal_System_State[ ] to list of the Port IDs of the operational Aggregation Ports for the same Portal Systems as reported by the Drni_Neighbor_State[ ] and if any of these differ;

It sets PortConversationUpdate to TRUE and DRF_Home_Oper_DRCP_State.Port_Sync is set to FALSE, and If Missing_Rcv_Port_Con_Vector==TRUE;

The Drni_Neighbor_Port_Conversation on this IPP is set to All_Neighbor_Conversation, if Drni_Three_System_Portal==1 or;

to 1, if Drni_Three_System_Portal==0;

Otherwise;

Drni_Neighbor_Port_Conversation remains unchanged;

Otherwise if they are the same and Differ_Port_Digest==TRUE

It sets PortConversationUpdate to TRUE;

Otherwise if they are the same and DRF_Home_Oper_DRCP_State.Port_Sync is FALSE;

It sets PortConversationUpdate to TRUE and;

DRF_Home_Oper_DRCP_State.Port_Sync is set to TRUE;

Otherwise;

PortConversationUpdate remains unchanged and DRF_Home_Oper_DRCP_State.Port_Sync is set to TRUE.

recordPortalConfValues

This function records the Neighbor Portal System's configured parameter values carried in the Portal Configuration Information TLV of a received DRCPDU from an IPP, as the current operational parameter values for the immediate Neighbor Portal System on this IPP as follows:

DRF_Neighbor_Portal_System_Number=DRF_Portal_System_Number;

DRF_Neighbor_Conf_Portal_System_Number=DRF_Home_Conf_Neighbor_Portal_System_Number;

Drni_Neighbor_Three_System_Portal=Drni_Three_System_Portal;

Drni_Neighbor_Common_Methods=Drni_Common_Methods;

Drni_Neighbor_ONN=ONN;

DRF_Neighbor_Oper_Aggregator_Key=DRF_Home_Oper_Aggregator_Key;

DRF_Neighbor_Port_Algorithm=DRF_Home_Port_Algorithm;

DRF_Neighbor_Conversation_PortList_Digest=DRF_Home_Conversation_PortList_Digest;

DRF_Neighbor_Gateway_Algorithm=DRF_Home_Gateway_Algorithm; and

DRF_Neighbor_Conversation_GatewayList_Digest=DRF_Home_Conversation_GatewayList_Digest.

It then compares the newly updated values of the Neighbor Portal System to this Portal System's expectations and if the comparison of DRF_Neighbor_Portal_System_Number to DRF_Home_Conf_Neighbor_Portal_System_Number, or DRF_Neighbor_Conf_Portal_System_Number to DRF_Portal_System_Number, or Drni_Neighbor_Three_System_Portal to Drni_Three_System_Portal, or Drni_Neighbor_Common_Methods to Drni_Common_Methods, or the 14 least significant bits of DRF_Neighbor_Oper_Aggregator_Key to the 14 least significant bits of DRF_Home_Oper_Aggregator_Key, or DRF_Neighbor_Port_Algorithm to DRF_Home_Port_Algorithm, or DRF_Neighbor_Conversation_PortList_Digest to DRF_Home_Conversation_PortList_Digest, or DRF_Neighbor_Gateway_Algorithm to DRF_Home_Gateway_Algorithm, or DRF_Neighbor_Conversation_GatewayList_Digest to DRF_Home_Conversation_GatewayList_Digest show that one or more of the compared pairs differ, the associated pairs of variables having the different values are stored in aIPPDebugDifferPortalReason; and The reportToManagement function is invoked to report to the Management system the associated differences;

If only any of the first two pairs differ;

the variable Differ_Conf_Portal_System_Number is set to TRUE;

Otherwise;

The variable Differ_Conf_Portal_System_Number is set to FALSE.

In addition if the 14 least significant bits of DRF_Neighbor_Oper_Aggregator_Key==the 14 least significant bits of DRF_Home_Oper_Aggregator_Key; the variable Differ_Conf_Portal is set to FALSE, and;

if DRF_Neighbor_Oper_Aggregator_Key is different than the DRF_Home_Oper_Aggregator_Key;
ChangePortal will be set to TRUE;
Otherwise;
The variable Differ_Conf_Portal is set to TRUE.
Further, if the variable Differ_Conf_Portal is set to FALSE and one or more of the comparisons Drni_Neighbor_Three_System_Portal to Drni_Three_System_Portal, or DRF_Neighbor_Gateway_Algorithm to DRF_Home_Gateway_Algorithm differ;
The Drni_Neighbor_Gateway_Conversation on this IPP is set:
to All_Neighbor_Conversation, which is a Portal System Number vector with all its 4096 elements set to the DRF_Home_Conf_Neighbor_Portal_System_Number, if Drni_Three_System_Portal==1 or;
to 1, which is a Boolean Vector with all its 4096 elements set to 1, if Drni_Three_System_Portal==0;
The variable Differ_Gateway_Digest is set to TRUE; and
If DRF_Neighbor_Conversation_GatewayList_Digest==DRF_Home_Conversation_GatewayList_Digest;
The variable Differ_Gateway_Digest is set to FALSE;
The variable GatewayConversationTransmit is set to FALSE and;
The variable Missing_Rcv_Gateway_Con_Vector is set to FALSE;
Otherwise if the comparison shows that the digests differ;
The variable Differ_Gateway_Digest is set to TRUE;
The variable GatewayConversationTransmit is set to TRUE;
The pair of variables is stored in aIPPDebugDifferPortalReason; and
if the Gateway Conversation Vector TLV is present in the received DRCPDU and the TLV's length field corresponds to Portal System's expectations (1024 octets when aDrniThreePortalSystem is TRUE and 512 octets otherwise);
The Neighbor Portal System's Drni_Gateway_Conversation carried in the Gateway Conversation Vector TLV, is recorded as the current operational parameter value for the immediate Neighbor Portal System on this IPP as follows: Drni_Neighbor_Gateway_Conversation=Gateway_Conversation and; The variable Missing_Rcv_Gateway_Con_Vector is set to FALSE;
Otherwise if the Gateway Conversation Vector TLV is not present in the received DRCPDU, Drni_Neighbor_Common_Methods==Drni_Common_Methods==TRUE and the Port Conversation Vector TLV is present in the received DRCPDU and the Port Conversation Vector TLV's length field corresponds to Portal System's expectations (1024 octets when aDrniThreePortalSystem is TRUE and 512 octets otherwise);
Drni_Neighbor_Gateway_Conversation=Drni_Neighbor_Port_Conversation and;
The variable Missing_Rcv_Gateway_Con_Vector is set to FALSE;
Otherwise;
The variable Drni_Neighbor_Gateway_Conversation remains unchanged and;
The variable Missing_Rcv_Gateway_Con_Vector is set to TRUE.
Finally, if the variable Differ_Conf_Portal is set to FALSE and one or more of the comparisons Drni_Neighbor_Three_System_Portal to Drni_Three_System_Portal, or DRF_Neighbor_Port_Algorithm to DRF_Home_Port_Algorithm differ;

The Drni_Neighbor_Port_Conversation on this IPP is set:
to All_Neighbor_Conversation, which is a Portal System Number vector with all its 4096 elements set to the DRF_Home_Conf_Neighbor_Portal_System_Number, if Drni_Three_System_Portal==1 or;
to 1, which is a Boolean Vector with all its 4096 elements set to 1, if Drni_Three_System_Portal==0;
The variable Differ_Gateway_Digest is set to TRUE; and
If DRF_Neighbor_Conversation_PortList_Digest==DRF_Home_Conversation_PortList_Digest;
The variable Differ_Port_Digest is set to FALSE and;
The variable PortConversationTransmit is set to FALSE;
The variable Missing_Rcv_Port_Con_Vector is set to FALSE;
Otherwise if the comparison shows that the digests differ;
The variable Differ_Port_Digest is set to TRUE;
The variable PortConversationTransmit is set to TRUE;
The pair of variables is stored in aIPPDebugDifferPortalReason;
The reportToManagement function is invoked to report to the Management system the difference; and
if the Port Conversation Vector TLV is present in the received DRCPDU;
The Neighbor Portal System's Drni_Port_Conversation carried in the Port Conversation Vector TLV, is recorded as the current operational parameter value for the immediate Neighbor Portal System on this IPP as follows:
Drni_Neighbor_Port_Conversation=Drni_Port_Conversation and;
The variable Missing_Rcv_Port_Con_Vector is set to FALSE;
if the Port Conversation Vector TLV is not present in the received DRCPDU, Drni_Neighbor_Common_Methods==Drni_Common_Methods==TRUE and the Gateway Conversation Vector TLV(9.4.3.3.1) is present in the received DRCPDU;
Drni_Neighbor_Port_Conversation=Drni_Neighbor_Gateway_Conversation and;
The variable Missing_Rcv_Port_Con_Vector is set to FALSE;
Otherwise;
The variable Drni_Neighbor_Port_Conversation remains unchanged and;
The variable Missing_Rcv_Port_Con_Vector is set to TRUE.
In the all the operations above when the Drni_Neighbor_Gateway_Conversation or Drni_Neighbor_Port_Conversation are extracted from Conversation Vector field in a received 1024-octet Conversation Vector TLV, the Drni_Neighbor_Gateway_Conversation or Drni_Neighbor_Port_Conversation will be set to All_Neighbor_Conversation, if Differ_Conf_Portal_System_Number==TRUE.
recordPortalValues
This function records the parameter values for the Drni_Aggregator_Priority, Drni_Aggregator_ID, Drni_Portal_Priority, and Drni_PortalID, carried in a received DRCPDU from an IPP, as the current operational parameter values for the immediate Neighbor Portal System on this IPP, as follows:
DRF_Neighbor_Aggregator_Priority=Drni_Aggregator_Priority;
DRF_Neighbor_Aggregator_ID=Drni_Aggregator_ID;
Drni_Neighbor_Portal_Priority=Drni_Portal_Priority, and;
Drni_Neighbor_Portal_Addr=Drni_Portal_Addr.

It then compares the newly updated values of the Neighbor Portal System to this Portal System's expectations and if DRF_Neighbor_Aggregator_Priority==Drni_ Aggregator_Priority and DRF_Neighbor_Aggregator_ID==Drni_Aggregator_ID and Drni_Neighbor_Portal_Priority==Drni_Portal_Priority and Drni_Neighbor_Portal_Addr==Drni_Portal_Addr then, the variable Differ_Portal is set to FALSE;

Otherwise if one or more of the comparisons shows that the values differ, the variable Differ_Portal is set to TRUE and the associated set of variables having the different values are available in aIPPDebugDifferPortalReason and are reported to the Management system by invoking the reportToManagement function.

reportToManagement

This function alerts the Management system of the potential existence of a Portal System configuration error in this Portal due to the receipt of a misconfigured DRCPDU and sends to it the conflicting information from the misconfigured received DRCPDU.

aIPPDebugDifferPortalReason

ATTRIBUTE

APPROPRIATE SYNTAX:

A PrintableString, 255 characters max.

BEHAVIOUR DEFINED AS:

A human-readable text string indicating the most recent set of variables that are responsible for setting the variable Differ_Portal or Differ_Conf_Portal (9.4.8) on this IPP to TRUE. This value is read-only.

aDrniThreePortalSystem

ATTRIBUTE

APPROPRIATE SYNTAX:

BOOLEAN

BEHAVIOUR DEFINED AS:

A read-write Boolean value indicating whether this Portal System is part of a Portal consisting of three Portal Systems or not. Value 1 stands for a Portal of three Portal Systems, value 0 stands for a Portal of two Portal Systems. The default value is 0.

aDrniPortConversationControl

ATTRIBUTE

APPROPRIATE SYNTAX:

BOOLEAN

BEHAVIOUR DEFINED AS:

A read-write Boolean value that controls the operation of the updateDRFHomeState. When set to "TRUE" the Home Gateway Vector is set equal to Drni_Portal_System_Port_Conversation. Setting this object to "TRUE" is only possible when the Gateway algorithm and the Port algorithm use the same distributions methods. The default is "FALSE", indicating that the Home Gateway Vector is controlled by the network control protocol.

aAggConversationAdminLink[ ]

ATTRIBUTE

APPROPRIATE SYNTAX: An array of SEQUENCE OF INTEGERs that match the syntax of a Link Number ID.

BEHAVIOUR DEFINED AS:

There are 4096 aAggConversationAdminLink[ ] variables, aAggConversationAdminLink[0] through aAggConversationAdminLink[4095], indexed by Port Conversation ID. Each contains administrative values of the link selection priority list for the referenced Port Conversation ID. This selection priority list is a sequence of Link Number IDs for each Port Conversation ID, in the order of preference, highest to lowest, for the corresponding link to carry that Port Conversation ID. A 16 bit zero value is used to indicate that no link is assigned to carry the associated Port Conversation ID.

setDefaultPortalSystemParameters

This function sets this Portal System's variables to administrative set values as follows:

Drni_Aggregator_Priority=aAggActorSystemPriority;

Drni_Aggregator_ID=aAggActorSystemID;

Drni_Portal_Priority=aDrniPortalPriority;

Drni_Portal_Addr=aDrniPortalAddr;

DRF_Portal_System_Number=aDrniPortalSystem Number;

DRF_Home_Admin_Aggregator_Key=aAgg ActorAdminKey;

DRF_Home_Port_Algorithm=aAggPortAlgorithm;

DRF_Home_Gateway_Algorithm=aDrniGateway Algorithm;

DRF_Home_Conversation_PortList_Digest=the MD5 digest on aDrniConvAdminGateway[ ];

DRF_Home_Conversation_GatewayList_Digest=the MD5 digest on aAggConversationAdminPort[ ], and;

DRF_Home_Oper_DRCP_State=DRF_Neighbor_Admin_DRCP_State.

In addition, it sets the Drni_Portal_System_State[ ] as if all Gateways in the Portal are reported as FALSE and no Aggregation Port on any Portal System is reported as operational.

setGatewayConversation

This function sets Drni_Gateway_Conversation to the values computed from aDrniConvAdminGateway[ ] and the current Drni_Portal_System_State[ ] as follows:

For every indexed Gateway Conversation ID, a Portal System Number is identified by choosing the highest priority Portal System Number in the list of Portal System Numbers provided by aDrniConvAdminGateway[ ] when only the operational Gateways, as provided by the Gateway Boolean flags of the Drni_Portal_System_State[ ] variable, are included.

setIPPGatewayConversation

This function sets Ipp_Other_Gateway_Conversation as follows:

If Differ_Gateway_Digest==TRUE and Drni_Three_System_Portal==1;

Ipp_Other_Gateway_Conversation=Drni_Neighbor_Gateway_Conversation;

Otherwise if Differ_Gateway_Digest==TRUE and Drni_Three_System_Portal==0;

The Ipp_Other_Gateway_Conversation is extracted from the Drni_Neighbor_Gateway_Conversation as follows:

For every indexed Gateway Conversation ID in the Drni_Neighbor_Gateway_Conversation Boolean vector, the value zero bits are replaced with the DRF_Portal_System_Number and the value one bits are replaced with the DRF_Home_Conf_Neighbor_Portal_System_Number;

Otherwise if Differ_Gateway_Digest==FALSE;

This function sets Ipp_Other_Gateway_Conversation to the values computed from aDrniConvAdminGateway[ ] and the Drni_Neighbor_State[ ] as follows:

For every indexed Gateway Conversation ID, a Portal System Number is identified by choosing the highest priority Portal System Number in the list of Portal System Numbers provided by aDrniConvAdminGateway[ ] when only the operational Gateways, as provided by the Gateway Boolean flags of the Drni_Neighbor_State[ ] variable, are included.

setIPPGatewayUpdate

This function sets the IppGatewayUpdate on every IPP on this Portal System to TRUE.

setIPPPortConversation

This function sets Ipp_Other_Port_Conversation_Portal_System as follows:

If Differ_Port_Digest==TRUE and Drni_Three_System_Portal==1;

Ipp_Other_Port_Conversation_Portal_System=Drni_Neighbor_Port_Conversation;

Otherwise if Differ_Port_Digest==TRUE and Drni_Three_System_Portal==0;

The Ipp_Other_Port_Conversation_Portal_System is extracted from the Drni_Neighbor_Port_Conversation as follows:

For every indexed Port Conversation ID in the Drni_Neighbor_Port_Conversation Boolean vector, the value zero bits are replaced with the DRF_Portal_System_Number and the value one bits are replaced with the DRF_Home_Conf_Neighbor_Portal_System_Number;

Otherwise if Differ_Port_Digest==FALSE;

This function sets Ipp_Other_Port_Conversation_Portal_System to the values computed from aAggConversationAdminPort[ ] and the Drni_Neighbor_State[ ] as follows:

For every indexed Port Conversation ID, a Portal System Number is identified by choosing the highest priority Portal System Number in the list of Portal Systems Numbers provided by aAggConversationAdminPort[ ] when only the operational Aggregation Ports, as provided by the associated Lists of the Drni_Neighbor_State[ ] variable, are included.

setIPPPortUpdate

This function sets the IppPortUpdate on every IPP on this Portal System to TRUE.

setPortConversation

This function sets Drni_Port_Conversation to the values computed from aAggConversationAdminPort[ ] and the current Drni_Portal_System_State[ ] as follows:

For every indexed Port Conversation ID, a Portal System Number is identified by extracting the least significant two bits of the priority component of the highest priority Port ID (6.3.4) in the list of Port IDs provided by aAggConversationAdminPort[ ] when only the operational Aggregation Ports, as provided by the associated Lists of the Drni_Portal_System_State[ ] variable, are included.

updateDRFHomeState

This function updates the DRF_Home_State based on the operational state of the local ports as follows:

It sets the Gateway to TRUE or FALSE based on the mechanisms that are used to identify the operational state of the local Gateway (TRUE indicates operable (i.e. the local DR Function is able to relay traffic through its Gateway Port and at least one of its other Ports—IPP(s) or Aggregator) and that connectivity through the local Gateway is enabled by the operation of the network control protocol).; In addition the operational Boolean Gateway Vector, indexed by Gateway Conversation ID, is used to indicate which individual Gateway Conversation IDs are enabled by the network control protocol to pass through the Home Gateway (FALSE=blocked).

The operation above where the Boolean Gateway Vector is set by the network control protocol respects the requirements on distribution independence and fault isolation so that the frame distribution algorithm that is used to satisfy network requirements can be different from the algorithm used to assign frames to the Aggregation Ports of a Link Aggregation Group and that faults on the Aggregation Ports do not affect the attached network operation. On the other hand, the Gateway algorithm and the Port algorithm can use the same means for assigning a frame to a Conversation ID, so that the Gateway Conversation ID equals the Port Conversation ID to allow matching a gateway to the link carrying a given conversation in order to minimize traffic on the IPLs. In this case the Boolean Gateway Vector is not controlled by the network control protocol but is set instead to the Drni_Portal_System_Port_Conversation. Additionally, this function sets the Home Gateway bit TRUE if the Home Gateway Vector is not NULL and the local Gateway is operable (i.e. the local DR Function is able to relay traffic through its Gateway Port and its Aggregator Port). The profile of operation is configured by the aDrniPortConversationControl managed object.

The current operational Boolean Gateway Vector along with its associated Gateway Sequence number is stored as a (Home Gateway Sequence, Home Gateway Vector) tuple in the Gateway Vector database for this Portal System. If there is any change in the Home Gateway Vector, the Home Gateway Sequence number of the current first entry in the Gateway Vector database for this Portal System (Home Gateway Sequence, Home Gateway Vector) is increased by one and a new first entry tuple (Home Gateway Sequence+1, New Home Gateway Vector) is created for the New Home Gateway Vector on top of the current one and HomeGatewayVectorTransmit is set to TRUE. When the Home_Gateway bit is set to FALSE, the New Home Gateway Vector is set to NULL (a 4096 Boolean Vector that has all its elements set to 0).

NOTE—Use of sequence numbers allows the receiver of a DRCPDU to test for a new vector without exhaustive comparison of vector values.

The list of operational Aggregation Ports is created by including only those Aggregation Port IDs for which the attached Aggregator reports them as having Actor_Oper_Port_State.Distributing==TRUE (condition that excludes the cases where the associated Aggregation Ports are either non operable (port_enabled=FALSE), in an EXPIRED state, or not in the LAG), and The PSI is set to TRUE if DRF_Neighbor_Oper_DRCP_State.IPP_Activity==FALSE on all IPPs on this Portal System, otherwise PSI is set to FALSE.

In addition, if PSI==TRUE and Gateway==FALSE then Actor_Oper_Port_State.Sync is set to FALSE on all Aggregation Ports on this Portal System.

The function also sets:

GatewayConversationUpdate to TRUE if the operational state of Gateway or the configured lists for Drni_Conversation_GatewayList[ ] has changed and sets PortConversationUpdate to TRUE if there has been any change in the list of the operational Aggregation Ports as reported by changes in the associated Actor_Oper_Port_State.Distributing variables or the configured lists for the Drni_Conversation_PortList[ ], otherwise;

GatewayConversationUpdate and PortConversationUpdate remain unchanged.

updateIPPGatewayConversationDirection

This function computes a value for Ipp_Gateway_Conversation_Direction as follows:

For each Gateway Conversation ID, the value is TRUE if and only if:

a) the variables Drni_Gateway_Conversation and Ipp_Portal_System_State[ ] indicate that the target Portal System for this Gateway Conversation ID lies behind this IPP, and b) Drni_Gateway_Conversation and Ipp_Other_Gateway_Conversation are in agreement as to which Portal System should get this Gateway Conversation ID.

In addition, if Drni_Gateway_Conversation and Ipp_Other_Gateway_Conversation are in disagreement for any Gateway Conversation ID:

It sets DRF_Home_Oper_DRCP_State.Gateway_Sync to FALSE, and;

NTTDRCPDU to TRUE.

Otherwise:

DRF_Home_Oper_DRCP_State.Gateway_Sync and NTTDRCPDU are left unchanged.

Ipp_Gateway_Conversation_Direction is initialized to FALSE and recomputed whenever any of its contributing variables changes.

updateIPPPortConversationPasses

This function computes a value for Ipp_Port_Conversation_Passes as follows:

For each Port Conversation ID, the value is TRUE (ID passes) if and only if:

a) the variables Drni_Port_Conversation and Ipp_Portal_System_State[ ] indicate that the target Portal System for this Port Conversation ID lies behind this IPP, and b) Drni_Port_Conversation and Ipp_Other_Port_Conversation_Portal_System are in agreement as to which Portal System should get this Port Conversation ID.

In addition if Drni_Port_Conversation and Ipp_Other_Port_Conversation_Portal_System are in disagreement for any Port Conversation ID:

It sets DRF_Home_Oper_DRCP_State.Port_Sync to FALSE, and;

NTTDRCPDU to TRUE.

Otherwise:

DRF_Home_Oper_DRCP_State.Port_Sync and NTTDRCPDU are left unchanged.

Ipp_Port_Conversation_Passes is initialized to FALSE and recomputed whenever any of its contributing variables changes.

updateKey

This function updates the operational Aggregator Key, DRF_Home_Oper_Aggregator_Key, as follows:

If enable_long_pdu_xmit==TRUE then:

DRF_Home_Oper_Aggregator_Key is set to the value of DRF_Home_Admin_Aggregator_Key by replacing its most significant two bits by the value 01; Otherwise DRF_Home_Oper_Aggregator_Key is set to the lowest numerical non zero value of the set comprising the values of the DRF_Home_Admin_Aggregator_Key, the DRF_Neighbor_Admin_Aggregator_Key and the DRF_Other_Neighbor_Admin_Aggregator_Key, on each IPP.

updateNTT

This function sets NTT to TRUE if any of DRF_Home_Oper_DRCP_State.GatewaySync, or DRF_Home_Oper_DRCP_State.PortSync, or DRF_Neighbor_Oper_DRCP_State.GatewaySync, or DRF_Neighbor_Oper_DRCP_State.PortSync is FALSE.

updatePortalState

On all operations associated with this function, information provided by the DRF_Other_Neighbor_State on an IPP is considered only if Drni_Neighbor_ONN on the same IPP is FALSE;

This function updates the Drni_Portal_System_State[ ] as follows: The information for this Portal System, DRF_Home_State, indexed by the Portal System Number, is included in Drni_Portal_System_State[ ]. For each of the other Portal Systems in the Portal, If any of the other Portal System's state information is available from two IPPs in this Portal System, then:

For that Portal System, only the Portal System state information provided by the DRF_Neighbor_State on the IPP having the other Portal System as a Neighbor Portal System, indexed by the Portal System Number, will be included in Drni_Portal_System_State[ ].

Otherwise if a Portal System's state information is available only from a single IPP on this Portal System, then:

That Portal System's state information, indexed by the associated Portal System Number will be included in the Drni_Portal_System_State[ ] irrespectively of whether that information is being provided by the DRF_Neighbor_State or the DRF_Other_Neighbor_State on this IPP. If information for a Portal System is available only from the DRF_Other_Neighbor_State on this IPP then ONN is set to TRUE on this IPP.

Every Portal System included in the Portal Topology for which Portal System state information is not available from any of the IPPs, has its associated Portal System state information Drni_Portal_System_State[ ] set to NULL (the Gateway is set to FALSE and the list of the operational Aggregation Ports on the Portal System is emptied). For a Neighbor Portal System for which the DRF_Neighbor_State is NULL, Drni_Neighbor_State[ ] is set equal to Drni_Portal_System_State[ ].

This function updates also the Ipp_Portal_System_State[ ] for each IPP on this Portal System as follows:

If any other Portal System's state information is available from two IPPs, then:

If the Home Portal System that does not have any IPL configured as a Loop Break Link, then, for every IPP on the Portal System, only the Portal System state information provided by the DRF_Neighbor_State on that IPP will be included in the associated Ipp_Portal_System_State[ ], indexed by the associated Portal System Number otherwise;

the DRF_Neighbor_State on an IPP, indexed by the associated Portal System Number, will be included as a first state in the corresponding Ipp_Portal_System_State[ ] and any other additional state associated with another Portal System reported on the received DRCPDU on this IPP, indexed by the associated Portal System Number, will be included as the second state in the Ipp_Portal_System_State[ ] only if Drni_Neighbor_ONN on the same IPP is FALSE

[Similarly to the Drni_Portal_System_State[ ], every Portal System included in the Portal Topology for which Portal System state information is not available from any of the IPPs, has its associated Portal System state information Ipp_Portal_System_State[ ] set to NULL (the Gateway is set to FALSE and the list of the operational Aggregation Ports on the Portal System is emptied).]

updatePortalSystemGatewayConversation

This function sets Drni_Portal_System_Gateway_Conversation as follows:

If Differ_Gateway_Digest==TRUE and Drni_Three_System_Portal==0;

Drni_Portal_System_Gateway_Conversation=Drni_Neighbor_Gateway_Conversation;

Otherwise;

This function sets the Drni_Portal_System_Gateway_Conversation to the result of the logical AND operation between, the Boolean vector constructed from the Drni_Gateway_Conversation, by setting to FALSE all the indexed Gateway Conversation ID entries that are associated with other Portal Systems in the Portal, and the Boolean vector constructed from all IPPs Ipp_Other_Gateway_Conversation, by setting to FALSE all the indexed Gateway Conversation ID entries that are associated with other Portal Systems in the Portal.

updatePortalSystemPortConversation

This function sets Drni_Portal_System_Port_Conversation as follows:

If Differ_Port_Digest==TRUE and Drni_Three_System_Portal==0;

Drni_Portal_System_Port_Conversation=Drni_Neighbor_Port_Conversation;

Otherwise;

This function sets the Drni_Portal_System_Port_Conversation to the result of the logical AND operation between, the Boolean vector constructed from the Drni_Port_Conversation, by setting to FALSE all the indexed Port Conversation ID entries that are associated with other Portal Systems in the Portal, and the Boolean vector constructed from the Ipp_Other_Port_Conversation_Portal_System, by setting to FALSE all the indexed Port Conversation ID entries that are associated with other Portal Systems in the Portal.

Timers

The following discussion focuses on a variety of timers applicable according to one embodiment of the invention.

current_while_timer: This timer is used to detect whether received protocol information has expired. If Actor_Oper_State.LACP_Timeout is set to Short Timeout, the timer is started with the value Short_Timeout_Time. Otherwise, it is started with the value Long_Timeout_Time.

periodic_timer (time_value): This timer is used to generate periodic transmissions. It is started using the value Slow_Periodic_Time or Fast_Periodic_Time, as specified in the Periodic Transmission state machine.

wait_while_timer: This timer provides hysteresis before performing an aggregation change, to allow all links that will join the associated Link Aggregation Group to do so. It is started using the value Aggregate_Wait_Time.

Messages

In one embodiment, only one message is utilized:

IppM:M_UNITDATA.indication(DRCPDU): This message is generated by the DRCP Control Parser as a result of the reception of a DRCPDU.

DRCPCtrlMuxN:M_UNITDATA.indication(DRCPDU)

This message is generated by the DRCP Control Parser/Multiplexer as a result of the reception of a DRCPDU.

Note the two messages are similar messages for two different embodiments.

State Machine Operations

Returning to the operation of the overall state machine process, the flowchart of FIG. 7 defines a set of operations relying, in one embodiment, to the functions, variables and messages described herein above. The process can be initiated in response to receiving a DRCPDU. This DRCPDU is initially passed to the receive unit (block 702). The set of arrows labeled Neighbor State Information represents new Neighbor information, contained in an incoming DRCPDU or supplied by administrative default values, being fed to each state machine by the DRCPDU Receive machine. The set of arrows labeled Home State Information represents the flow of updated Home state information between the state machines. Transmission of DRCPDUs occurs either as a result of the Periodic machine determining the need to transmit a periodic DRCPDU, or as a result of changes to the Home's state information that need to be communicated to the Neighbors. The need to transmit a DRCPDU is signaled to the Transmit machine by asserting NTTDRCPDU. The remaining arrows represent shared variables in the state machine description that allow a state machine to cause events to occur in another state machine.

The Receive machine generates an NTTDRCPDU, executes a change port operation, gateway conversation update and port conversation update.

The periodic machine 704 receives the neighbor state information and returns home state information. The periodic machine (block 704) generates a NTTDRCPDU.

Portal System machine (block 706) is responsible to update the operational status of all the Gateways and Aggregation Ports in the Portal based on local information and DRCPDUs received on the Home Portal System's IPPs. This state machine is per Portal System.

The DRNI Gateway and Aggregator machines (708) are responsible for configuring the Gateway Conversation IDs which are allowed to pass through this DR Function's Gateway and the Port Conversation IDs which are allowed to be distributed through this DR Function's Aggregator. These state machines are per Portal System.

The DRNI IPP machines (710) are responsible for configuring the Gateway Conversation IDs and the Port Conversation IDs which are allowed to pass through this DR Function's IPPs.

Transmit machine (712) handles the transmission of DRCPDUs, both on demand from the other state machines, and on a periodic basis.

DRCPDU Receive Machine

The Receive machine may implement the function specified in FIG. 8 with its associated parameters as discussed herein above. The process can be initialized block 802 when the functionality is enabled and the recordDefaultDRCPDU( ) is executed and where the DRF_Neighbor_Oper_DRCP_ State.IPP_Activity is false. An expired state (block 804) is then entered and on receipt of a DRCPDU, the state machine enters the PORTAL_CHECK state (block 808). The recordPortalValues function checks if the DRCPDU is associated with this Portal. If not, the event is reported to the management system and no further processing of the DRCPDU is made by any of this Portal's state machines. If the recordPortalValues identifies the received DRCPDU will enter the COMPATIBILITY CHECK state (Block 809) to be checked by the recordPortalConfValues function. This compares the administratively configured values that are associated with this portal to the received information and if they differ the system will enter the REPORT_TO_MANAGEMENT state (Block 810) and the misconfigured DRCPDU will be reported to the management system. The Receive machine exits the REPORT_TO_MANAGEMENT state when a new DRCPDU is received (or the IPP is disabled).

If the received DRCPDU is configured according to the expected values for this Portal the received machine will enter the CURRENT state (Block 812).

Embodiments may thus comprise the steps of: receiving a DRCPDU; checking if the received DRCPDU is associated with the portal; comparing configured values associated with the portal with values of the received DRCPDU; and sending a report in case the compared values differ.

In one embodiment, on receipt of a DRCPDU, the state machine enters the PORTAL_CHECK state. The recordPortalValues function checks if the DRCPDU is associated with this Portal. If not, the state machine will enter the REPORT_TO_MANAGEMENT state and the received DRCPDU will be reported to the management system. While in the REPORT_TO_MANAGEMENT state, the System will exit to the PORTAL_CHECK state if a new DRCPDU is received or to the EXPIRED state if the DRCP_current_ while_timer expires. If the recordPortalValues identifies the received DRCPDU as associated with this Portal, it will enter the COMPATIBILITY_CHECK state to be checked by the recordPortalConfValues function. This compares the administratively configured values that are associated with this portal to the received information and if they differ the System will enter the REPORT_TO_MANAGEMENT state and the mis-configured DRCPDU will be reported to the management system. If the Portal System continues to receive DRCPDUs that do not match the administratively configured expectations for a period longer than twice the Short Timeout the state machine will transit to the DEFAULTED state and the current operational parameters for the Portal System(s) on this IPP will be overwritten with administratively configured values and a Portal System update will be triggered.

If the received DRCPDU is configured according to the expected values for this Portal the DRCPDU Receive machine enters the CURRENT state.

The recordNeighborState function records the Neighbor's Portal State information contained in the DRCPDU in the Neighbor's Portal State operational variables and update's its own Home Portal State variable. If they differ, triggers are set to notify the Neighbor but also local event variables are set trigger updates on the local Portal System machine (PS—see FIG. 10), the DRNI Gateway and Aggregator machine (DGA—see FIG. 11), and the DRNI IPP machine (IPP—see FIG. 12).

In the process of executing the recordPortalValues, recordPortalConfValues, and recordNeighborState, functions, a Receive machine compliant to this specification may not validate the Version Number, TLV_type, or Reserved fields in received DRCPDUs. The same actions are taken regardless of the values received in these fields. A Receive machine may validate the Portal_Information_Length, Portal_Configuration_Information_Length, DRCP_State_Length, or Terminator_Length fields. These behaviors, together with the constraint on future protocol enhancements, are discussed herein above.

The rules expressed above allow Version 1 devices to be compatible with future revisions of the protocol.

The updateNTT function is used to determine whether further protocol transmissions are required; NTTDRCPU is set to TRUE if the Neighbor's view of the Home's operational Portal State variable is not up to date. Then the current_while timer is started. The value used to start the timer is either Short_Timeout_Time or Long_Timeout_Time, depending upon the Actor's operational value of Timeout.

If no DRCPDU is received before the current_while timer expires, the state machine transits to the EXPIRED state. The DRF_Neighbor_Oper_DRCP_State.IPP_Activity is set to FALSE, the current operational value of the Neighbor's Timeout variable is set to Short Timeout, and the current_while timer is started with a value of Short_Timeout_Time. This is a transient state; the Timeout settings allow the Home Portal System to transmit DRCPDUs rapidly in an attempt to re-establish communication with the Neighbor.

If no DRCPDU is received before the current_while timer expires again, the state machine transits to the DEFAULTED state. The recordDefaultDRCPDU function overwrites the current operational parameters for the Neighbors Portal Systems with administratively configured values and triggers a Portal System update and the condition is reported to the management system.

If the IPP becomes inoperable, the state machine enters the INITIALIZE state. DRF_Neighbor_Oper_DRCP_State.IPP_Activity is set to FALSE the recordDefaultDRCPDU function causes the administrative values of the Partner parameters to be used as the current operational values. These actions force the PS machine to detach the Neighbor Portal Systems from the Portal and the Gateway and Port Conversation ID filters to be recomputed.

Figure 16:
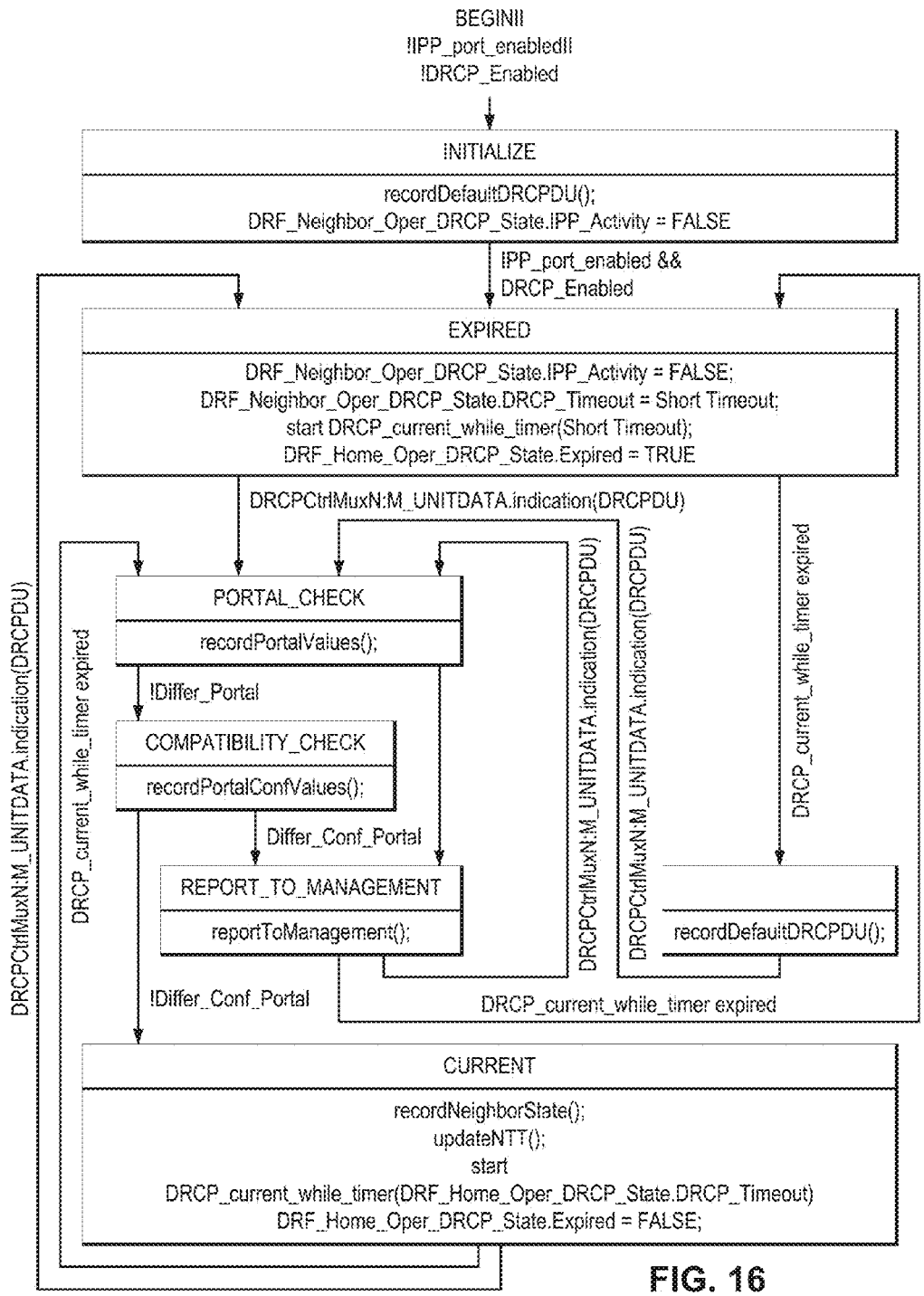
FIG. 16 is another flowchart illustrating a state machine for a receive machine according to one embodiment of the invention.
Figure 38:
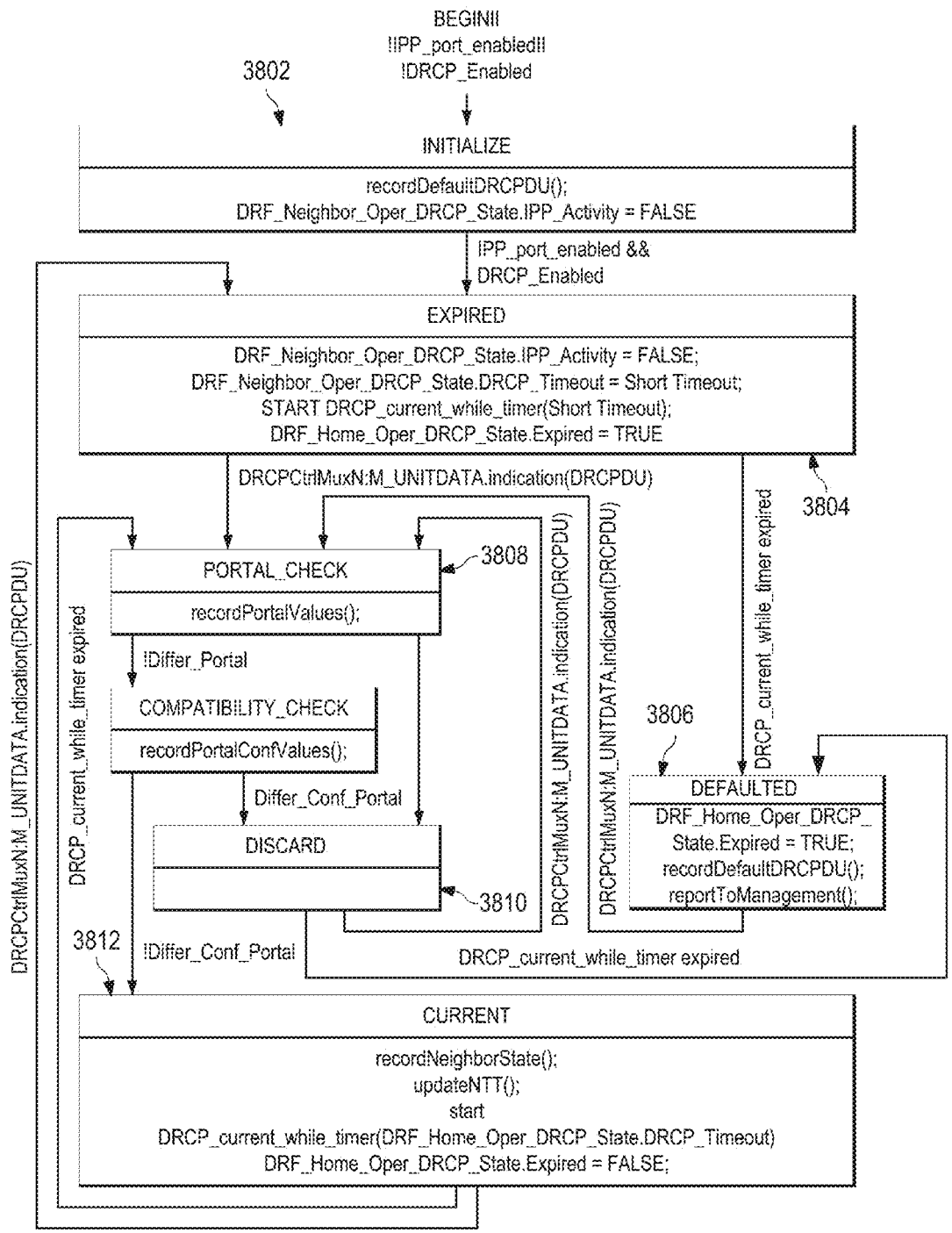
FIG. 38 is a third flowchart illustrating a state machine for a receive machine according to one embodiment of the invention.

The Receive machine may also implement the function specified in FIG. 16 with its associated parameters according to one embodiment of the invention. The Receive machine may also implement the function specified in FIG. 38 with its associated parameters according to another embodiment of the invention. The receive machine in FIG. 16 or FIG. 38 follows a few different flow paths compared to FIG. 8. The terms and functions of the alternate receive machine in FIG. 16 and FIG. 38 are analogous to those of FIG. 8. One skilled in the art would understand that other implementations are possible consistent with the principles and structures of the illustrated receive machines.

Figure 33:
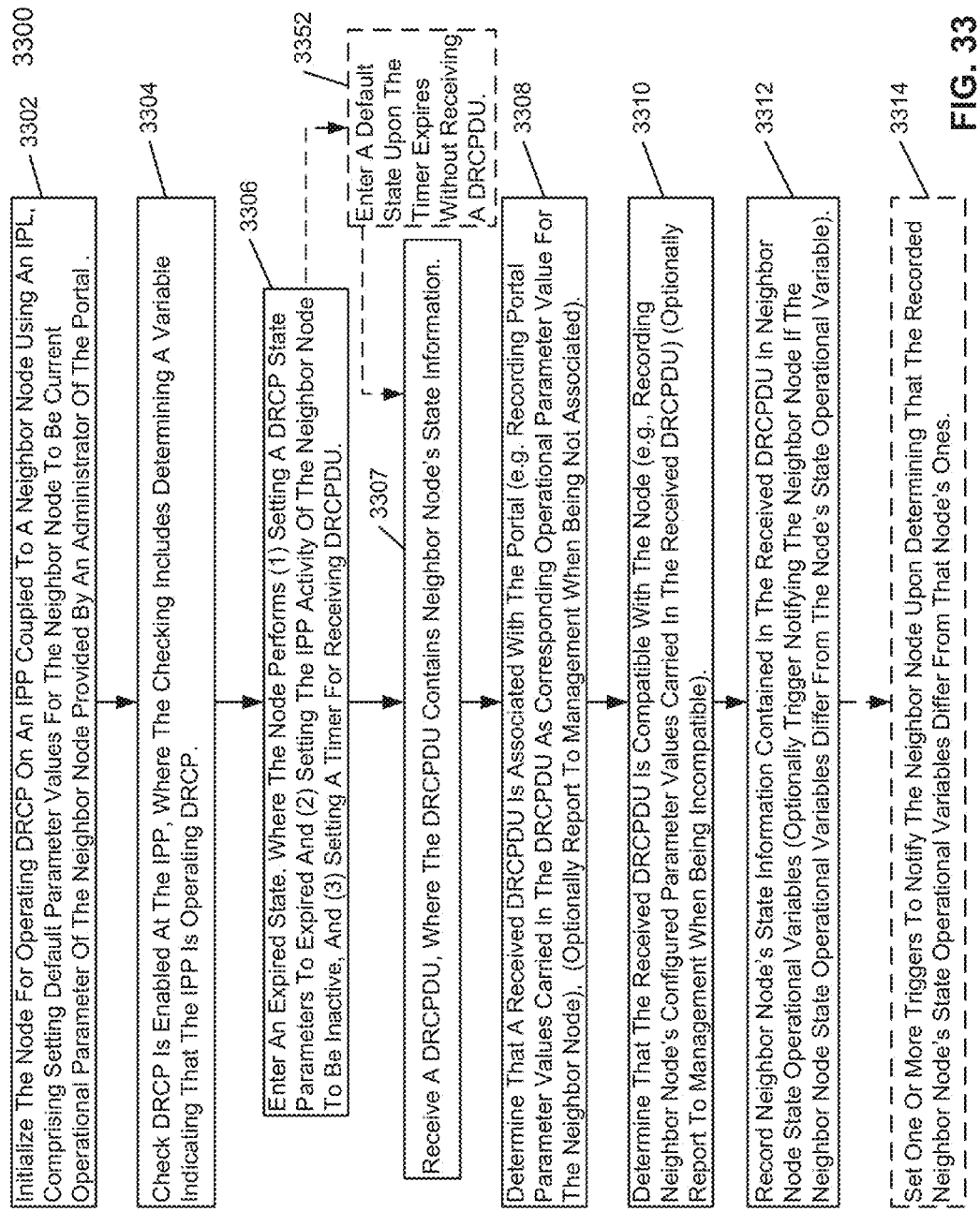
FIG. 33 illustrates a method for synchronizing with a neighbor in a node of a DRNI link aggregation group according to an embodiment of the invention.

FIG. 33 illustrates a method for synchronizing with a neighbor in a node of a DRNI link aggregation group according to an embodiment of the invention. Method 3300 may be implemented on a DRCP node (e.g., a network device) of a DRCP portal (referred to as a local portal) as a part of a DRNI such as nodes K-O of FIG. 1B and network devices 132 and 134 of FIG. 1C. Note optional steps are denoted as a dotted box as illustrated in FIG. 33.

At reference 3302, the node is initialized for operating DRCP on an IPP coupled to a neighbor node using an IPL. The node and the neighbor node are included in a portal, which may contain an additional neighbor node in one embodiment. The node is coupled to the neighbor node via the IPP using the IPL. In one embodiment, the initialization comprises setting default parameter values for the neighbor node on the IPP to be the current operational parameters of the neighbor node provided by an administrator of the portal. The parameters include neighbor port algorithm such as DRF_Neighbor_Port_Algorithm (to be set to be DRF_Neighbor_Admin_Port_Algorithm), neighbor port gateway algorithm such as DRF_Neighbor_Gateway_Algorithm (to be set to be DRF_Neighbor_Admin_Gateway_Algorithm), and others discussed herein above relating to the function of recordDefaultDRCPDU. In one embodiment, the initialization further includes setting the IPP activity of the neighbor node to be inactive through setting DRF_Neigbhor_Oper_DRCP_State.IPP_Activity to be false.

At reference 3304, the node determines that DRCP is enabled at the IPP. The checking includes determining a variable (e.g., IPP_port_enabled) indicating that the IPP is operating DRCP. In one embodiment, the determination is through checking two variables for the IPP. One is a variable indicating that the IPP is operating DRCP (e.g., through DRCP_enabled discussed herein above), and the other is the variable indicating that the IPL has been established and the IPP is operable (e.g., through IPP_port_enabled discussed herein above).

At reference 3306, the node enters an expired state. In the expired state, the node performs the following in one embodiment: It sets the node's DRCP state parameter to expired (e.g., setting DRF_Home_Oper_DRCP_State.Expired discussed herein above to be true), it also sets the IPP activity of the neighbor node to be inactive through setting DRF_Neigbhor_Oper_DRCP_State.IPP_Activity to be false. It sets a timer to expire if no DRCPDU is received. In one embodiment, the timer setting is performed through setting DRF_Neighbor_Oper_DRCP_State.DRCP_Timeout=Short Timeout and start DRCP_current_while_timer (Short Timeout).

Once the timer expires, the flow goes to reference 3352, where the node goes to a defaulted state. In one embodiment, in the defaulted state, the node sets default parameter values for the neighbor node on the IPP to be the current operational parameters of the neighbor node provided by an administrator of the portal through a function such as recordDefaultDRCPDU discussed herein above. Also, the default state includes report the status to management through a function such as reportToManagement discussed herein above.

At reference 3307, the node receives a DRCPDU at reference 3307. The DRCPDU contains the PDU structure illustrated in FIG. 5, where the PDU structure has TLVs such as the ones listed in Table 4. The PDU structure contains home port information TLV and DRCP state TLV. In one embodiment, the receipt of the DRCPDU is indicated in a message generated by the DRCP control parser/multiplexer as a result of the reception of the DRCPDU such as DRCPCtrolMuxN:M_UNITDATA.indication(DRCPDU).

Then the node determines that the received DRCPDU is associated with the portal at reference 3308. In one embodiment, the determination includes checking a variable (e.g., Differ_Portal as discussed herein above) that indicating the receiving DRCPDU being associated with the portal or not. In one embodiment, the determination includes executing a function (e.g., recordPortalValues) that records portal parameter values carried in the received DRCPDU as the corresponding current operational parameter values for the neighbor node on the IPP. Portal parameter values, as discussed herein above in definition of recordPortaValues, includes aggregator priority (e.g. Drni_Aggregator_Priority), aggregator ID (e.g., Drni_Aggregator_ID), neighbor portal priority (Drni_Portal_Priority), and portal address (e.g., Drni_Portal_Addr) in one embodiment.

If the received DRCPDU is not associated with the portal, the node may optionally report the status to management through a function such as reportToManagement discussed herein above. If later the node receives another DRCPDU, the flow goes back to reference 3308 to determine the association again. Similarly, when the node is at the default state at reference 3352 and it receives a DRCPDU, the flow goes to reference 3308 for determining the association.

After determining the received DRCPDU is associated with the portal, the flow goes to reference 3310, where the node determines that the received DRCPDU is compatible with the node. The determination includes that determining administratively configured values associated with the portal is consistent with the received values from the DRCPDU. The checking includes executing a function (e.g., recordPortalConfValues) that records neighbor node's configured parameter values carried in the received DRCPDU as the corresponding current operational parameter values for the neighbor node on the IPP in one embodiment. Note the configured parameter values in a function such as recordPortalConfValue is different from the portal parameter values such as recordPortalValue, and the different is discussed herein above in the definitions of recordPortalConfValues and recordPortalValues.

If the received DRCPDU is not compatible with the node, the node may optionally report the status to management through a function such as reportToManagement discussed herein above. If later the node receives another DRCPDU, the flow goes back to reference 3308 to determine the association again. While executing the function such as reportToManagement, the node sets another timer to expire if no DRCPDU is received and starts the timer. Once the timer expires, the flow goes back to reference 3306.

After determining the received DRCPDU is compatible with the node, the node records the neighbor node's state information contained in the received DRCPDU as neighbor node's state operational variables at reference 3312. In one embodiment, a function (e.g. recordNeighborState) records the parameter values such as portal system state (e.g., Drni_Portal_System_State) and home node operation DRCP state (e.g., DRF_Home_Oper_DRCP_State) carried in the received DRCPDU as the corresponding neighbor node's operational variables such as Drni_Neigbhor_State and DRF_Neighbor_Oper_DRCP_State.

Optionally, when the recorded neighbor node's state operational variables differ from that of the node's state operational variables, the node sets one or more triggers to notify the neighbor node at reference 3314. In one embodiment, a function (e.g., updateNTT) is used to determine whether further protocol transmission is required as discussed herein above.

The method discussed herein provides an efficient way for a DRCP node to process information embedded in a DRCPDU received from a neighbor DRCP node. The information is processed in stages and it is determined that the received DRCPDU is associated with the portal of the DRCP node and is compatible with the node before recording the neighbor node's state information. In addition, a timer is inserted to prevent the node from being stuck in a waiting state.

Figure 41:
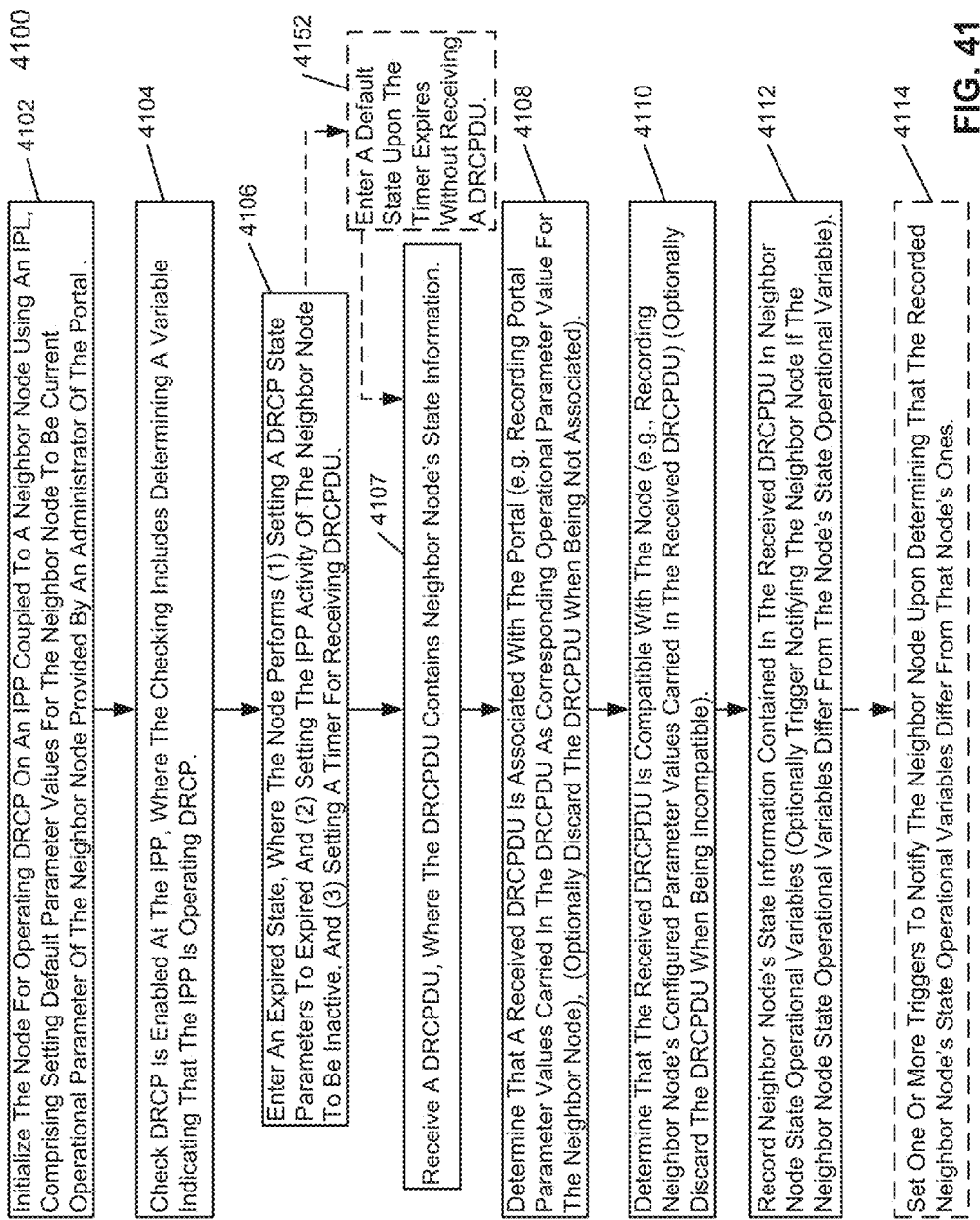
FIG. 41 illustrates a method for synchronizing with a neighbor in a node of a DRNI link aggregation group according to an embodiment of the invention.

FIG. 41 illustrates another method for synchronizing with a neighbor in a node of a DRNI link aggregation group according to an embodiment of the invention. Method 4100 is similar to method 3300, and the same or similar references and terms indicate elements or components having the same or similar functionalities.

The differences in method 4100 include that at references 4108 and 4110, the received DRCPDU is discarded when the received DRCPDU is not associated with the portal or the received DRCPDU is incompatible with the node.

Figure 42A:
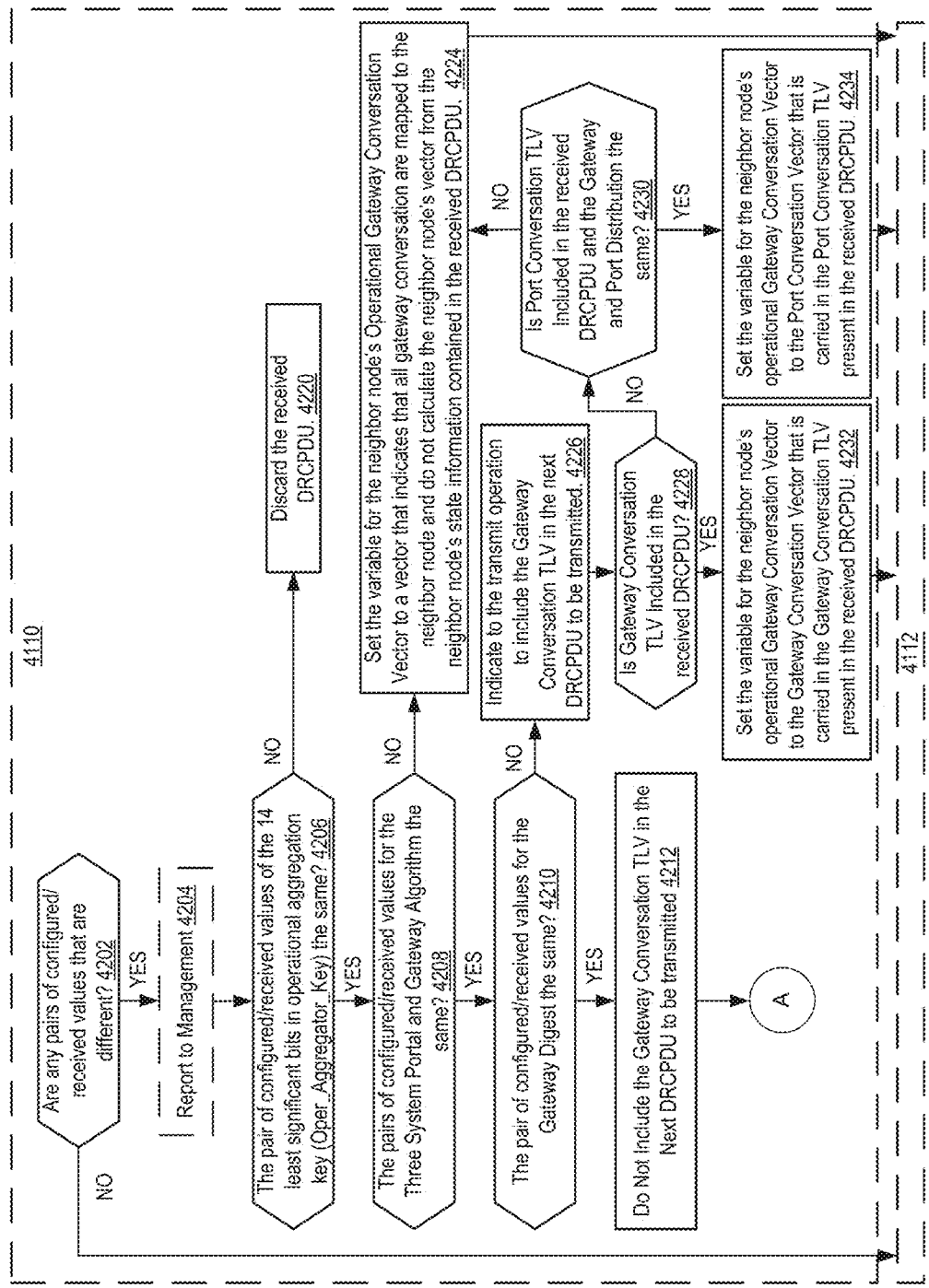
FIGS. 42A-B are flow diagrams illustrating the operations of determining whether the received DRCPDU is compatible with a node according to one embodiment of the invention.
Figure 42B:
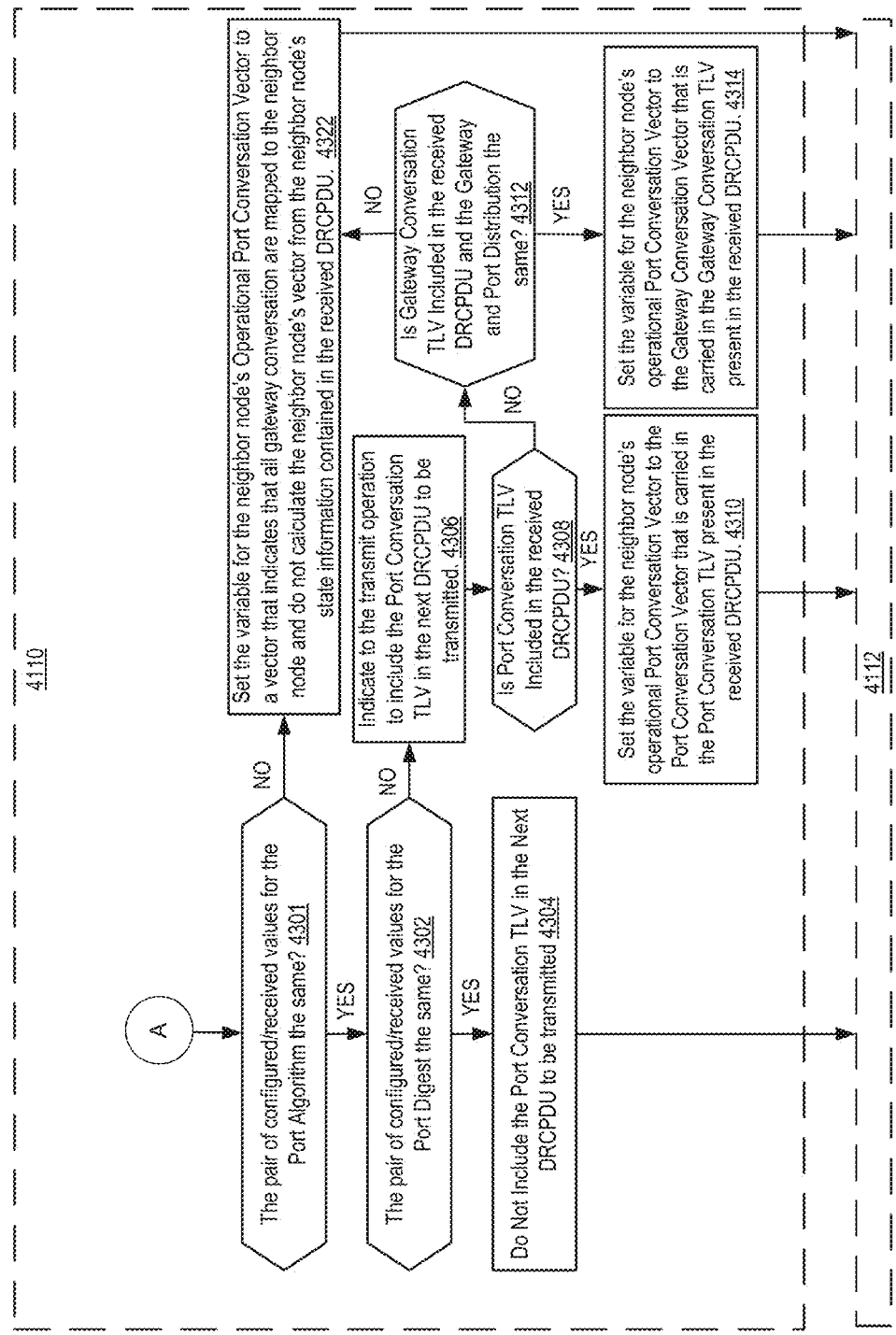

FIGS. 42A-B are flow diagrams illustrating the operations of determining whether the received DRCPDU is compatible with a node according to one embodiment of the invention. FIG. 42B is a continuation of FIG. 42A. In one embodiment, the method illustrated in FIGS. 42A-B is an embodiment of operations within reference 4110 of FIG. 41.

At reference 4202, the node determines whether any pairs of configured value of the node and the received value from the neighbor node are different. The configured values are included in the configuration information of the node. In one embodiment, the configuration information include operational aggregation keys, gateway algorithm three system portal setting, gateway digest, port algorithm, port digest. If there is no difference, the received DRCPDU is compatible with the node, and the determination is complete, and the process goes to operations within reference 4112 in one embodiment. The flow optionally goes to reference 4204 if there is any difference, where the node reports to management.

The node then determines at reference 4206 whether the pair of configured and received values of the 14 least significant bits in operational aggregation keys (e.g., Oper_Aggregator_Key, where ones for the node and the neighbor node are referred to as DRF_Home_Oper_Aggregator_Key and DRF_Home_Oper_Aggregator_Key respectively) are the same. Note the 14 least significant bits for determination is an example only, and the other bit positions of the operational aggregation keys may be utilized. If the operational aggregation keys are different, the received DRCPDU is discarded at reference 4220.

The node then determines at reference 4208 whether the two pairs of configured and received values for the three system portals (e.g., Drni_Three_System_Portal and Drni_Neighbor_Three_System_Portal) and gateway algorithms (DRF_Home_Gateway_Algorithm and DRF_Neighbor_Gateway_Algorithm) are the same. The determination is to confirm the three system portal setting and gateway algorithm are consistent between the two neighboring nodes. Note that for a portal allowing more than three portal systems, the setting is for that system portal setting. If not, the flow goes to reference 4224, where the node sets the variable for the neighbor node's operational gateway conversation vector (e.g., referred to as Gateway_Conversation_ Vector) to a vector that indicates that all gateway conversations are mapped to the neighbor node and do not calculate the neighbor's vector from the neighbor node state information contained in the received DRCPDU. Afterward, flow goes from 4224 to 4112. On the other hand, if the values are the same, the flow goes to reference 4210.

At reference 4210, the node determines whether the pair of configured and received values for the gateway digest (e.g., referred to as Gateway_Digest) are the same. If there are not the same, the node indicates at reference 4226 to the transmit operations (e.g., performed through Transmission machine) to include the gateway conversation TLV (e.g., Gateway_Conversation_Vector_TLV) in the next DRCPDU to be transmitted. Otherwise, the node does not include the gateway conversation TLV in the next DRCPDU to be transmitted at reference 4212.

At reference 4228, the node determines whether a gateway conversation TLV is included in the received DRCPDU. If it is, the flow goes to reference 4232, where the node sets the variable for the neighbor's node's operational gateway conversation vector to the gateway conversation vector that is carried in the port conversation TLV present in the received DRCPDU. Afterward, flow goes from 4232 to 4112. If the gateway conversation TLV is not included in the received DRCPDU, the flow goes to reference 4230.

At reference 4230, the node determines whether a port conversation TLV is included in the received DRCPDU and the gateway and port distribution are the same. If they are not, the flow goes to reference 4224. If they are, the flow goes to reference 4234, where the node sets the variable for the neighbor's node's operational gateway conversation vector to the port conversation vector that is carried in the port conversation TLV present in the received DRCPDU. Afterward, flow goes from 4232 to 4112.

FIG. 42B continues following 4212. At reference 4301, the node determines whether the pair of configured and received values for the port algorithms (DRF_Home_Port_Algorithm and DRF_Neighbor_Port_Algorithm) are the same. If it is not the same, the flow goes to reference 4322, where the node sets the variable for the neighbor node's operational port conversation vector to a vector that indicates that all gateway conversation are mapped to the neighbor node and do not calculate the neighbor node's vector from the neighbor node's state information contained in the received DRCPDU.

At reference 4302, the node determines whether the pair of configured and received values for the port digest (e.g., Port_Digest) is the same. If it is, the flow goes to reference 4304, where the node does not include the port conversation TLV in the next DRCPDU to be transmitted. The flow goes from 4304 to 4112 afterward. If it is not, the flow goes to reference 4306.

At reference 4306, the node indicate to the transmit operation to include the port conversation TLV in the next DRCPDU to be transmitted. The flow then goes to reference 4308, where the node determines whether the port conversation TLV is included in the received DRCPDU. If it is, the flow goes to reference 4310, where the node sets the variable for the neighbor node's Operation Port Conversation Vector to the Port Conversation Vector that is carried in the Port Conversation TLV present in the received DRCPDU. The flow goes from 4310 to 4112 afterward. If the port conversation TLV is not included, the flow goes to reference 4312.

At reference 4312, the node determines whether the port conversation TLV is included in the received DRCPDU. If it is, the flow goes to reference 4314, where the node sets the variable for the neighbor node's operational port conversation vector to the port conversation vector that is carried in the gateway conversation TLV present in the received DRCPDU. The flow goes from 4314 to 4112 afterward. If the port conversation TLV is not included in the received DRCPDU, the flow goes to reference 4316, where the node sets the variable for the neighbor node's operational port conversation vector to a vector that indicates that all port conversations are mapped to the neighbor node and do not calculate the neighbor node's vector from the neighbor node's state information contained in the received DRCPDU.

DRCP Periodic Transmission Machine

The DRCP Periodic Transmission machine may implement the function specified in FIG. 9 with its associated parameters discussed herein above.

The DRCP Periodic Transmission machine establishes the desire of the Home and the Neighbor Portal Systems to exchange periodic DRCPDUs on an IPP in order to maintain a Portal, and establishes how often those periodic transmissions should occur. Periodic transmissions will take place if either participant so wishes. Transmissions occur at a rate determined by the Neighbor Portal System; this rate is linked to the speed at which the Neighbor Portal System will time out received information.

The state machine has four states. They are as follows: NO_PERIODIC (Block 902). While in this state, periodic transmissions are disabled and the stop periodic_timer function is executed. FAST_PERIODIC (Block 904). While in this state, periodic transmissions are enabled at a fast transmission rate. This state is entered from the NO_Periodic state (block 902) in response to an unconditional transition (UCT). The Fast_Periodic state can transition to the Periodic transmission (Block 910) and the slow_periodic states (Block 905). A SLOW_PERIODIC state 906 can be entered from the FAST_PERIODIC 904 when the long timeout is determined. While in this state, periodic transmissions are enabled at a slow transmission rate. If the periodic timer expires then the state transitions to the PERIODIC_TX (Block 910). PERIODIC_TX. This is a transitory state entered on periodic_timer expiry that asserts NTT and then exits to FAST_PERIODIC or SLOW_PERIODIC depending upon the Neighbor's DRCP_Timeout setting.

If periodic transmissions are enabled, the rate at which they take place is determined by the value of the DRF_Neighbor_Oper_DRCP_State.Timeout variable. If this variable is set to Short Timeout, then the value fast_periodic_time is used to determine the time interval between periodic transmissions. Otherwise, slow_periodic_time is used to determine the time interval.

Thus, the embodiments provide for a process comprising the steps of initializing in a no periodic state in which transmissions are disabled, transitioning to a fast periodic state, starting a timer for the fast periodic time, transitioning to a slow periodic state or a periodic transmission state in response to a long time out or a neighbor having the fast periodic time out setting, respectively, transitioning from a slow periodic time out to a periodic transmission state in response to a short timeout setting at the neighbor or a timer expiration, and transitioning from the periodic transmission state to either the fast periodic or short periodic state in response to the neighbor timeout setting changing to a short time out or long timeout setting respectively.

Figure 17:
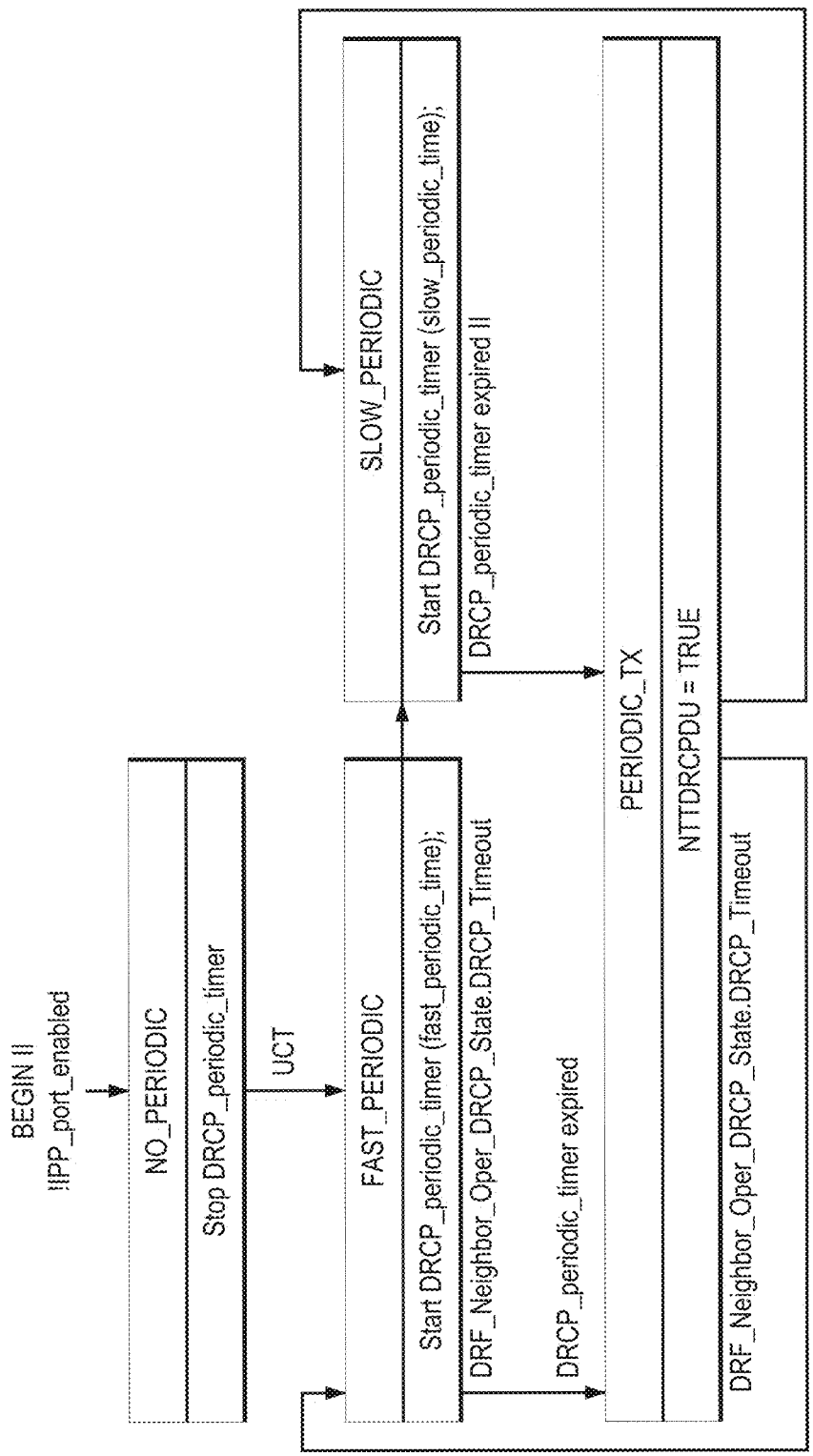
FIG. 17 is another flowchart illustrating a state machine for periodic transmission according to one embodiment of the invention.

The DRCP Periodic Transmission machine may also implement the function specified in FIG. 17 with its associated parameters. FIG. 17 contains different terms (e.g., DRCP_periodic_timer and NTTDRCPDU, not periodic_timer and NTT respectively as in FIG. 9), but the flows are the same otherwise. The terms and functions of the alternate transmission machine in FIG. 17 are analogous to those of FIG. 9. One skilled in the art would understand that other implementations are possible consistent with the principles and structures of the illustrated transmission machines.

Portal System Machine

The Portal System machine may implement the function specified in FIG. 10 with its associated parameters discussed herein above. This process can initialize to a portal system initialize state (Block 1002). The setDefaultPortalSystemParameters and updateKey functions are executed. In the case either the Change Portal or the ChangeDRFPorts are true the process transitions to the portal system update state (Block 1004). In the portal system update state, the ChangePortal is set to false, changeDRFPorts set to False, update DRF homestate, and updatekey execution. The next update is triggered when either change portal or change DRFPorts is update to true.

Thus, the embodiments provide for a process comprising the steps of initializing to a portal initialization state where default portal system parameters are created and a key is updated, transitioning to a portal system update state in response to a ChangePortal or ChangeDRFPorts variable being Boolean true, setting in a portal system update state the ChangePortal variable to false, the changeDRFPorts variable to false, executing an updateDRFHomeState, and updating the key, and re-entering the portal system update state upon detecting a ChangePortal or ChangeDRFPorts variable being true.

On initialization the Portal System's variables are set to their default values for this Portal as configured by their administrative settings. In particular the default operational states of all Gateways, Aggregation Ports, and IPPs, in the Portal are set to FALSE. In addition based on those default values, the Operational Key to be used by the associated Aggregator is calculated to be the Administrative Key value assigned to this Portal System.

Any local change on the operational state of the Portal System's Gateway, or to the distribution state of any of the attached Aggregation Ports as reported by the associated Aggregator, or any change in the operational state of the Neighbor Portal Systems, as reported by the RX state machine, triggers a transition to the PORTAL_SYSTEM_UPDATE state. This causes the function updateDRFHomeState to re-evaluate the variable providing the Portal System's own state (DRF_Home_State) based on the updated local information on the operational state of the Gateway and all the Aggregation Ports on the Portal System's Aggregator. Any change in the operational state of the Portal System's Gateway is reflected to the GatewayConversationUpdate which is used to trigger state transitions in the ports' state machines and IPP. Similarly, any change in the operational state of the Aggregation Ports associated with this Portal System's Aggregator Port is reflected to the PortConversationUpdate which is used to trigger state transitions in the same state machines. Finally, the updateKey function updates the operational Key, to be used by the Portal System's Aggregator, by selecting the lowest numerical non zero value of the set comprising the values of the administrative Keys of all active Portal Systems in the Portal.

The state machine returns to the PORTAL_SYSTEM_UPDATE state whenever the operational state of any of the DR Function's ports changes.

Figure 18:
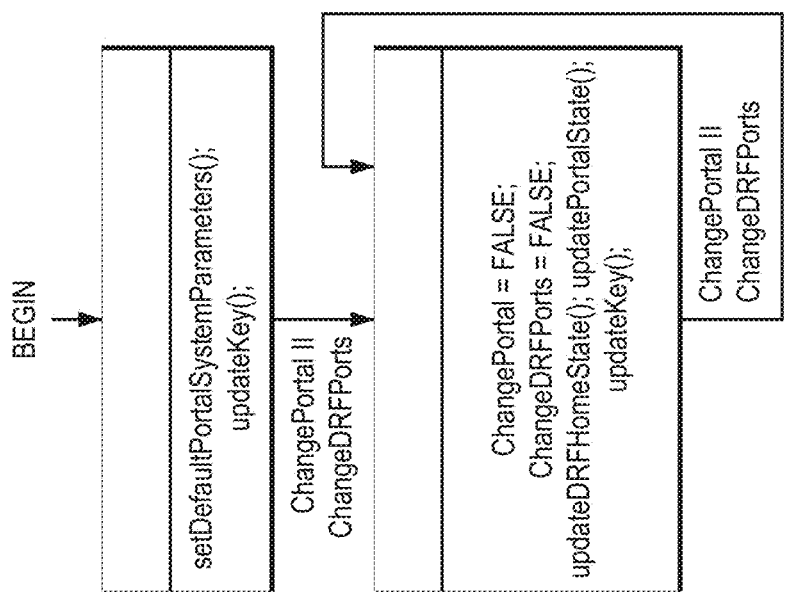
FIG. 18 is another flowchart illustrating a portal system machine according to one embodiment of the invention.

The Portal System machine may also implement the function specified in FIG. 18 with its associated parameters. FIG. 18 is similar to FIG. 10 except that the system executes update Portal State using UpdatePortalState function in FIG. 18. The terms and functions of the alternate Portal System machine in FIG. 18 are analogous to those of FIG. 10. One skilled in the art would understand that other implementations are possible consistent with the principles and structures of the illustrated Portal System machines.

Figure 34:
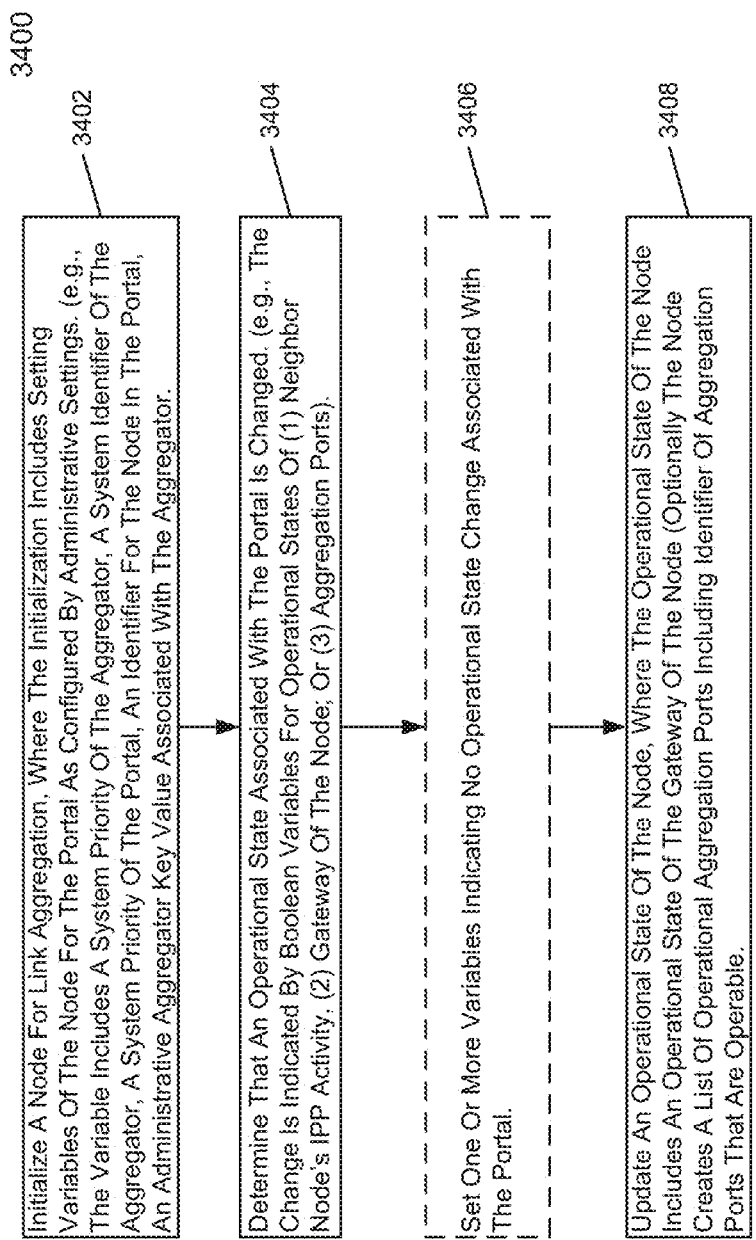
FIG. 34 illustrates a method for updating operational states of a node in a distributed resilient network interconnect (DRNI) according to an embodiment of the invention.

FIG. 34 illustrates a method for updating operational states of a node in a distributed resilient network interconnect (DRNI) according to an embodiment of the invention. Method 3400 may be implemented on a DRCP node (e.g., a network device) of a DRCP portal (referred to as a local portal) as a part of a DRNI such as nodes K-O of FIG. 1B and network devices 132 and 134 of FIG. 1C. Note optional steps are denoted as a dotted box as illustrated in FIG. 34.

At reference 3402, the node initializes for link aggregation. The initialization includes setting variables of the node for the portal it belongs as configured by administrative settings. The initialization is performed by executing a function (e.g. setDefaultPortalSystemParameters in FIG. 10) in one embodiment. The function sets the node's variable to administrative set values as enumerated in the definition of setDefaultPortalSystemParameters discussed herein above, which includes a system priority of the aggregator of the node (e.g., Drni_Aggregator_Priority), a system identifier of the aggregator of the node (e.g., Drni_Aggregator_ID), a system priority of the portal (e.g., Drni_Portal_Priority), an identifier for the node in the portal (e.g., DRF_Portal_System_Number), an administrative aggregator key value associated with the aggregator (e.g., DRF_Home_Admin_Aggregator_Key), a port algorithm used by a DR function of the node to assign frames to port conversation IDs (e.g., DRF_Home_Port_Algorithm), a gateway algorithm used by the DR function of the node to assign frames to gateway conversation IDs (e.g., DRF_Home_Gateway_Algorithm) and etc.

At reference 3404, the node determines that an operational state associated with the portal is changed. The change of operational state may be indicated by a Boolean variable that is set to true when an operational value of the network device's view of the value of the neighbor network device's IPP activity is active. In one embodiment, a variable such as ChangePortal discussed herein above is such Boolean variable. The change of operational state may also be indicated by a Boolean variable that is set to true when an operational state of the gateway of the node changes. The change of operational state may also be indicated by a Boolean variable that is set to true when one of operational states of aggregation ports of the node associated with the first portal changes. In one embodiment, a variable such as Change- DRFPorts discussed herein above is such Boolean variable for both changes of the operational states of the gateway and aggregation ports.

At reference 3406, the node may set one or more variables indicating no operational state change associated with the portal. In one embodiment, that is performed by setting variables such as ChangePortal and ChangeDRFPorts to be FALSE as illustrated in FIG. 10. The setting allows further changes of operational state trigger update of ChangePortal and ChangeDRFPorts so that the node may detect the change.

At reference 3408, the node updates a set of operational states of the node for link aggregation in response to the operational state change, where the set of operational state includes an operational state of the gateway for the node. In one embodiment, the update is performed through executed a function such as updateDRFHomeState discussed herein above. In one embodiment, the update also create a list of operational aggregation ports by including only those aggregation port identifiers (ID) which is operable (e.g., the attached aggregator reports them as having Actor_Oper_Port_State.Distributing==TRUE (condition that excludes the cases where the associated aggregation ports are either non operable or in an expired state, or not in the link aggregation group)).

The method provides an efficient way to synchronize operational states of the DRCP node with neighbor DRCP node based on changes of the portal to which the DRCP node belongs.

DRNI Gateway and Aggregator Machine

The DRNI Gateway and Aggregator machine may implement the function specified in FIG. 11 with its associated parameters discussed herein above. There are two DRNI Gateway and Aggregator machines on a Portal System. Each one is associated with a Conversation ID type: there is one for Gateway Conversation IDs and one for Port Conversation IDs. FIG. 11A is the DRNI gateway process which initializes in the DRNI Gateway initialize state (Block 1102). In this state the InitializeDRNIGatewayConversation function is executed and the GatewayCoversationUpdate is set to FALSE and where the GatewayCoversationUpdate occurs, the process transitions to the DRNI Gateway Update state (Block 1104). In the DRNI Gateway Update state (Block 1104), the process sets the GatewayConversationUpdate to false, an updatePortaState, setGatewayConversaion operation, and setIPPGatewayUpdate are executed and an updatePortalSystemGateway Conversation is executed. The DRNI gateway update is triggered on each occurrence of the GatewayConversation Update.

The embodiments of the process comprise the steps of initializing to a DRNI Gateway initialization state, initializing a DRNI gateway conversation and the GatewayCoversationUpdate to FALSE, transitioning to a DRNI gateway update state upon detecting a gateway conversation update variable is true, setting updatePortalState, setting the IPP Gateway update triggers, setting the gateway conversation update variable to false, setting the gateway conversation, updating a portal system gateway conversation and re-entering the DRNI gateway update state upon the Gateway Conversation Update variable being set to true.

FIG. 11B is the DRNI port update process. In this process the DRNI port update process begins in the DRNI Port initialize state (Block 1112). The initializeDRNIPortConversation function is executed and the PortCoversationUpdate is set to FALSE and the process continues in response to an occurrence of the PortConversationUpdate, which transitions the state to the DRNIPortUpdate (Block 1114). In the DRNI Port Update state, the process sets the PortConversationUpdate to false, the updatePortalState, the setPortConversation, the setIPPPortUpdate operations and the updatePortalSystemPortConversation operation are executed. The DRNI port update is retriggered when there is a change to the value of the PortConversationUpdate.

The embodiments of the process comprise the steps of initializing to a DRNI port initialization state, initializing a DRNI port conversation and the PortCoversationUpdate to FALSE, transitioning to a DRNI port update state upon detection of the Port Conversation Update variable being true, setting the IPP Port update triggers, setting the Port Conversation Update variable to false, setting the Port Conversation, updating the Portal System Port Conversation and re-entering the DRNI port update state in response to detecting the Port Conversation Update variable is true.

Figures 39A, 39B:
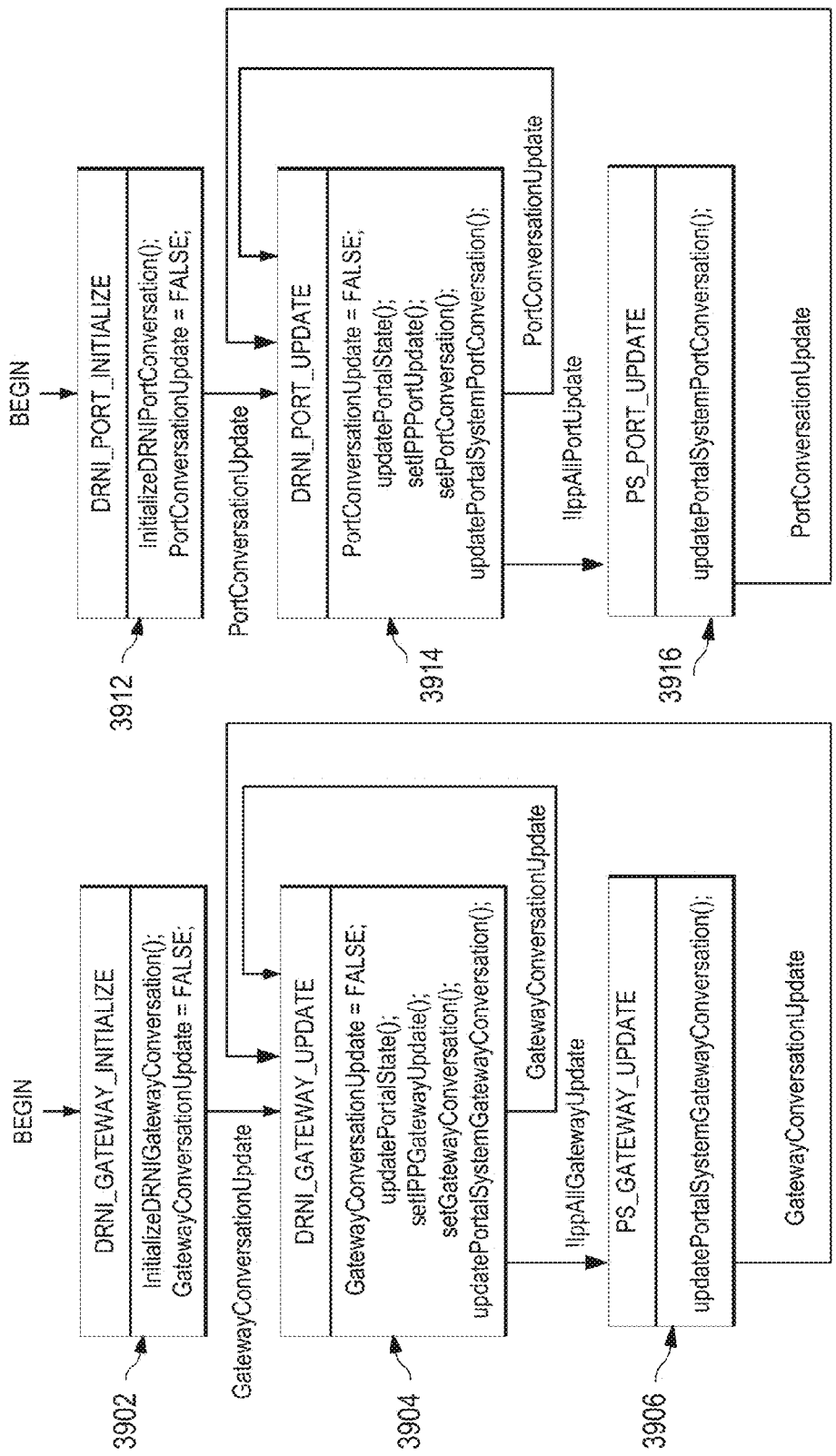
FIGS. 39A-B are another set of flowcharts illustrating DRNI and Aggregator machine operations.

FIGS. 39A-B are another set of flowcharts illustrating DRNI and Aggregator machine operations. FIG. 39A illustrates the DRNI gateway process and FIG. 39B illustrates the DRNI port update process. FIGS. 39A-B and FIGS. 11A-B are similar and the same or similar references and terms indicate elements or entities having the same or similar functionalities.

FIG. 39A is similar to FIG. 11A, with the additional reference 3906, where upon determining that not all IPPs need to update the gateway conversation ID distributions (expressed as !IppAllGatewayUpdate), the node sets the portal system gateway conversation (e.g., through updatePortalSystemGatewayConversation), and upon receiving gateway conversation update, returns to reference 3904.

FIG. 39B is similar to FIG. 11B, with the additional reference 3916, where upon determining that not all IPPs need to update the port conversation ID distributions (expressed as !IppAllPortUpdate), the node sets the portal system port conversation (e.g., through updatePortalSystemPortConversation), and upon receiving port conversation update, returns to reference 3914.

These state machines are responsible for configuring the Gateway Conversation IDs and the Port Conversation IDs that are allowed to pass through this DR Function's Gateway and Aggregator based on the agreed priority rules and the operation of DRCP.

On a trigger from the PS state machine (FIG. 10) or the DRX state machine (FIG. 8), declaring that a Gateway's operational state has changed, the state machine enters the DRNI_GATEWAY_UPDATE state. This causes the triggering parameter (GatewayConversationUpdate) to be reset to FALSE. Then the function updatePortalState will update the variable providing the states of all Portal Systems (Drni_Portal_System_State[ ]) by combining the updated DRF_Home_State with information from the operational state of the ports on other Portal Systems as reported by the received DRCPDUs on the Portal System's IPPs and recorded by the DRX state machine (FIG. 8) and sets IppGatewayUpdate on every IPP on the Portal System to TRUE to trigger further updates on the IPP state machines (FIG. 12). Subsequently the setGatewayConversation function is invoked to identify the Portal System that is responsible for each Gateway Conversation ID based on the agreed selection priorities and the Gateways operational state as known by this Portal System (based on the local Gateway's operational state and the Neighbor Portal Systems' declared operational state of their own Gateways carried by the latest DRCPDU received from those Neighbor Portal Systems). Finally the, Gateway Conversation ID indexed, Boolean vector will be calculated based on the agreement between this Portal System's view on the Gateway Conversation IDs that are allowed to pass through the Portal System's Gateway and all the Neighbors' view on the Gateway Conversation IDs that are allowed to pass through this Portal System's Gateway [as declared through their DRCPDUs and recorded by this Portal System's DRX state machine (FIG. 8)]. This ensures that no Gateway Conversation ID is allowed to pass through this Portal System's Gateway unless agreement between all Portal Systems is reached.

The state machine is initialized having all Gateway Conversation IDs discarded and transits to the DRNI_GATEWAY_UPDATE state whenever the trigger GatewayConversationUpdate is set.

The Port Conversation ID indexed Boolean vector is set through a similar state machine operation the only difference being the priority selection rules are based on the agreed Port Conversation IDs and the Port Algorithm instead of the agreed Gateway Conversation IDs and the Gateway Algorithm.

Figure 35:
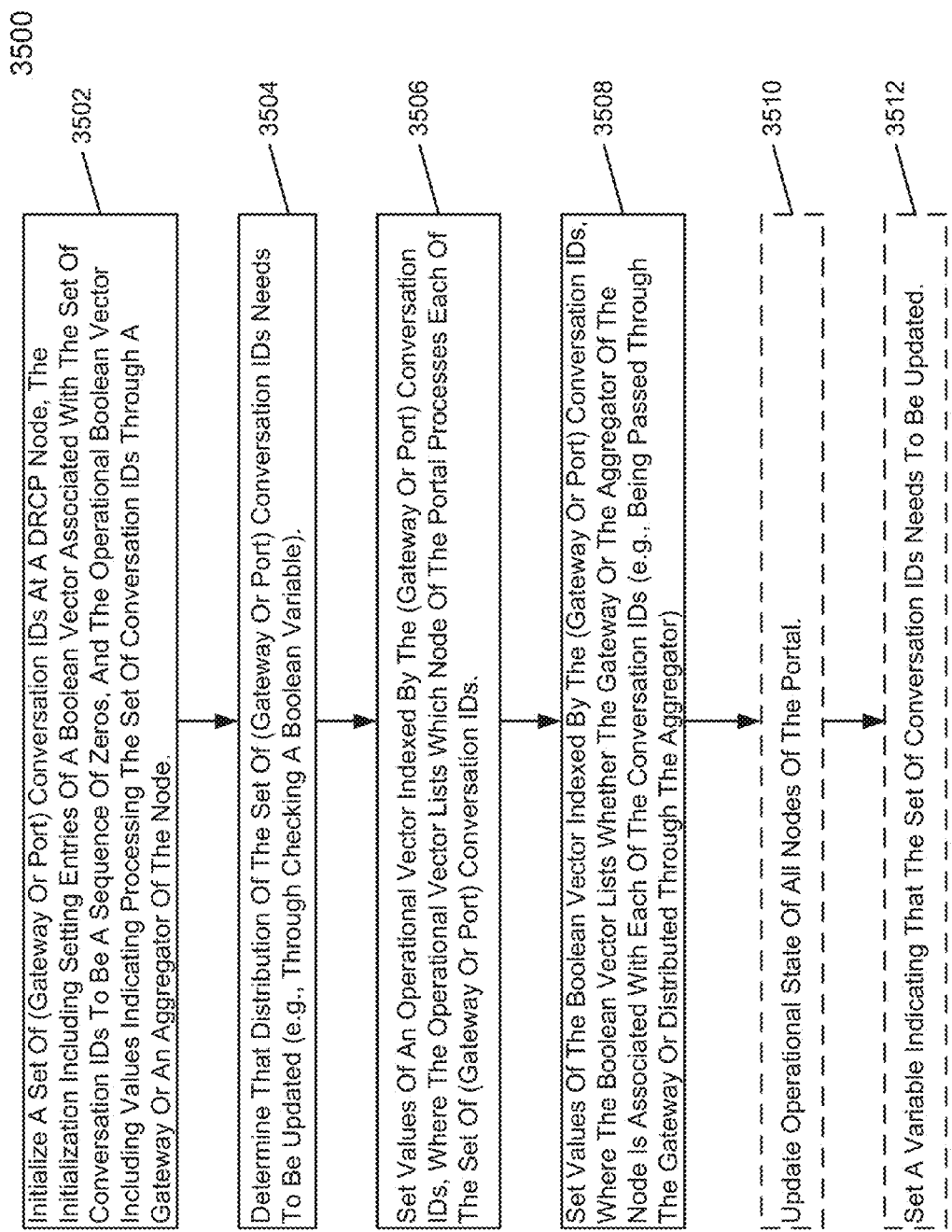
FIG. 35 illustrates a method for configuring of a set of conversation IDs for aggregator or gateway at a DRCP node in a distributed resilient network interconnect (DRNI) according to an embodiment of the invention.

FIG. 35 illustrates a method for configuring of a set of conversation IDs for aggregator or gateway at network device in a distributed resilient network interconnect (DRNI) according to an embodiment of the invention. Method 3500 may be implemented on a DRCP node (e.g., a network device) of a DRCP portal (referred to as a local portal) as a part of a DRNI such as nodes K-O of FIG. 1B and network devices 132 and 134 of FIG. 1C. Note optional steps are denoted as a dotted box as illustrated in FIG. 35.

At reference 3502, the node initializes a set of conversation IDs and the initialization includes setting entries of a Boolean vector associated with the set of conversation IDs to be a sequence of zeroes. The conversation IDs are gateway conversation IDs or port conversation IDs. The Boolean vector include values indicating processing the set of conversation IDs through a gateway or an aggregator of the node, which sets to zeros (no processing) through initialization. Note that a DRCP node contains a single gateway and a single aggregator.

The initialization may be performed by a function such as InitializeDRNIGatewayConversation and InitializeDRNIPortConversation discussed herein above. The Boolean vector may be Drni_Portal_System_Gateway_Conversation or Drni_Portal_System_Port_Conversation for gateway conversation IDs and port conversation IDs respectively. In one embodiment, an indicator of a conversation ID is the Boolean value of the entry (e.g., true means being passed through the gateway or distributed through the aggregator). The initialization makes all the values to be zeroes thus not pass.

At reference 3504, the node determines that distribution of the set of conversation IDs needs to be updated. In one embodiment, making the determination includes checking a Boolean variable (e.g., variables such as GatewayConversationUpdate and PortConversationUpdate discussed herein above for gateway conversation IDs and port conversation IDs respectively).

At reference 3506, the node sets values of an operational vector indexed by the conversation IDs, where the operational vector lists which node of the portal processes each of the set of conversation IDs. In one embodiment, the operational vector is Drni_Gateway_Conversation and Drni_Port_Conversation for gateway conversation IDs and port conversation IDs respectively. For gateway conversation IDs, the operational vector lists which node of the portal passes each gateway conversation ID. For port conversation IDs, the operational vector lists which node of the portal passes each port conversation ID.

At reference 3508, the node sets values of the Boolean vector indexed by the conversation IDs, where the Boolean vector lists whether the single gateway or the single aggregator of the network device is associated with each of the conversation IDs. The operational Boolean vector may be Drni_Portal_System_Gateway_Conversation or Drni_Portal_System_Port_Conversation for gateway conversation IDs and port conversation IDs respectively. For gateway conversation IDs, each entry in the Boolean vector indicates whether a gateway conversation ID is allowed to pass through the single gateway of the node. For port conversation IDs, each entry in the Boolean vector indicates whether a port conversation ID is allowed to be distributed through the single aggregator of the node.

Then optionally at reference 3510, the node updates operational states of all nodes of the portal. In one embodiment, the update is performed by a function such as updatePortalState discussed herein above.

Also optionally at reference 3512, the node sets a variable indicating that the distribution of the set of conversation IDs needs to be updated. In one embodiment, the variable is setIPPGatewayUpdate and setIPPPortupdate (discussed herein above) for gateway conversation IDs and port conversation IDs respectively.

Thus, embodiments of the invention provide efficient ways to configure conversation IDs so that the associated conversations may be transmitted properly in a link aggregation group containing DRNI.

DRNI IPP Machine

The DRNI IPP machine may implement the function specified in FIGS. 12A-B with its associated parameters discussed herein above. FIG. 12A illustrates a state machine to update IPP gateway conversation according to one embodiment of the invention. The process starts at block 1202, where an IPP gateway is initialized. In this embodiment, IPP gateway initialization is achieved through two initialization functions. Through IPPGatewayUpdate=FALSE, the network device sets the IPP Gateway Update triggers to FALSE. Through InitializeIPPPortConversation( ) function, the network device sets conversation passes (such as Ipp_Gateway_Conversation_Direction) to a sequence of zeros, indexed again by gateway conversation ID.

After initialization, the state machine goes to block 1204, where the IPP gateway is updated. The transmission is trigger by a variable change. The variable, IppGatewayUpdate, indicates that a per IPP gateway conversation ID distributions need to be updated. In one embodiment, IppGatewayUpdate is a Boolean value and once the Boolean value turns to TRUE, the state machine goes to block 1204. At block 1204. it sets gateway conversation through the function setGatewayConversation. As discussed herein above, the function sets DRNI gateway conversation value to the values computed from current administrative value of the gateway selection priority list for the distributed relay (through a variable such as aDrniConvAdminGateway[ ]) and the current DRNI port system state (by reading Drni_Portal_System_State[ ] in one embodiment). Also in block 1204, the network device sets IPP gateway conversation through function setIPPGatewayConversation( ). Additionally, the network device updates IPP gateway conversation direction through function updateIPPGatewayConversationDirection( ), and finally the network device reset IppGatewayUpdate to FALSE. Block 1204 repeats itself whenever a gateway conversation update is needed.

Thus, the embodiments of the process comprise the steps of initializing to an IPP gateway initialization state, initializing the IPP gateway update trigger to FALSE, initializing the IPP gateway conversation, transitioning to an IPP gateway update state upon detecting an Ipp Gateway Update variable is true, setting the gateway conversation, setting an IPP gateway conversation, updating the IPP gateway conversation direction, setting the Ipp Gateway Update variable to false and re-entering the IPP gateway update state in response to detecting the Gateway Conversation Update variable is true.

Figure 12B:
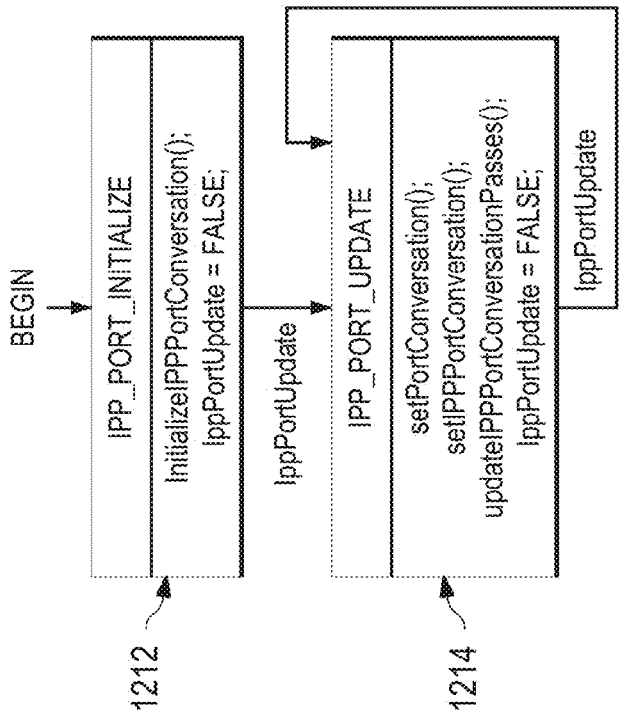
FIGS. 12A-B are flowcharts illustrating DRNI IPP machine status.
Figure 12A:
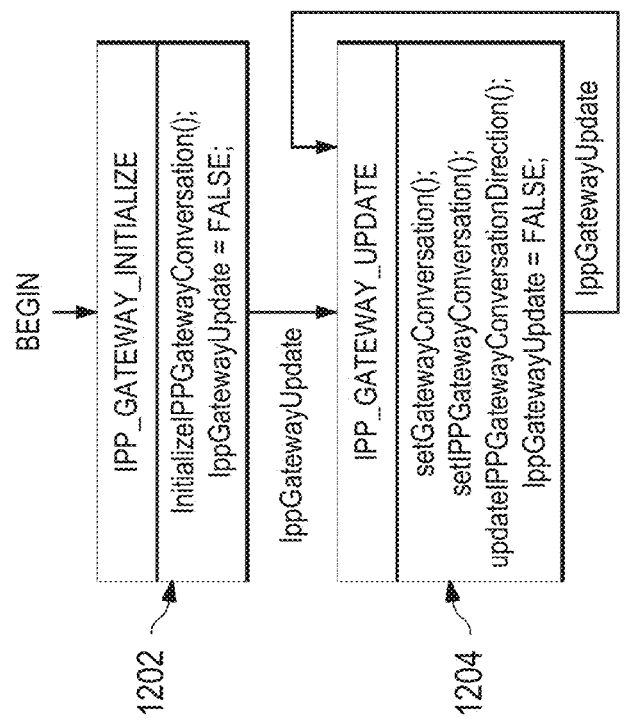

FIG. 12B illustrates a state machine to update IPP port conversation according to one embodiment of the invention. The process for updating IPP port is analogous to the process for updating gateway conversation, thus the process in FIG. 12B is similar to FIG. 12A with functions and variables for IPP ports are utilized for the IPP port conversation update.

The embodiments of this process comprise the steps of initializing to an IPP port initialization state, initializing the IPP port update trigger to FALSE, initializing a IPP port conversation, transitioning to an IPP port update state in response to detecting an IPP Port Update variable is true, setting a port conversation, setting an IPP conversation, updating an IPP port conversation pass setting the IppPortUpdate variable to false and re-entering the IPP Port Update state in response to detecting the PortConversationUpdate is true.

In one embodiment, these state machines are responsible for configuring the Gateway Conversation IDs and the Port Conversation IDs that are allowed to pass through this Neighbor Portal System's IPPs based on the agreed priority rules and the operation of DRCP.

On a trigger from the DRX state machine (FIG. 8), declaring that IppGatewayUpdate is set to TRUE, the state machine enters the IPP_GATEWAY_UPDATE state. This causes the setGatewayConversation function to be invoked. This will identify the Portal System that is responsible for each Gateway Conversation ID based on the agreed selection priorities and the Gateways operational state as known by this Portal System (based on the local Gateway's operational state and the Neighbors' declared operational state of their own Gateways carried by the latest DRCPDU received from those Neighbors). In an alternate embodiment illustrated in FIGS. 40A-B, setGatewayConversation and setPortConversation function are not invoked for gateway and port respectively.

In either case, the setIPPGatewayConversation function will identify the Portal System that is responsible for each Gateway Conversation ID based on the agreed selection priorities and the Gateways operational states as declared by the Neighbor Portal System on this IPP (based on the Neighbor Portal System's Gateway operational state and the Neighbor Portal System's declared operational state on their view on other Gateways in Portal, carried by the latest DRCPDU received from the Neighbor Portal System on this IPP). Subsequently, Gateway Conversation ID indexed, Boolean vector will be calculated based on the agreement between this Portal System's view on the Gateway Conversation IDs that are allowed to pass through the Portal System's IPP and the IPP Neighbor Portal System's view on the Gateway Conversation IDs that are allowed to pass through the same IPP [as declared through their DRCPDUs and recorded by this Portal System's DRX state machine (FIG. 8)]. This ensures that no Gateway Conversation ID is allowed to pass through this IPP unless agreement between this Portal System and its Neighbor Portal System is reached. Finally, IppGatewayUpdate is reset to FALSE.

The state machine is initialized having all Gateway Conversation IDs discarded and transits to the IPP_GATEWAY_UPDATE state whenever the trigger GatewayConversationUpdate is set.

The Port Conversation ID indexed Boolean vector is set through a similar state machine operation, the only difference being that the priority selection rules are based on the agreed Port Conversation IDs and the Port Algorithm, instead of the agreed Gateway Conversation IDs and the Gateway Algorithm.

Figure 36:
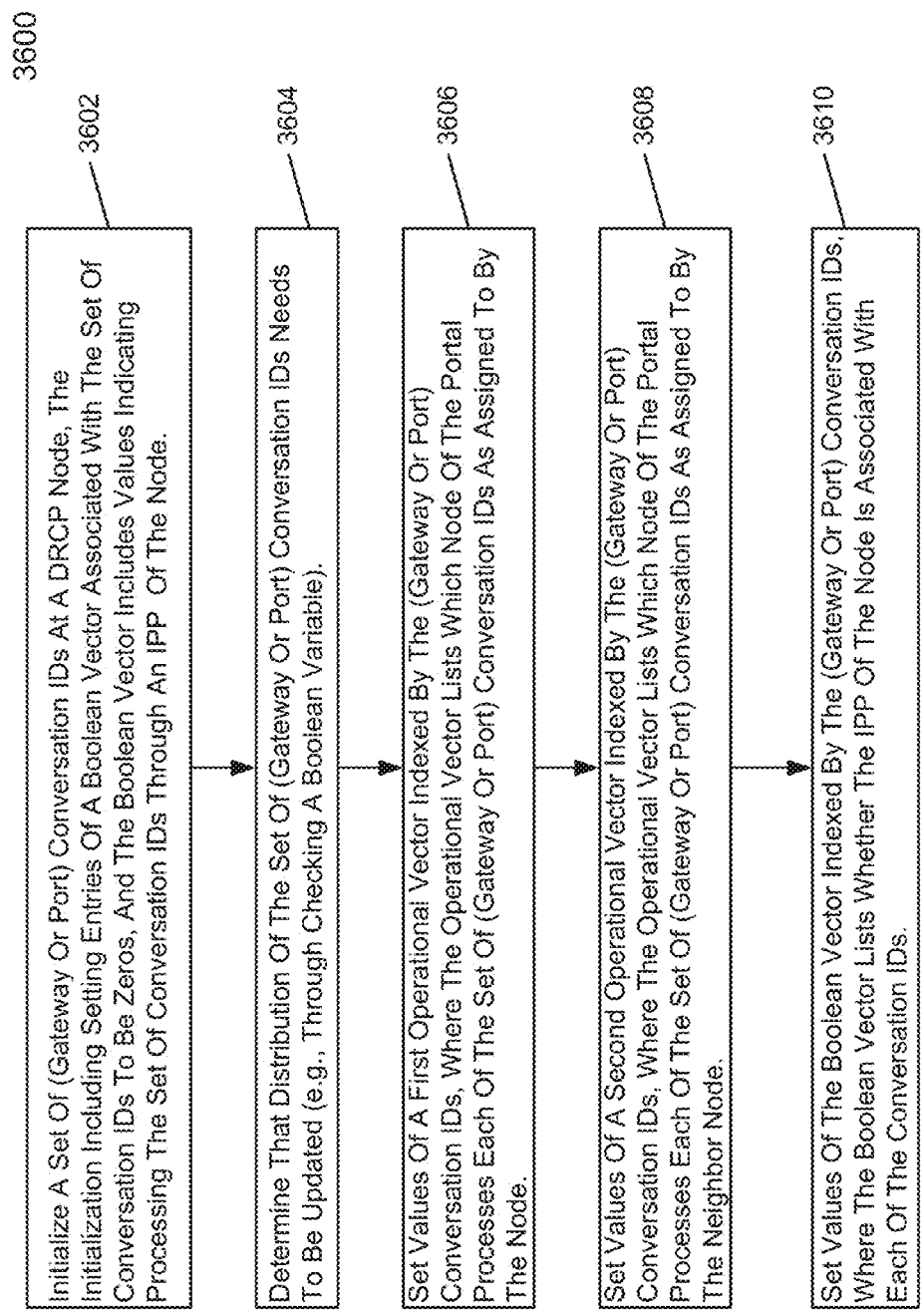
FIG. 36 illustrates a method for configuring of a set of conversation IDs for IPP at a DRCP node in a distributed resilient network interconnect (DRNI) according to an embodiment of the invention.

FIG. 36 illustrates a method for configuring of a set of conversation IDs for IPP at a DRCP node in a distributed resilient network interconnect (DRNI) according to an embodiment of the invention. Method 3600 may be implemented on a DRCP node (e.g., a network device) of a DRCP portal (referred to as a local portal) as a part of a DRNI such as nodes K-O of FIG. 1B and network devices 132 and 134 of FIG. 1C.

At reference 3602, the node initializes a set of conversation IDs and the initialization includes setting entries of a Boolean vector associated with the set of conversation IDs to be a sequence of zeroes. The conversation IDs are gateway conversation IDs or port conversation IDs. The Boolean vector include values indicating processing the set of conversation IDs through an IPP of the node.

The initialization may be performed by a function such as InitializeIPPGatewayConversation and InitializeIPPPortConversation discussed herein above. The Boolean vector may be Ipp_Gateway_Conversation_Direction or Ipp_Port_Conversation_Passes for gateway conversation IDs and port conversation IDs respectively. In one embodiment, a value for a conversation ID is the Boolean value of the entry. For example, a value of TRUE for a gateway conversation ID indicates that some gateway is reachable through this IPP. The initialization makes all the values to be zeroes thus not pass.

At reference 3604, the node determines that distribution of the set of conversation IDs needs to be updated. In one embodiment, making the determination includes checking a Boolean variable. In one embodiment, the Boolean variable is IppGatewayUpdate and IppPortUpdate for gateway conversation IDs and port conversation IDs respectively. In another embodiment, the Boolean variables is GatewayConversationUpdate and PortConversationUpdate for gateway conversation IDs and port conversation IDs respectively.

At reference 3606, the node sets values of a first operational vector indexed by the conversation IDs, where the operational vector lists which node of the portal processes each of the conversation IDs as assigned by the node. In one embodiment, the node sets the values through functions such as setGatewayConversation and setPortConversation to set the first operational vector such as Drni_Gateway_Conversation and Drni_Port_Conversation respectively. For gateway conversation IDs, Drni_Gateway_Conversation lists which node's gateway (if any) passes each gateway conversation ID. For port conversation IDs, Drni_Port_Conversation lists which node passes each port conversation IDs.

At reference 3608, the node sets values of a second operational vector indexed by the conversation IDs, where the operational vector lists which node of the portal processes each of the conversation IDs as assigned by the neighbor node. In one embodiment, the node sets the values through functions such as setIPPGatewayConversation and setIPPPortConversation to set the second operational vector such as Ipp_Other_Gateway_Conversation and Ipp_Other_Port_Conversation_Portal_System respectively. As discussed herein above, for gateway conversation IDs, Ipp_Other_Gateway_Conversation lists which node (i.e., portal system) (if any) is passing each gateway conversation ID as assigned by the neighbor node on this IPP, the neighbor node being the immediate neighbor node when the portal contains more than two nodes. Similarly, for port conversation IDs, Ipp_Other_Port_Conversation_Portal-_System lists which node is passing each port conversation ID as assigned to by the immediate neighbor node on this IPP.

At reference 3610, the node sets values of the Boolean vector indexed by the conversation IDs, where the Boolean vector lists whether the IPP of the node is associated with each of the conversation IDs. In one embodiment, the Boolean vector is Ipp_Gateway_Conversation_Direction for gateway conversation IDs and Ipp_Port_Conversation_ Passes for port conversation IDs as discussed herein above.

Thus, similar to method 3500, embodiments of the invention here provide efficient ways to configure conversation IDs so that the associated conversations may be transmitted properly in a link aggregation group containing DRNI.

DRCPDU Transmit Machine

When the Transmit machine (not illustrated) creates a DRCPDU for transmission, it may fill in the following fields with the corresponding operational values for this IPP according to one embodiment of the invention:

Aggregator ID and Priority.
Portal ID and Priority.
Portal System Number.
Topology State
Operational Aggregator Key.
Port algorithm.
Gateway algorithm.
Port Digest.
Gateway Digest.
If GatewayConversationTransmit is TRUE and if;
Drni_Three_System_Portal=0;
The Gateway Conversation Vector TLV with its TLV length set to 512 Octets and its Gateway_Conversation field set to Drni_Portal_System_Gateway_Conversation is prepared for DRCPDU transmission;
Otherwise if Drni_Three_System_Portal=1;
The Gateway Conversation Vector TLV with its TLV length set to 1024 Octets and its Gateway_Conversation field set to Drni_Gateway_Conversation is prepared for DRCPDU transmission;
If PortConversationTransmit is TRUE and if;
Drni_Three_System_Portal=0;
The Port Conversation Vector TLV with its TLV length set to 512 Octets and its Port_Conversation field set to Drni_Portal_System_Port_Conversation is prepared for DRCPDU transmission;
Otherwise if Drni_Three_System_Portal=1;
The Port Conversation Vector TLV with its TLV length set to 1024 Octets and its Port_Conversation field set to Drni_Port_Conversation is prepared for DRCPDU transmission;
If both GatewayConversationTransmit and PortConversationTransmit are TRUE and if;
Drni_Common_Methods is TRUE then;
either of the Gateway Conversation Vector TLV or the Port Conversation Vector TLV is sufficient to be prepared for DRCPDU transmission as each of the Conversation Vector TLVs is applicable to both Gateway and Port distributions;
Otherwise if Drni_Common_Methods is FALSE and Drni_Three_System_Portal=1;
Two separate DRCPDUs, one including the Gateway Conversation Vector TLV and another one including the Port Conversation Vector TLV will be prepared for transmission having all other TLVs the same.

If present, the Conversation Vector TLVs should be inserted between the Conversation Vector Indicator TLV and the DRCP State TLV.

DRCP State.

The Operational Aggregation Ports, the Administrative Aggregator Key and the operational Partner Aggregator Key of the Home Portal System and any other Portal System that its ability to form a Portal has been verified.

The operational Gateway Sequence numbers for every Portal System in the Drni_Portal_System_State[ ] and, if HomeGatewayVectorTransmit and/or OtherGatewayVectorTransmit are set to TRUE and the potential presence of the Conversation Vector TLVs does not result in a DRCPDU that has a length that is larger than the maximum allowed by the access method supporting that IPP, the associated Home Gateway Vector and/or Other Gateway Vector respectively.

In addition if the system is configured to use one of the Network/IPL shared methods specified by configuring a non-NULL value in aDrniEncapsulationMethod additional Network/IPLsharing TLVs will need to be attached to the main DRCPDU, carrying the appropriate operational values as specified.

When the Periodic machine is in the NO_PERIODIC state, the Transmit machine should:
Not transmit any DRCPDUs, and
Set the value of NTTDRCPDU to FALSE.
When the DRCP_Enabled variable is TRUE and the NTTDRCPDU variable is TRUE, the Transmit machine may ensure that a properly formatted DRCPDU is transmitted [i.e., issue a DRCPCtrlMuxN:M_UNITDATA.Request (DRCPDU) service primitive], subject to the restriction that no more than a specific number of LACPDUs may be transmitted in any Fast_Periodic_Time interval. The specific number may vary depending on implementation (e.g., ten or twenty). If NTTDRCPDU is set to TRUE when this limit is in force, the transmission may be delayed until such a time as the restriction is no longer in force. The NTTDRCPDU variable may be set to FALSE when the Transmit machine has transmitted a DRCPDU containing all the required fields as specified herein above.

If the transmission of a DRCPDU is delayed due to the above restriction, the information sent in the DRCPDU corresponds to the operational values for the IPP at the time of transmission, not at the time when NTTDRCPDU was first set to TRUE. In other words, the DRCPDU transmission model is based upon the transmission of state information that is current at the time an opportunity to transmit occurs, as opposed to queuing messages for transmission.

When the DRCP_Enabledvariable is FALSE, the Transmit machine may not transmit any DRCPDUs and may set the value of NTTDRCPDU to FALSE.

Network/IPL Sharing Machine

Figure 30:
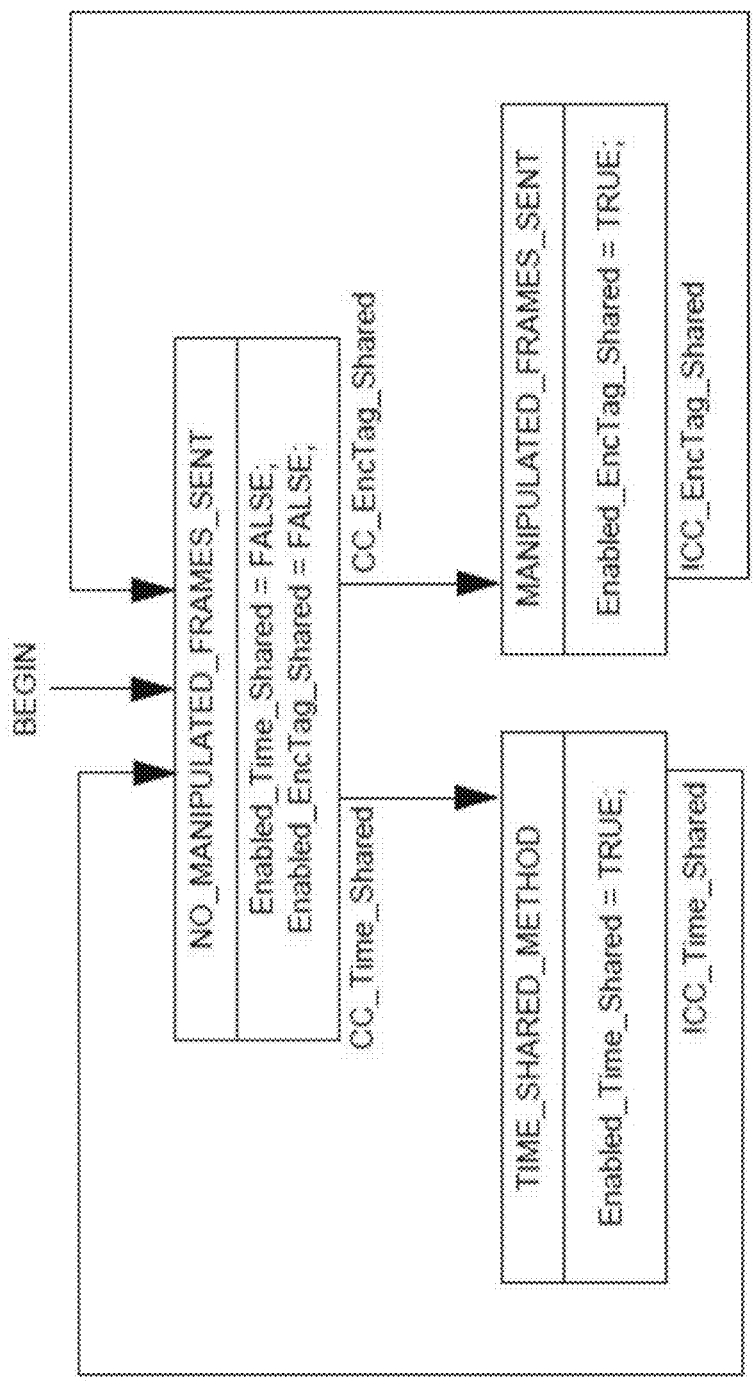
FIG. 30 illustrates a Network/IPL sharing machine according to one embodiment of the invention.

The Network/IPL sharing machine may implement the functions specified in FIG. 30 with its associated parameters. There is one Network/IPL sharing machine per IPP in a Portal System for the supported Network/IPL sharing method. This machine is only required when the Network/IPL shared methods, Network/IPL sharing by time, Network/IPL sharing by tag, or Network/IPL sharing by encapsulation is implemented.

The Network/IPL sharing machine, which corresponds to method 3100 of FIG. 31 discussed herein below, enables transmission and manipulation of the frames sent on the shared Network/IPL link only if the DRCPDUs received on the same port report the same Network/IPL sharing configuration by the Neighbor Portal System, thereby resulting in multiple IPL and network link sharing a same physical link or link aggregation.

The state machine has three states. They are as follows:

NO_MANIPULATED_FRAMES_SENT. While in this state, the IPL can only be supported by a physical or Aggregation Link.

TIME_SHARED_METHOD. While in this state, the Network/IPL sharing by time methods specified herein above are enabled.

MANIPULATED_FRAMES_SENT. While in this state, the tag manipulation methods of Network/IPL sharing by tag or Network/IPL sharing by encapsulation, as dictated by the Network/IPL sharing method selected the aDrniEncapsulationMethod, are enabled.

The System is initialized in the NO_MANIPULATED_FRAMES_SENT and IPL frames are sent on the dedicated physical link. If the Home Portal System is configured for Network/IPL sharing by time mode of operation, indicated by a value of 1 in aDrniEncapsulationMethod, the system will transit to TIME_SHARED_METHOD if the DRX state machine (DRX—FIG. 8) sets CC_Time_Shared to TRUE (indicating that the Neighbor Portal System on this IPP has also been configured for the Network/IPL sharing by time mode of operation). The System remains in the TIME_SHARED_METHOD state until a received DRCPDU sets CC_Time_Shared to FALSE, which triggers a state transition to the NO_MANIPULATED_FRAMES_SENT state and IPL frames are sent on the dedicated physical link.

Similarly, if the Home Portal System is configured for Network/IPL sharing by tag or Network/IPL sharing by encapsulation mode of operation, as indicated by the value in aDrniEncapsulationMethod, the system will transit to MANIPULATED_FRAMES_SENT if the DRX state machine (DRX—FIG. 8) sets CC_EncTag_Shared to TRUE (indicating that the Neighbor Portal System on this IPP has also been configured for the Network/IPL sharing by tag or Network/IPL sharing by encapsulation mode of operation respectively). The System remains in the MANIPULATED_FRAMES_SENT state until a received DRCPDU sets CC_EncTag_Shared to FALSE, which triggers a state transition to the NO_MANIPULATED_FRAMES_SENT state and IPL frames are sent on the dedicated physical link.

Figure 31:
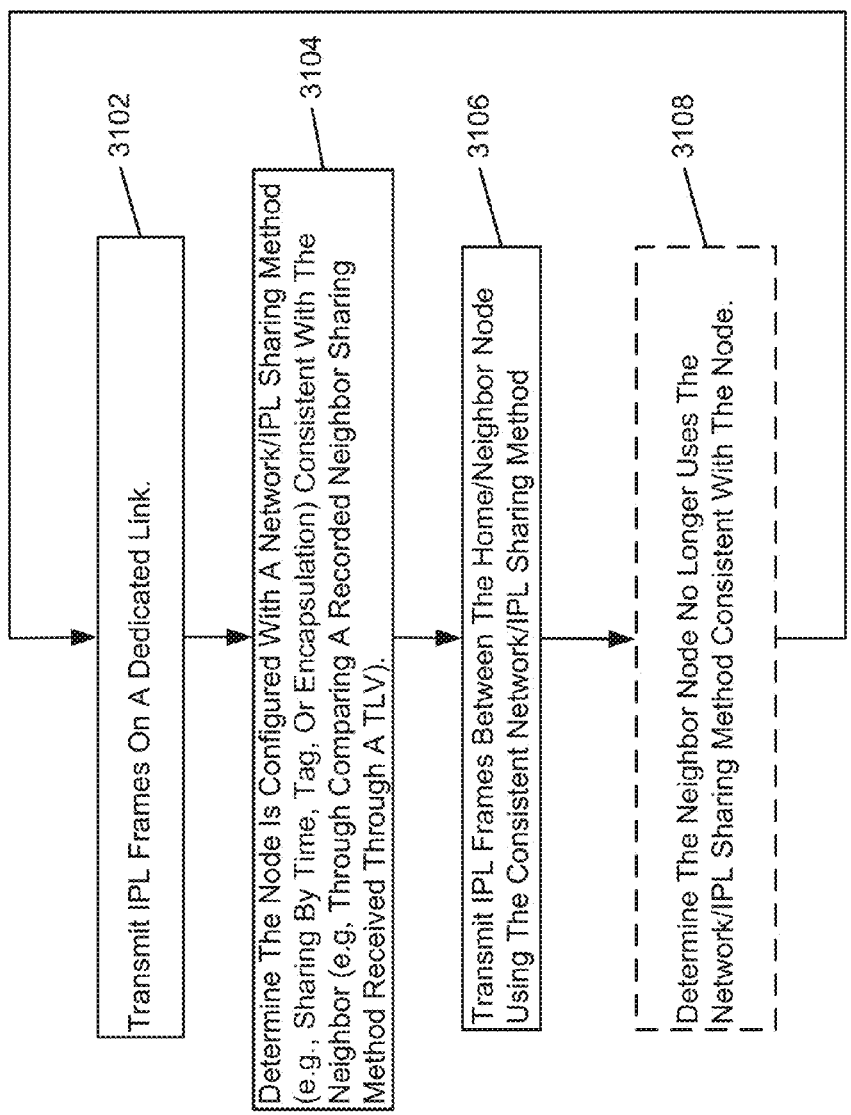
FIG. 31 illustrates a method for Network/IPL sharing at a node according to an embodiment of the invention.

FIG. 31 illustrates a method for Network/IPL sharing at a node according to an embodiment of the invention. Method 3100 may be implemented on a DRCP node (also referred to as a portal system of a portal, e.g., a network device) of a DRCP portal (referred to as a local portal) as a part of a DRNI such as nodes K-O of FIG. 1B and network devices 132 and 134 of FIG. 1C. Note optional step is denoted as a dotted box as illustrated in FIG. 31.

In reference 3102 a DRCP node (a local portal system) is in a normal state of operation and IPL frames are transmitted over a dedicated physical link or aggregation link towards a neighbor DRCP node (a neighbor portal system). In reference 3104 it is determined whether the node is configured in consistency with the neighbor node. For example, this may be performed using a parameter recording function, such as recordNeighborState, that at least records the parameter value carried in a TLV used for Network/IPL sharing from the neighbor node, e.g. field DRF_Home_Network/IPL_sharing_method in Table 6. The recorded parameter value may then be compared to the current corresponding parameter value used by the node. In case Network/IPL sharing is implemented in the node and in case parameter values are consistently configured in the nodes, the method proceeds to reference 3106 in which frames are transmitted from the node to the neighbor node using Network/IPL sharing.

Optionally the node continues using the consistent Network/IPL sharing method until it detects a change of Network/IPL sharing at the neighbor node at reference 3108. For example, a CC_Time_Shared or CC_Enctag_Shared indicates whether the home/neighbor nodes use consistent sharing methods. When the two nodes do not use consistent sharing method, the flow returns to reference 3102, where the dedicated link or aggregation link is used.

The embodiments of the invention provides an efficient way to support network and inter-port link sharing in a link aggregation group so that an inter-port link may share a physical link with other inter-port links or network links.

Coordination Between DRCP and LACP Statuses: A First Set of Embodiments

In a DRNI portal system as illustrated in FIGS. 1B-1C, DRCP and LACP status should be consistent for the system to work properly. In FIG. 1C, the consistency is easier to maintain. Referring to FIG. 1C, the link between network device 130 and network device 134 is the working link (link 172) and the link between network device 130 and network device 132 is the protection link (link 174) for a service. An IPL link (not shown) between network devices 134 and 132 keeps their DRCP status in synchronization. From the point of view of network device 130 (portal 142 with a single node), it is connected to a single system (portal 144) and no information regarding network devices 132 or 134 individually is explicitly communicated to network device 130.

When the IPL link between network devices 132 and 134 goes down, both network devices 134 (currently working node) and 132 (currently protection node) try to take over as the node transmitting traffic—from their respective perspective, it is the neighboring node that is not operating properly. Network device 132, as a protection node, will update its LAG identifier (ID) in order to avoid having the situation where both links 130-132 and 130-134 (links 172 and 174 respectively) carry duplicate traffic. At portal 142, the determination of which link is to remain in a link aggregation group (i.e., working link) is based on a decision by network device 130, which applies normal link aggregation operations to make the choice. Particularly, network device 130 puts the link 130-132 on hold to check if the link 130-134 is still in the link aggregation group (i.e. working link carrying traffic). If the link 130-134 is not in the link aggregation group, it enables traffic on the link 130-132. When the IPL link between network devices 134 and 132 is up again, the DRCP status is updated and the link 130-132 remains blocked, and the LACP status keep the link 130-134 be the working link throughout the process (thus no traffic outage).

For a DRCP system with each portal containing more than one network devices, maintaining consistency between DRCP and LACP status takes more effort. Additional information needs to be exchanged between portals and nodes to keep the portals synchronized. In particular, at least two operation keys (one for each operational partner portal system) may be introduced to coordinate the synchronization. One is an operation partner aggregator key. The operation partner aggregator key is associated with a node's aggregation link aggregation group identifier (LAG ID) (the node being a partner node). The operation partner aggregator key is transmitted in DRCPDUs. In one embodiment, the operation partner aggregator key is stored in a variable named as DRF_Home_Oper_Partner_Aggregator_Key, which is defined as an operation partner aggregator key associated with LAG ID of a network device (node of a portal) discussed herein above. The other is an operation key for each of the partner portal systems in the partner portal. The operation neighbor's portal key are also associated with a node's LAG ID (the node being a neighbor node). The operation neighbors (immediate or remote neighbors) portal keys are transmitted in DRCPDU. In one embodiment, the operation neighbor aggregator key is stored in a variable named DRF_Neigbhor_Oper_Partner_Aggregator_Key (DRF_Other_Neigbhor_Oper_Partner_Aggregator_Key in the case of a third portal system), which is defined as the last received operation partner aggregator key value of a neighbor node (or other neighbor in the case of a third portal system) on its associated intra-portal port (IPP).

For the aggregator keys to be exchanged, the DRCPDU may add a new field to hold a partner operation key, such field be used to carry DRF_Home_Oper_Partner_Aggregator_Key of one node in the DRCPDU. A function to record neighbor node's configured parameter value carried in a received DRCPDU from an IPP may also be updated. Such function, such as recordNeighborState discussed herein above, may be used to set received operation partner aggregator key to be the last known operation neighbor aggregator key (e.g., setting DRF_Neigbhor_Oper_Partner_Aggregator_Key equal to received DRF_Home_Oper_Partner_Aggregator_Key). Note when a portal contains more than two nodes, there are multiple DRF_Neigbhor_Oper_Partner_Aggregator_Key or potentially DRF_Other_Neigbhor_Oper_Partner_Aggregator_Key saved, one for each neighbor node.

Referring to FIG. 1B, the link K-M is the working link and the link L-O is the protection link. An IPL link each exists between nodes K and L, and M and O to keep their DRCP status in synchronization.

When the IPL link between network nodes M and O goes down, both nodes M (currently working node) and O (currently protection node) for a service try to take over as the node transmitting traffic—from their respective perspective, it is the neighboring node that is not operating. Node O, as a protection node, will update its LAG identifier (ID) in order to avoid having the situation where both links K-M and L-O carry duplicate traffic. At portal 112, nodes K and L need to independently make decisions on whether to discard or allow traffic on links K-M and L-O. The decision may be made through exchanging DRCPDUs between neighbor nodes in one embodiment. In addition, the selection logic applied by each node may be modified in order to take the exchanged information into account. Nodes K and L may be updated to allow traffic to pass through its associated links K-M and L-O respectively only when its operation partner aggregator key is the lowest value of a set of values including its operation partner aggregator key and its operation neighbor portal key(s). For the selection to work, node O as a protection node may update its operation key value (in one embodiment, the operation key value is updated using an update function such as updateKey function discussed hereinabove) when it updates its LAG ID.

Figure 19:
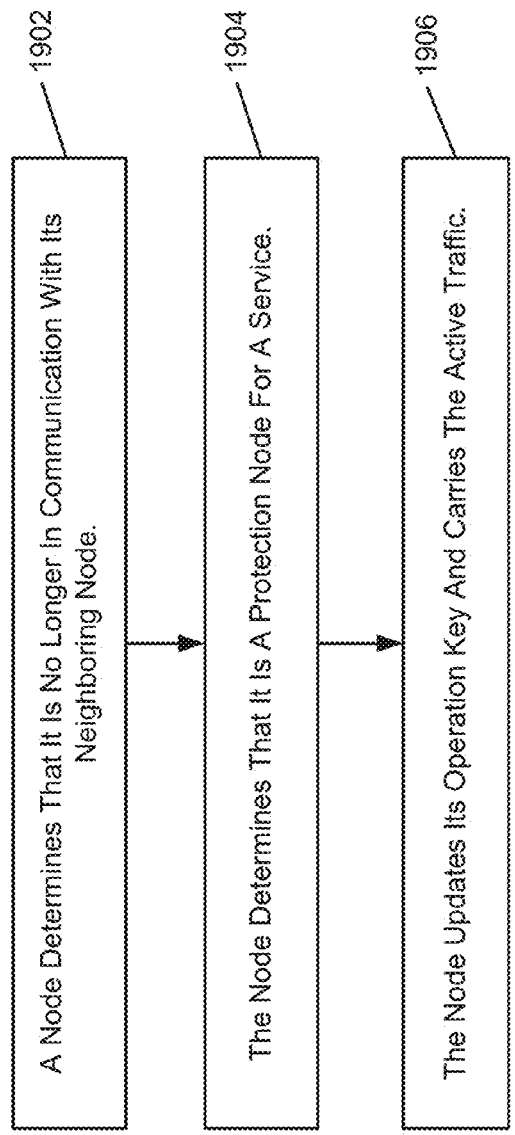
FIG. 19 is a flowchart illustrating a DRCP node's operations upon losing communication with its neighbor node according to one embodiment of the invention.

FIG. 19 illustrates a DRCP node's operations upon losing communication with its neighbor node according to one embodiment of the invention. The method may be implemented at any DRCP node coupled to one or more neighboring nodes. At 1902, the DRCP node determines that it is no longer in communication with its neighboring node(s). The loss of communication may be due to IPP being disabled or malfunction, or the neighboring node being disabled or malfunction. At 1904, the DRCP node then determines that it is a node currently not carrying traffic.

Note a DRCP node may act as working or protection node of a portal for a service. If the DRCP node is a working node, no further action is required, it will continue carrying active traffic. If the DRCP node is a protection node, the method continues to 1906, where the DRCP node updates its operation key and carries the active traffic. The updated operation key is set to the lowest numerical non zero value of the set comprising the values of a key of this node (e.g., the Admin_Aggregator_Key of this node), a key of the neighboring node (e.g., the_Admin_Aggregator_Key of the neighboring node), and a key of the other neighboring node (e.g. the Admin_Aggregator_Key of the other neighboring node) (when the portal contains 3 portal systems), on each IPP. The updated operation key is sent over to its partner node.

According to embodiments, it is thus provided a method performed by a network device in a portal comprising a plurality of network devices, i.e. the network device being coupled to at least one neighbor network device. The method comprises determining that the network device has lost communication with one or more neighbor network devices. The network device then determines that it is not carrying traffic over a link aggregation group to a partner network device, i.e. that it is acting as a protection node. After determining that the network device is a protection node, the network device updates its operation key and starts to carry traffic over the link aggregation group.

Figure 20:
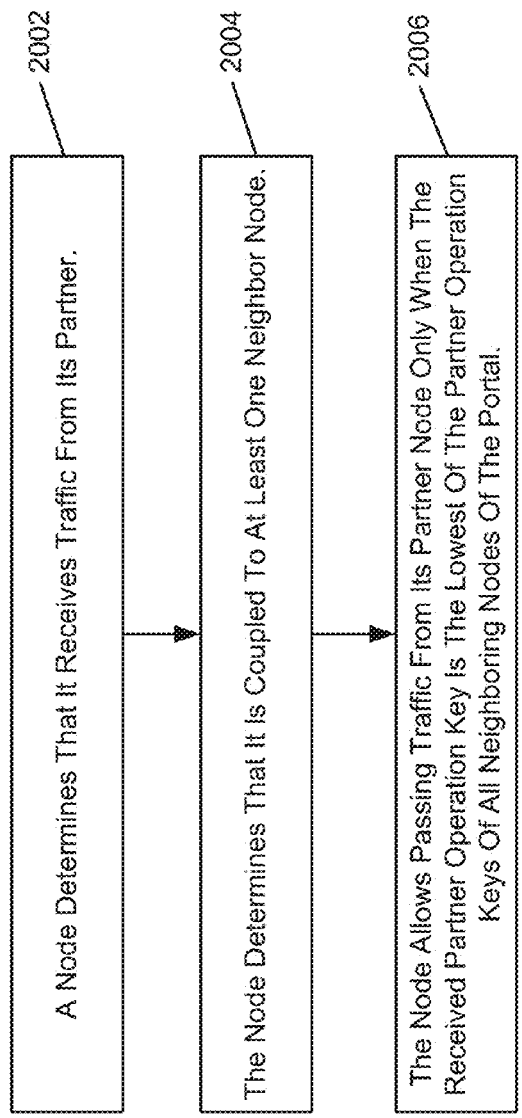
FIG. 20 is a flowchart illustrating a DRCP node's operation in coordinating with its neighbor node upon receiving multiple traffic streams according to one embodiment of the invention.

FIG. 20 illustrates a DRCP node's operation in coordinating with its neighbor node upon receiving multiple traffic streams according to one embodiment of the invention. The method may be implemented at any DRCP node coupled to one or more neighboring nodes. At 2002, the DRCP node determines that it receives traffic from its partner. The partner may be a portal containing multiple nodes or a single node. The DRCP node may be a single node of the portal, in which case, the DRCP node applies normal link aggregation operations to make the choice of selecting which traffic to allow passing if it receives multiple traffic from its partner (e.g., allowing passing traffic on the current working link after determining the link and corresponding aggregation port is still in the link aggregation group while enabling traffic on the current protection link after determining the working link is no longer in the link aggregation group). On the other hand, at 2004, the DRCP node determines that it is coupled to at least one neighbor node. When the DRCP node is coupled to at least one neighbor node, the DRCP node allows passing traffic from its partner node only when the received partner operation key is the lowest of the partner operation keys of all neighboring nodes of the portal. In one embodiment, that is to determine that the node's DRF_Home_Oper_Partner_Aggregator_Key is lower than all DRF_Neighbor_Oper_Partner_Aggregator_Keys of the portal.

According to embodiments, it is thus provided a method performed by a network device. The method comprises determining that the network device receives traffic from a partner network device over a link aggregation group. The method further comprises determining that the network device is coupled to at least one neighbor network device, the network device and the at least one neighbor network device being part of a portal. The method further comprises receiving an operation key of the partner network device and determining whether to allow traffic from the partner network device based on a comparison of the operation key of the partner network device and operation keys of the network devices of the portal. This may be performed by determining that the operation key of the partner network device is lower than the operation keys of the network devices of the portal.

Figure 27:
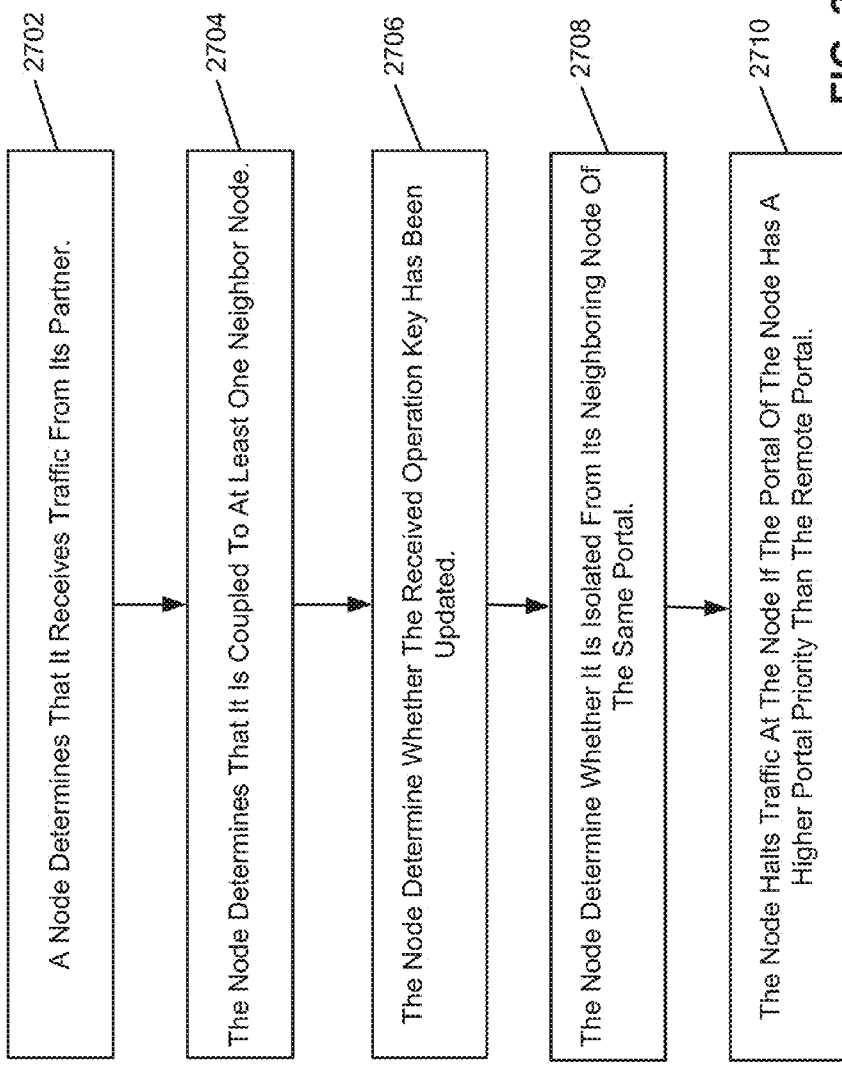
FIG. 27 illustrates a DRCP node's operation in coordinating with its neighbor node upon a communication failure condition to one embodiment of the invention.

FIG. 27 illustrates a DRCP node's operation in coordinating with its neighbor node upon a communication failure condition to one embodiment of the invention. Method 2800 may be implemented on a DRCP node (e.g., a network device) of a DRCP portal (referred to as a local portal) as a part of a DRNI such as nodes K-O of FIG. 1B and network devices 132 and 134 of FIG. 1C, where the node is coupled to one or more neighboring nodes. At 2702, the DRCP node determines that it receives traffic from its partner. The partner may be a portal containing multiple nodes or a single node. The DRCP node may be a single node of the portal, in which case, the DRCP node applies normal link aggregation operations to make the choice of selecting which traffic to allow passing if it receives multiple traffic from its partner (e.g., allowing passing traffic on the current working link after determining the link and corresponding aggregation port is still in the link aggregation group while enabling traffic on the current protection link after determining the working link is no longer in the link aggregation group). On the other hand, at 2704, the DRCP node determines that it is coupled to at least one neighbor node.

At 2706, the DRCP node determines whether the received operation key has been updated. In one embodiment, the update is due to a failed/malfunctioning IPL. The DRCP node can determine that the partner system is experiencing the failed/malfunctioning IPL if the most significant two bits of the received Partner_Oper_Key are equal to the value 2 or 3 and the two least significant bits of the Aggregation Port's Partner_Oper_Port_Priority are equal to the value 2 or 3.

At 2708, the DRCP node determines whether or not it is isolated from its neighboring node(s) of the same portal. The DRCP node may be isolated from its neighboring node(s) because of failed/malfunctioning IPL. In that case, the DRCP node determines that the IPL communications at local and remote portals are both failed.

At 2710, the DRCP node determines whether it is within the higher priority portal system and it acts to prevent duplicated traffic if it is. In one embodiment, the DRCP node determines whether it has the higher priority portal system identifier than its partner portal (e.g., at FIG. 1B, portal 112 may be the higher priority portal than portal 114, in which case it performs 2710), and it drops received traffic if it has the higher portal system identifier According to embodiments is thus provided a method performed by a network device. The method comprises determining that the network device receives traffic from a partner network device over a link aggregation group. The method further comprises determining that the network device is coupled to at least one neighbor network device, the network device and the at least one neighbor network device being part of a portal coupled to at least one neighbor node. The method further comprises the network device determine whether the received operation key has been updated, and it determines whether or not it is isolated from its neighboring node(s) of the same portal. The method further comprises the network device drops received traffic if it has the higher portal system identifier than its partner portal. The embodiments of the invention thus provides an efficient way to coordinate statuses of the neighboring nodes and partner nodes so that no duplicated traffic disrupts traffic reception in the link aggregation group implementing DRCP.

Coordination Between DRCP and LACP Statuses: A Second Set of Embodiments

For coordinating between DRCP and LACP status, an alternative way is to update some existing functions/variables and operates differently if both local and partner DRCP node can communicate its IPL status.

Figure 26A:
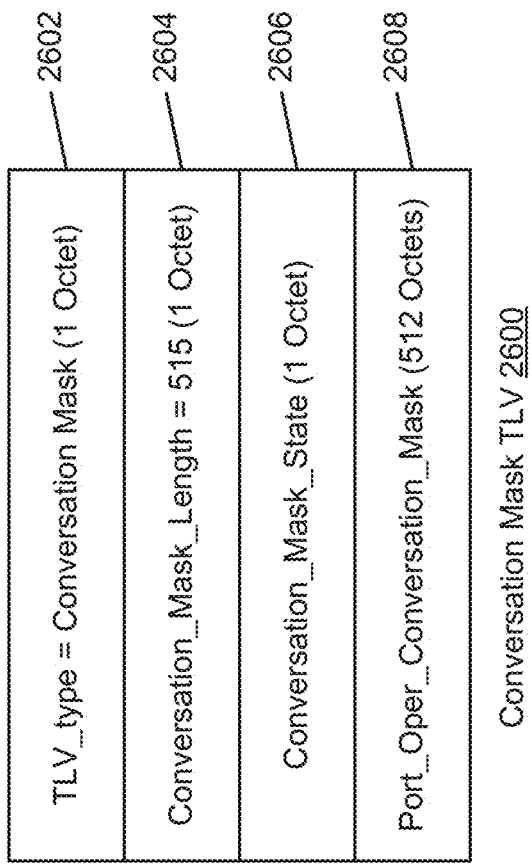
FIG. 26A illustrates a conversation mask TLV for an aggregation port according to one embodiment of the invention.
Figure 26B:
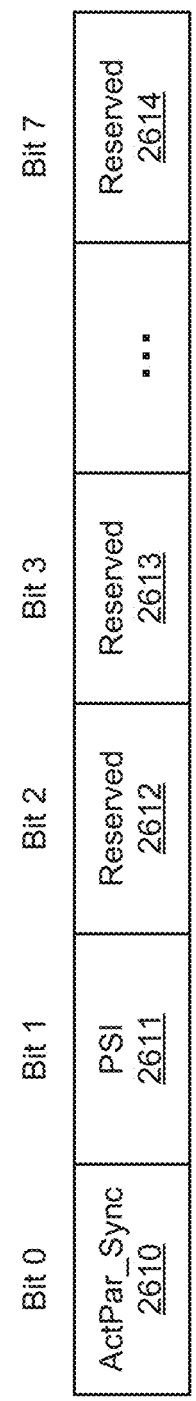
FIG. 26B illustrates a conversation mask state field within a conversation mask TLV of an aggregation port according to one embodiment of the invention.

FIG. 26A illustrates a conversation mask TLV for an aggregation port according to one embodiment of the invention. Note the conversation mask TLV is the same as illustrated in FIG. 4A of U.S. patent application Ser. No. 14/135,556, which is incorporated by reference in its entirety as stated herein. FIG. 26B illustrates a conversation mask state field within a conversation mask TLV of an aggregation port according to one embodiment of the invention. FIG. 26B is different from FIG. 4B of U.S. patent application Ser. No. 14/135,556 in that one field, PSI (portal state isolated) at reference 2611 replaces a reserved bit. This flag is only applicable for Portal Systems and is used to indicate if the Portal System is isolated from the other Portal Systems within the Portal ( ). TRUE (encoded as a 1) if DRF_Neighbor_Oper_DRCP_State.IPP_Activity=FALSE on all IPPs on this Portal System. Its value is otherwise FALSE (encoded as a 0).

In addition, the ReceivedConversationMaskTLV function disclosed in U.S. patent application Ser. No. 14/135,556 may be updated with the following additional operation: it also records the parameter value for the PSI carried in a received Port Conversation Mask as the current operational parameter values for the Partner_PSI.

Furthermore, the upddateConversationMaskTLV function disclosed in U.S. patent application Ser. No. 14/135,556 may be updated with the following additional operation: If this function is implemented by a DRCP Portal System, with its DRF_Portal_System_Number value set to a value that is different than 1, its Portal's System Identifier set to a value that is numerically lower than the Partner's System Identifier, and PSI=Partner_PSI=TRUE, then Comp_Oper_Conversation_Mask is set to NULL.

For example, referring to FIG. 1B, when both IPLs at K/L and M/O fail, all nodes would transmit traffic—the active nodes K and M transmit traffic as they are active nodes, and the protection nodes L and M also transmit traffic as they are isolated from active nodes and now consider themselves to be active. When PSI is supported at both portals 112 and 114, the PSI and received partner PSI would be TRUE. Assuming portal 112 is a higher priority portal (e.g., Portal 112's System Identifier is lower than Portal 114's thus its priority is higher), then node L determines that its portal system number (assuming to be 2 as it's a two-node portal, and the working node K has portal system number 1) is not the lowest, it will update its operation conversation mask to null, and it does not transmit or receive traffic.

Figure 28:
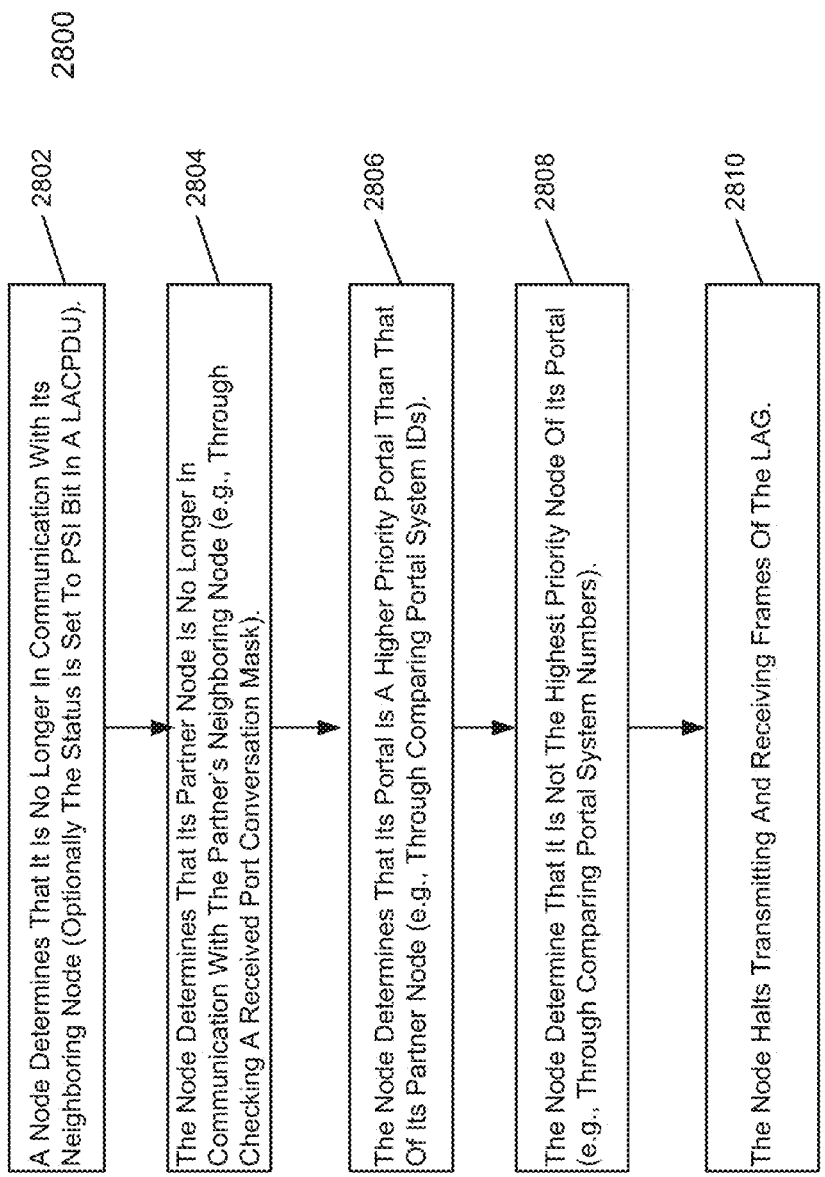
FIG. 28 illustrates a DRCP node's operation upon a communication failure according to one embodiment of the invention.

FIG. 28 illustrates a DRCP node's operation upon a communication failure according to one embodiment of the invention. Method 2800 may be implemented on a DRCP node (e.g., a network device) of a DRCP portal (referred to as a local portal) as a part of a DRNI such as nodes K-O of FIG. 1B and network devices 132 and 134 of FIG. 1C. At 2802, the DRCP node determines that it is no longer in communication with its neighboring node(s). The loss of communication may be due to IPP being disabled or malfunction, or the neighboring node being disabled or malfunction. The loss of communication may be indicated in the PSI bit being set to be TRUE (which is sent through a TLV in a LACPDU discussed herein above) in one embodiment.

At 2804, the node determines that its partner node is no longer in communication with the partner's neighboring node. The partner node may send over its PSI status via its LACPDU and the PSI will be recorded by the partner's recordReceivedConversationMaskTLV function. When the partner node is no longer in communication with its neighboring node, the received PSI status will be set to TRUE, in which case PSI==Partner_PSI==TRUE.

At 2806, the node determines that its portal is a higher priority portal than that of its partner node. The portal being a higher priority portal may be determined based on the protal's system identifiers of the node and the partner node in one embodiment.

At 2808, the node determines that it is not the highest priority node of its portal. The priority of the node within its portal may be determined by its portal system number, which is between 1 to 3 in one embodiment (for a portal of up to 3 nodes). The node determines that it is not the highest priority node of its portal if its portal system number is not 1 in one embodiment.

At 2810, the node stop transmitting and receiving traffic of the link aggregation group. In one embodiment, the node sets its Comp_Oper_Conversation_Mask, which is the operational value of the node's operation conversation mask computed by an update conversation mask function (e.g., updateConversationMask).

According to the embodiments, it is thus provided a method performed by a network device in a portal comprising a plurality of network devices, i.e. the network device being coupled to at least one neighbor network device. The method comprises determining that its partner node is no longer in communication with the partner's neighboring node. The network device then determines that its portal is a higher priority portal than that of its partner node. The network device then determines that it is not the highest priority node of its portal, and it stops transmitting and receiving traffic upon the determination. The embodiments of the invention thus provides an efficient way to coordinate statuses of the neighboring nodes and partner nodes so that no duplicated traffic disrupts traffic reception in the link aggregation group containing DRCP.

Embodiment of Network Devices

Figure 13:
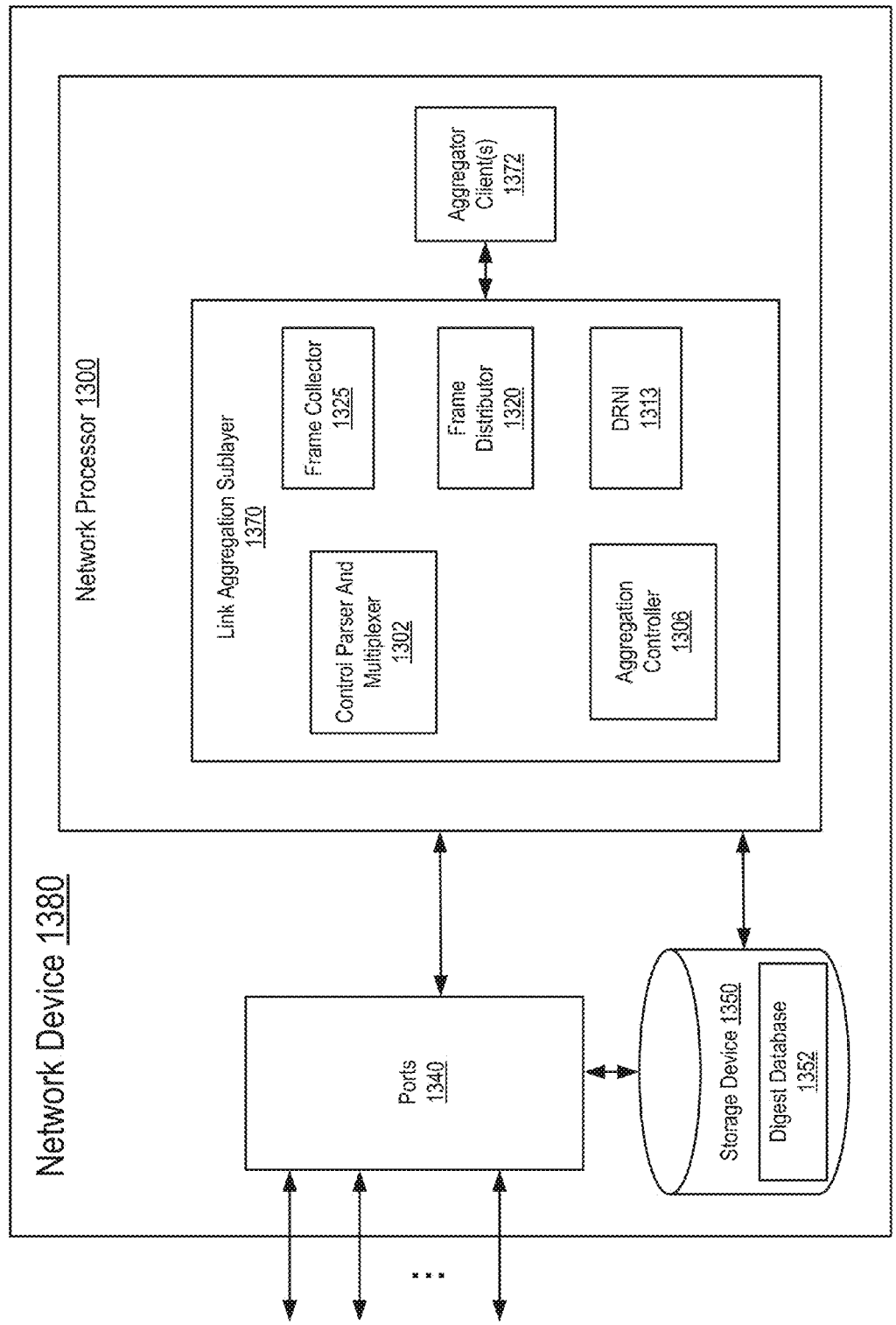
FIG. 13 is a diagram of one embodiment of a network device implementing DRNI.

FIG. 13 is a diagram of one example embodiment of a network device to execute DRNI functionality described herein. The network device 1380 can be a router or similar device implementing a link aggregation sublayer 1370 as described herein above in regard to FIG. 2 and supports the link aggregation functions described herein above. The network device 1380 can include a network processor 1300, a set of ports 1340, a storage device 1350 and similar network device components. The components of the network device are provided by way of example and not limitation. The network device 1380 can implement the aggregation functions and the link aggregation sublayer 1370 using any number or type of processors and with any configuration. In other embodiments, the aggregation functions and link aggregation sublayer and related components are distributed over a set of network processors, a set of line cards and their constituent general purpose and application specific processor or similar implemented in a network device architecture.

The ports 1340 can connect the network device via a physical medium such as Ethernet, fiber optic, or similar medium with any number of other network devices. Any number and variety of ports can be present in the network device 1380. Any combination or subset of the ports 1340 can be organized and managed as a Link Aggregation Group or a DRNI Portal where the network device functions as an Aggregation System. Thus, ports can be aggregation ports for one or more link aggregation groups.

A set of storage devices 1350 within the network device 1380 can be any type of memory devices, caches, registers or similar storage devices for use as working memory and or persistent storage. Any number and variety of storage devices 1350 can be utilized to store the data of the network device including programmed data and received data traffic to be processed by the network device 1380. In one embodiment, DRNI data structures or similar organization of the conversation service mapping digest, conversation masks, and similar data structures described herein above can be stored in such a data structure. Other data structures stored in the storage device 1350 can include those described herein above. In other embodiments, these data structures can be conceived as being independent and can be distributed over any number of separate storage devices 1350 within the network device 1380.

A set of network processors 1300 can implement the aggregation and DRNI functions and the link aggregation sublayer 1370 described herein above. The aggregation functions can include aggregator client(s) 1372 and the Link Aggregation Sublayer 1370, which can include control parser/multiplexer 1302, aggregation controller 1306, frame collector 1325, frame distributor 1320, and DRNI 1313.

The aggregation controller 1306 as described further herein above, can implement link aggregation control and the link aggregation control protocol functions. These functions manage the configuration and allocation of link aggregation groups, the DRNI Portal and similar aspects. The control parser and multiplexer 1302 identifies and forwards LACPDUs from the other data traffic received on the aggregation ports and sends the LACPDUs to the aggregation controller 1306 and other data traffic within the link aggregation sublayer 1370.

The link aggregation sublayer 1370 as described further herein above, manages the collection and distribution of the frames according the distribution algorithm. Within the link aggregation sublayer 1370, frame collector 1325 receives the frames and organizes them according to the distribution algorithm shared with the partner system across the link aggregation group. A frame distributor 1320 prepares and selects the outbound frames for transmission over a set of aggregation ports according to the distribution algorithm. A client interface receives and transmits frames to and from the aggregator client(s) 1372. Inbound frames are passed from the fame collector 1325 to the aggregator client(s) 1372 and outbound frames are passed from the frame distributor 1320 to the aggregator client(s) 1372. The DRNI functions 1311 described herein above are executed by the network processor 1311.

While the invention has been described in terms of several example embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method supporting a distributed resilient network interconnect (DRNI) in a link aggregation group at a network device, wherein the network device and a neighbor network device are included in a first portal of the link aggregation group, wherein the first portal is coupled via links of the link aggregation group with a second portal including of one or more remote network devices, and wherein the network device is communicatively coupled to the neighbor network device via an intra-portal port (IPP) using an intra-portal link (IPL), the method comprising:

receiving a distributed relay control protocol data unit (DRCPDU), wherein the DRCPDU includes neighbor network device's state information and configuration information, wherein the configuration information includes its operational aggregation key, gateway digest, and port digest;

determining whether at least some of the received configuration information is different from the configuration information of the network device;

determining whether a portion of the received operational aggregation key is identical to a corresponding portion of an operational aggregation key of the network device upon determining that the at least some of the received configuration information is different from the configuration information of the network device;

determining whether settings for being three system portal and gateway algorithms are the same as received values for being three system portal and gateway algorithms upon determining that the portion of the received operational aggregation key is identical to a corresponding portion of an operational aggregation key of the network device;

determining whether the received gateway digest is identical to a gateway digest of the network device upon determining that settings for being three system portal and gateway algorithms are the same; and causing not to include a gateway conversation type/length/value (TLV) in a next DRCPDU to be transmitted by the network device to the neighbor network device upon determining that the received gateway digest is identical to the gateway digest of the network device.

2. The method of claim 1, wherein the determining whether the portion of the received operational aggregation key is identical to the corresponding portion of the operational aggregation key of the network device includes comparing the 14 least significant bits in the received operational aggregation key and the operational aggregation key of the network device.

3. The method of claim 1, further comprising:
upon determining that the received gateway digest is different from the gateway digest of the network device, indicating to a transmit operation of the network device to include a gateway conversation TLV in the next DRCPDU to be transmitted by the network device to the neighbor network device.

4. The method of claim 3, further comprising:
determining whether a gateway conversation TLV is included in the received DRCPDU; and
upon determining that the gateway conversation TLV is included in the received DRCPDU, setting a variable for a neighbor network device's operational gateway conversation vector to a gateway conversation vector that is carried in the gateway conversation TLV.

5. The method of claim 1, further comprising:
determining whether a received port algorithm is identical to a configured port algorithm of the network device;
determining whether the received port digest is identical to a port digest of the network device upon determining that the received port algorithm is identical to the configured port algorithm of the network device;
causing not to include a port conversation TLV in the next DRCPDU to be transmitted by the network device to the neighbor network device upon determining that the received port digest is identical to a port digest of the network device; and recording the neighbor network device's state information contained in the received DRCPDU as state operational variables of the neighbor network device.

6. The method of claim 5, further comprising:
upon determining that the received port digest is different from the port digest of the network device, indicating to a transmit operation of the network device to include a port conversation TLV in the next DRCPDU to be transmitted by the network device to the neighbor network device.

7. The method of claim 6, further comprising:
determining whether a port conversation TLV is included in the received DRCPDU; and
upon determining that the port conversation TLV is included in the received DRCPDU, setting a variable for a neighbor network device's operational port conversation vector to a gateway conversation vector that is carried in the port conversation TLV.

8. A network device supporting a distributed resilient network interconnect (DRNI) in a link aggregation group, wherein the network device and a neighbor network device are included in a first portal of the link aggregation group, wherein the first portal is coupled via links of the link aggregation group with a second portal including of one or more remote network devices, and wherein the network device is communicatively coupled to the neighbor network device via an intra-portal port (IPP) using an intra-portal link (IPL), the network device comprising:

ports coupled to the physical or aggregation link of the link aggregation group; and a network processor coupled to the ports, the network processor executing a DRNI function, the DRNI function operative to: receive a distributed relay control protocol data unit (DRCPDU), wherein the DRCPDU includes neighbor network device's state information and configuration information, wherein the configuration information includes its operational aggregation key, gateway digest, and port digest, determine whether at least some of the received configuration information is different from the configuration information of the network device, determine whether a portion of the received operational aggregation key is identical to a corresponding portion of an operational aggregation key of the network device upon a determination that the at least some of the received configuration information is different from the configuration information of the network device, determine whether settings for being three system portal and gateway algorithms are the same as received values for being three system portal and gateway algorithms upon determining that the portion of the received operational aggregation key is identical to a corresponding portion of an operational aggregation key of the network device, determine whether the received gateway digest is identical to a gateway digest of the network device upon determining that settings for being three system portal and gateway algorithms are the same, and cause not to include a gateway conversation type/length/value (TLV) in a next DRCPDU to be transmitted by the network device to the neighbor network device upon the determination that the received gateway digest is identical to the gateway digest of the network device.

9. The network device of claim 8, wherein the DRNI function is further operative to: upon the determination that the received gateway digest is different from the gateway digest of the network device, indicate to a transmit operation of the network device to include a gateway conversation TLV in the next DRCPDU to be transmitted by the network device to the neighbor network device.

10. The network device of claim 9, wherein the DRNI function is further operative to: determine whether a gateway conversation TLV is included in the received DRCPDU, and upon the determination that the gateway conversation TLV is included in the received DRCPDU, set a variable for a neighbor network device's operational gateway conversation vector to a gateway conversation vector that is carried in the gateway conversation TLV.

11. The network device of claim 8, wherein the DRNI function is further operative to: determine whether a received port algorithm is identical to a configured port algorithm of the network device, determine whether the received port digest is identical to a port digest of the network device upon determining that the received port algorithm is identical to the configured port algorithm of the network device, cause not to include a port conversation TLV in the next DRCPDU to be transmitted by the network device to the neighbor network device upon determining that the received port digest is identical to a port digest of the network device, and record the neighbor network device's state information contained in the received DRCPDU as state operational variables of the neighbor network device.

12. The network device of claim 11, wherein the DRNI function is further operative to: upon the determination that the received port digest is different from the port digest of the network device, indicate to a transmit operation of the network device to include a port conversation TLV in the next DRCPDU to be transmitted by the network device to the neighbor network device.

13. The network device of claim 12, wherein the DRNI function is further operative to: determine whether a port conversation TLV is included in the received DRCPDU, and upon the determination that the port conversation TLV is included in the received DRCPDU, set a variable for a neighbor network device's operational port conversation vector to a gateway conversation vector that is carried in the port conversation TLV.

14. A non-transitory machine-readable storage medium having instructions stored therein, which when executed by a processor, cause the processor to perform operations supporting a distributed resilient network interconnect (DRNI) in a link aggregation group at a network device, wherein the network device and a neighbor network device are included in a first portal of the link aggregation group, wherein the first portal is coupled via links of the link aggregation group with a second portal including of one or more remote network devices, and wherein the network device is communicatively coupled to the neighbor network device via an intra-portal port (IPP) using an intra-portal link (IPL), the operations comprise:
  receiving a distributed relay control protocol data unit (DRCPDU), wherein the DRCPDU includes neighbor network device's state information and configuration information, wherein the configuration information includes its operational aggregation key, gateway digest, and port digest;
  determining whether at least some of the received configuration information is different from the configuration information of the network device;
  determining whether a portion of the received operational aggregation key is identical to a corresponding portion of an operational aggregation key of the network device upon determining that the at least some of the received configuration information is different from the configuration information of the network device;
  determining whether settings for being three system portal and gateway algorithms are the same as received values for being three system portal and gateway algorithms upon determining that the portion of the received operational aggregation key is identical to a corresponding portion of an operational aggregation key of the network device;
  determining whether the received gateway digest is identical to a gateway digest of the network device upon determining that settings for being three system portal and gateway algorithms are the same; and
  causing not to include a gateway conversation type/length/value (TLV) in a next DRCPDU to be transmitted by the network device to the neighbor network device upon determining that the received gateway digest is identical to the gateway digest of the network device.

15. The non-transitory machine-readable storage medium of claim 14, wherein the determining whether the portion of the received operational aggregation key is identical to the corresponding portion of the operational aggregation key of the network device includes comparing the 14 least significant bits in the received operational aggregation key and the operational aggregation key of the network device.

16. The non-transitory machine-readable storage medium of claim 14, the operations further comprising:
  upon determining that the received gateway digest is different from the gateway digest of the network device, indicating to a transmit operation of the network device to include a gateway conversation TLV in the next DRCPDU to be transmitted by the network device to the neighbor network device.

17. The non-transitory machine-readable storage medium of claim 16, the operations further comprising:
  determining whether a gateway conversation TLV is included in the received DRCPDU; and
  upon determining that the gateway conversation TLV is included in the received DRCPDU, setting a variable for a neighbor network device's operational gateway conversation vector to a gateway conversation vector that is carried in the gateway conversation TLV.

18. The non-transitory machine-readable storage medium of claim 14, the operations further comprising:
  determining whether a received port algorithm is identical to a configured port algorithm of the network device;
  determining whether the received port digest is identical to a port digest of the network device upon determining that the received port algorithm is identical to the configured port algorithm of the network device;
  causing not to include a port conversation TLV in the next DRCPDU to be transmitted by the network device to the neighbor network device upon determining that the received port digest is identical to a port digest of the network device; and
  recording the neighbor network device's state information contained in the received DRCPDU as state operational variables of the neighbor network device.

19. The non-transitory machine-readable storage medium of claim 18, the operations further comprising:
  upon determining that the received port digest is different from the port digest of the network device, indicating to a transmit operation of the network device to include a port conversation TLV in the next DRCPDU to be transmitted by the network device to the neighbor network device.

20. The non-transitory machine-readable storage medium of claim 19, the operations further comprising:

determining whether a port conversation TLV is included in the received DRCPDU; and upon determining that the port conversation TLV is included in the received DRCPDU, setting a variable for a neighbor network device's operational port conversation vector to a gateway conversation vector that is carried in the port conversation TLV.

* * * * *

UNITED STATES PATENT AND TRADEMARK OFFICE
CERTIFICATE OF CORRECTION

PATENT NO. : 9,813,290 B2
APPLICATION NO. : 14/838353
DATED : November 7, 2017
INVENTOR(S) : Harding et al.

It is certified that error appears in the above-identified patent and that said Letters Patent is hereby corrected as shown below:

On the Title Page

In Item (60), under "Related U.S. Application Data", in Column 1, Line 2, delete "26, 2014." and insert -- 29, 2014. --, therefor.

In the Drawings

In Fig. 8, Sheet 8 of 43, delete " [image of EXPIRED state block with DRF_Neighbor_Oper_DRCP_State.IPP_Activity = FALSE; DRF_Neighbor_Oper_DRCP_State.DRCP_Timeout = Short Timeout; START DRCP_current_while_timer(Short Timeout); DRF_Home_Oper_DRCP_State.Expired = TRUE] " and insert -- [image of EXPIRED state block with same text] --, therefor.

In Fig. 15, Sheet 15 of 43, delete "  " and insert --  --, therefor.

In Fig. 16, Sheet 16 of 43, delete " 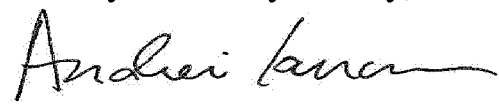 " and insert -- 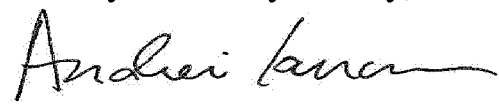 --, therefor.

Signed and Sealed this
Twenty-ninth Day of May, 2018

Andrei Iancu
*Director of the United States Patent and Trademark Office*

CERTIFICATE OF CORRECTION (continued)
U.S. Pat. No. 9,813,290 B2

In the Specification

In Column 8, Line 15, delete "exchange" and insert -- exchange. --, therefor.

In Column 9, Line 6, delete "exchange" and insert -- exchange. --, therefor.

In Column 20, Line 32, delete "aDrniIPLEncapMap" and insert -- aDrniIPLEncapMap --, therefor.

In Column 20, Line 58, delete "aDrniIPLEncapMap" and insert -- aDrniIPLEncapMap --, therefor.

In Column 26, Line 46, delete "OxOX." and insert -- 0x0x. --, therefor.

In Column 30, Line 6, delete "OxOx" and insert -- 0x0x --, therefor.

In Column 46, Line 42, delete "aDrniIPLEncapMap" and insert -- aDrniIPLEncapMap --, therefor.